(12) United States Patent  
Nagae et al.

(10) Patent No.: US 7,571,955 B2  
(45) Date of Patent: Aug. 11, 2009

(54) VEHICULAR BODY FRONT STRUCTURE

(75) Inventors: Kunji Nagae, Yokohama (JP); Kouichi Oota, Yamato (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 51 days.

(21) Appl. No.: 11/727,726

(22) Filed: Mar. 28, 2007

(65) Prior Publication Data

US 2007/0228706 A1 Oct. 4, 2007

(30) Foreign Application Priority Data

Apr. 3, 2006 (JP) ............................. 2006-101318

(51) Int. Cl.
  *B60R 21/34* (2006.01)
  *B62D 25/10* (2006.01)
(52) U.S. Cl. ................................................. 296/187.09
(58) Field of Classification Search ............ 296/187.03, 296/187.04, 187.09
  See application file for complete search history.

(56) References Cited

U.S. PATENT DOCUMENTS

| 6,802,556 | B2 * | 10/2004 | Mattsson et al. | ....... 296/187.09 |
| 2003/0042714 | A1 | 3/2003 | Sawa | |
| 2004/0113459 | A1 * | 6/2004 | Mattsson et al. | ....... 296/187.04 |
| 2004/0186643 | A1 * | 9/2004 | Tanaka et al. | .................. 701/45 |
| 2005/0082873 | A1 * | 4/2005 | Takehara | ................ 296/187.09 |
| 2005/0140174 | A1 * | 6/2005 | Fayt et al. | ............... 296/187.04 |
| 2005/0151393 | A1 * | 7/2005 | Borg et al. | .............. 296/187.09 |
| 2005/0264036 | A1 * | 12/2005 | Kramarczyk et al. | ... 296/187.03 |
| 2006/0028051 | A1 * | 2/2006 | Brei et al. | .............. 296/187.04 |
| 2006/0202512 | A1 * | 9/2006 | Brei et al. | .............. 296/187.04 |
| 2006/0290172 | A1 * | 12/2006 | Hirata et al. | ........... 296/187.04 |
| 2007/0063544 | A1 * | 3/2007 | Browne et al. | ......... 296/187.09 |
| 2007/0151791 | A1 * | 7/2007 | Gust | .......................... 180/274 |

FOREIGN PATENT DOCUMENTS

| DE | 197 21 565 A1 | 12/1997 |
| DE | 199 35 342 A1 | 2/2001 |
| DE | 10 2004 029 757 A1 | 1/2006 |
| EP | 1 442 943 A2 | 8/2004 |
| JP | 2004-268687 A | 9/2004 |

* cited by examiner

*Primary Examiner*—H Gutman
(74) *Attorney, Agent, or Firm*—Foley & Lardner LLP

(57) ABSTRACT

A vehicular body front structure, includes: 1) a reactive force member disposed adjacent to a front edge part of a vehicular body and configured to be displaceable from i) a received state where the reactive force member is received in the vehicular body to ii) a protruding state where the reactive force member protrudes to a position higher than a surface of the vehicular body; 2) a mover mechanism disposed between the vehicular body and the reactive force member and configured to displace the reactive force member from the received state to the protruding state; and 3) a shock sensor configured to sense or calculate a collision of the vehicular body with an obstacle to thereby output a sensing signal for moving the mover mechanism.

9 Claims, 37 Drawing Sheets

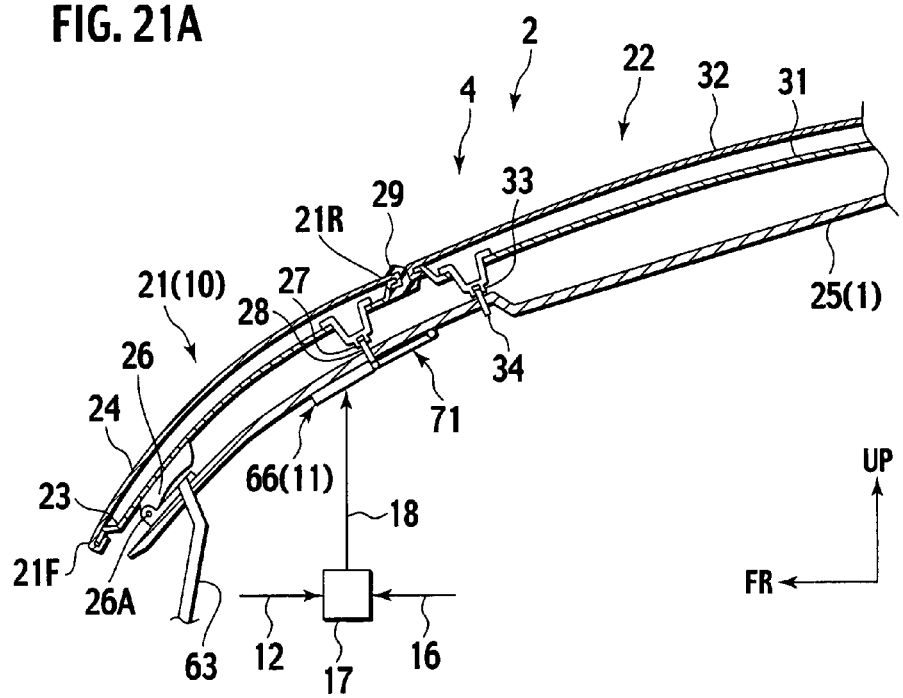
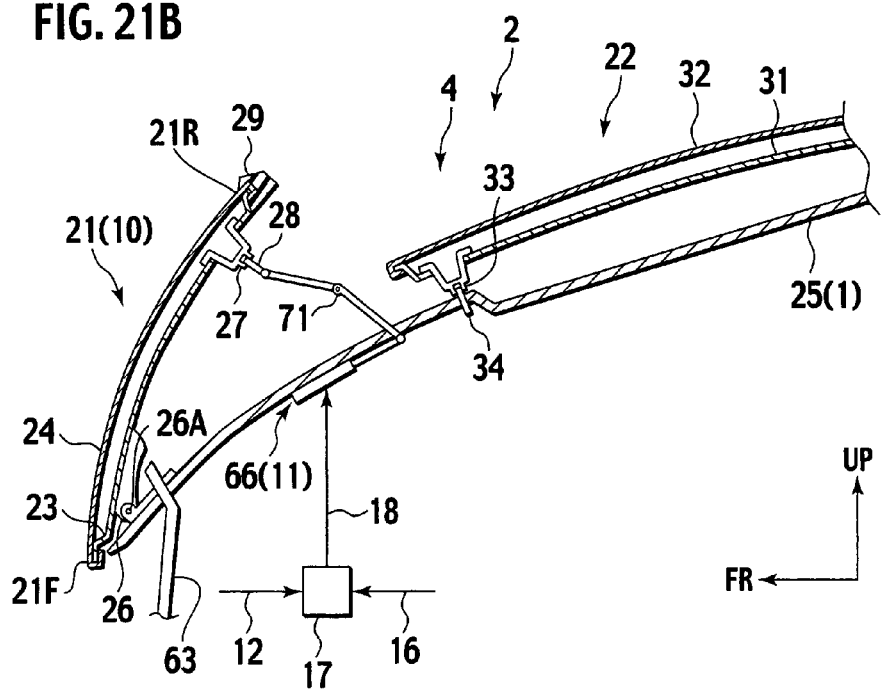

FIG. 36A
FIG. 36B
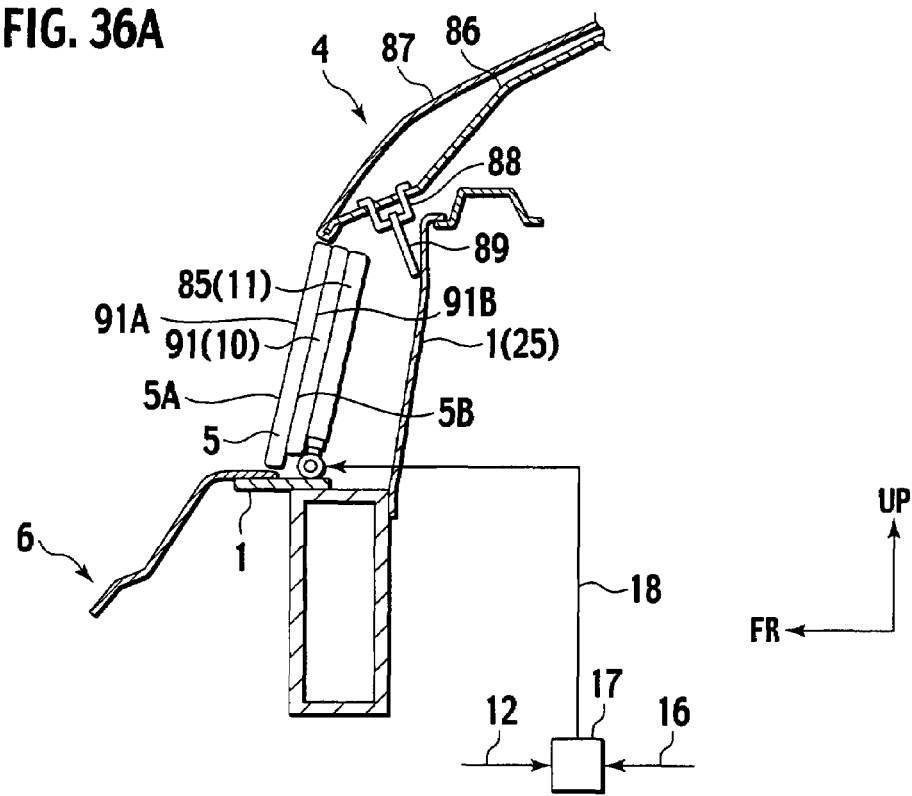
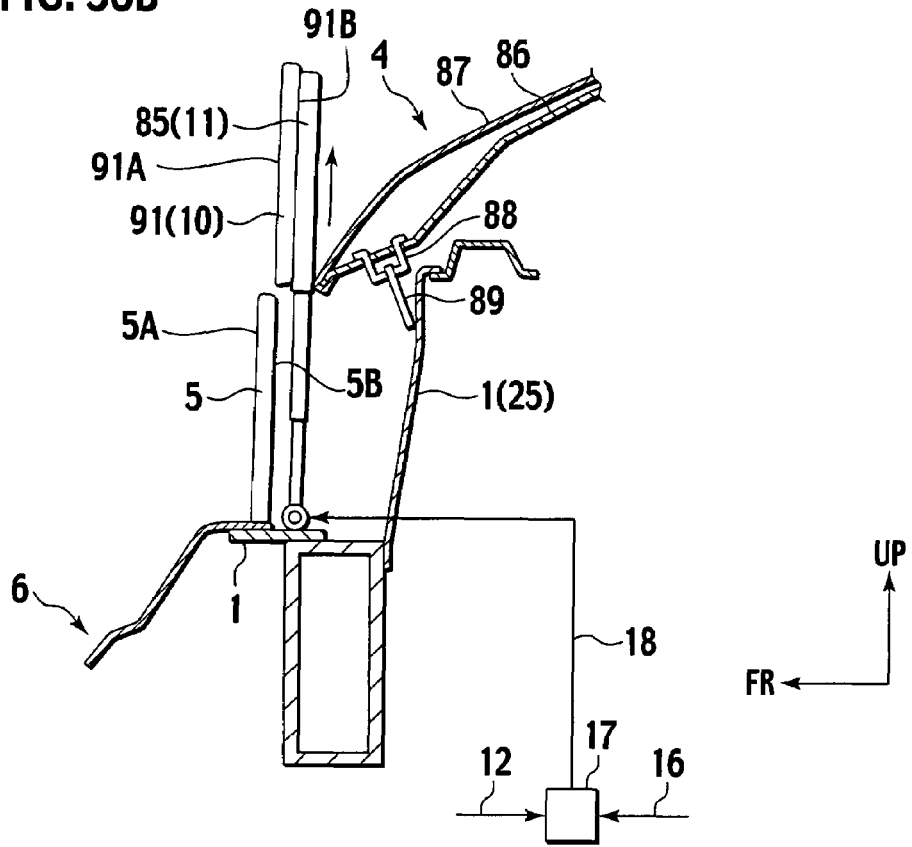

VEHICULAR BODY FRONT STRUCTURE

BACKGROUND OF THE INVENTION

1. Field of the Invention

The present invention relates to a vehicular body front structure.

2. Description of the Related Art

Japanese Patent Application Laid-Open No. 2004-268687 discloses a vehicular body front structure which is so configured that, during a collision of a vehicle with an obstacle, a rear part of a hood capable of opening or closing an engine room is lifted up via a link mechanism and an actuator.

SUMMARY OF THE INVENTION

It is an object of the present invention to provide a vehicular body front structure capable of decreasing a shock energy to a hood of a vehicle which shock energy is caused by an apex part of an obstacle.

According an aspect of the present invention, there is provided a vehicular body front structure, comprising: 1) a reactive force member disposed adjacent to a front edge part of a vehicular body and configured to be displaceable from i) a received state where the reactive force member is received in the vehicular body to ii) a protruding state where the reactive force member protrudes to a position higher than a surface of the vehicular body; 2) a mover mechanism disposed between the vehicular body and the reactive force member and configured to displace the reactive force member from the received state to the protruding state; and 3) a shock sensor configured to sense or calculate a collision of the vehicular body with an obstacle to thereby output a sensing signal for moving the mover mechanism.

The other object(s) and feature(s) of the present invention will become understood from the following description with reference to the accompanying drawings.

BRIEF DESCRIPTION OF THE DRAWINGS

FIG. 21A (taken along the lines XXI-A in FIG. 20A) and FIG. 21B each are a partial side cross sectional view, according to the fifth embodiment.

FIG. 36A (taken along the lines XXXVI-A in FIG. 35A) and FIG. 36B each are a partial side cross sectional view, according to the ninth embodiment.

DESCRIPTION OF THE PREFERRED EMBODIMENTS

Figure 1A:
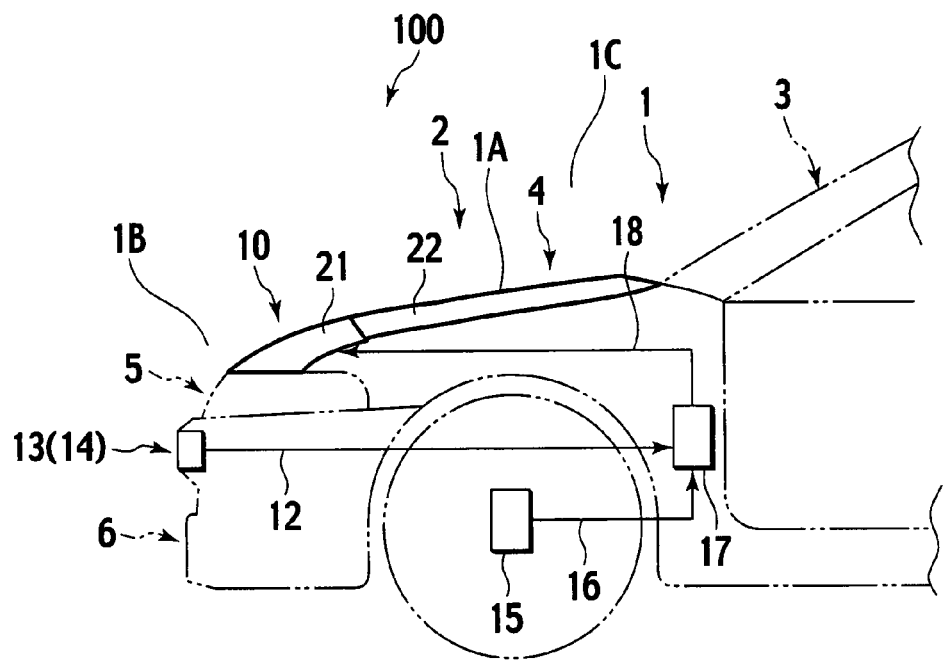
FIG. 1A and FIG. 1B each show a side view of a vehicular body front structure, according to a common embodiment of the present invention.

In the following, various embodiments of the present invention will be described in detail with reference to the accompanying drawings.

For ease of understanding, the following description will contain various directional terms, such as left, right, upper, lower, forward, rearward and the like. However, such terms are to be understood with respect to only a drawing or drawings on which the corresponding part of element is illustrated.

Common Embodiment

Hereinafter, a common embodiment of the present invention is to be set forth, referring to drawings.

FIG. 1 to FIG. 6 show a vehicular body front structure 100, according to the common embodiment of the present invention.

--Basic Structure of Vehicle--

A structure of the common embodiment is set forth first. As shown in FIG. 1, a vehicle such as an automobile usually has an engine room 2 at a front part 1C of a vehicular body 1, and a passenger room 3 substantially in the middle of the vehicular body 1. Above the engine room 2, there is provided a hood 4 formed substantially into a flat plate in such a configuration as to open or close. Moreover, at a substantially lower part of a front edge part of the hood 4, there is provided a grille 5. Moreover, at a substantially lower part of the grille 5, there is provided a bumper 6.

--Structure Common to All Embodiments (First Embodiment to Tenth Embodiment)--

In addition, with the above vehicle having the basic structure as set forth above, adjacent to a front edge part 1B of the vehicular body 1, there is provided a reactive force member 10 configured to be displaceable from i) a received state where the reactive force member 10 is received by the vehicular body 1 to ii) a protruding state where the reactive force member 10 protrudes to a position higher than a surface 1A of the vehicular body 1. Moreover, between the vehicular body 1 and the reactive force member 10, there is provided a mover mechanism 11 configured to displace the reactive force member 10 from the received state to the protruding state. Moreover, there are provided shock sensors 13, 14 (the shock sensor 13 is of measurement type, and the shock sensor 14 is of calculation type) configured to sense or calculate a collision of the vehicular body 1 with an obstacle A, to thereby output a sensing signal 12 for moving the mover mechanism 11.

Figure 2:
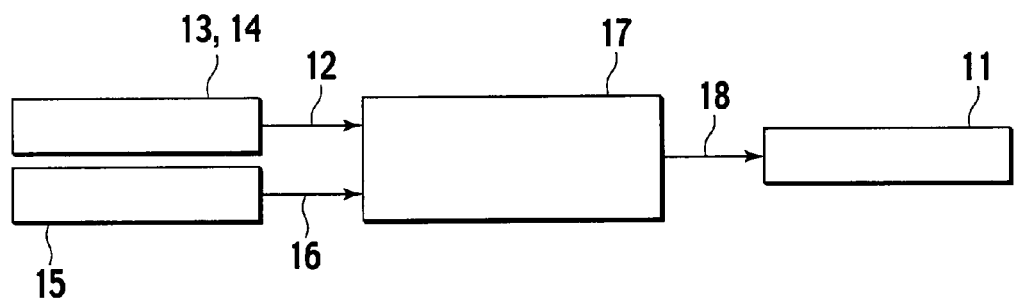
FIG. 2 shows a control system in FIG. 1, according to the common embodiment.

It can be so structured that the sensing signal 12 from the shock sensors 13, 14 directly operates the mover mechanism 11. When necessary, however, in addition to the above structure, between the shock sensors 13, 14 and the mover mechanism 11, there can be provided a controller 17 configured to receive a vehicular speed signal 16 from a vehicular speed sensor 15 to thereby move the mover mechanism 11 within a certain speed range, as shown in FIG. 2. In this case, the controller 17 outputs a control signal 18 (operation signal) to the mover mechanism 11.

The above description of the common embodiment in terms of structure is common to all the following first embodiment to tenth embodiment.

--Operations Common to All Embodiments (First Embodiment to Tenth Embodiment)--

Then, operations of the common embodiment are to be set forth.

Figure 1B:
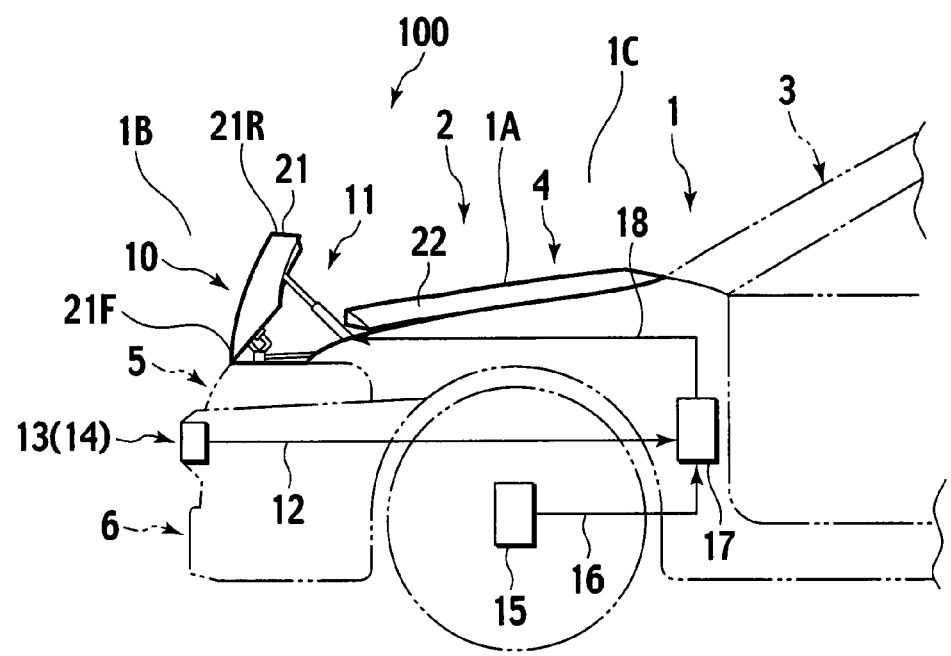

According to the common embodiment, after sensing or calculating the collision of the vehicular body 1 with the obstacle A, the shock sensors 13, 14 output the sensing signal 12 for moving the mover mechanism 11. Receiving directly or indirectly the sensing signal 12 caused by the shock sensors 13, 14, the mover mechanism 11 between the vehicular body 1 and the reactive force member 10 displaces the reactive force member 10 adjacent to the front edge part 1B of the vehicular body 1, from the received state (see FIG. 1A showing the reactive force member 10 received in the vehicular body 1) to the protruding state (see FIG. 1B showing the reactive force member 10 protruding higher than the surface 1A of the vehicle body 1).

Figure 3:
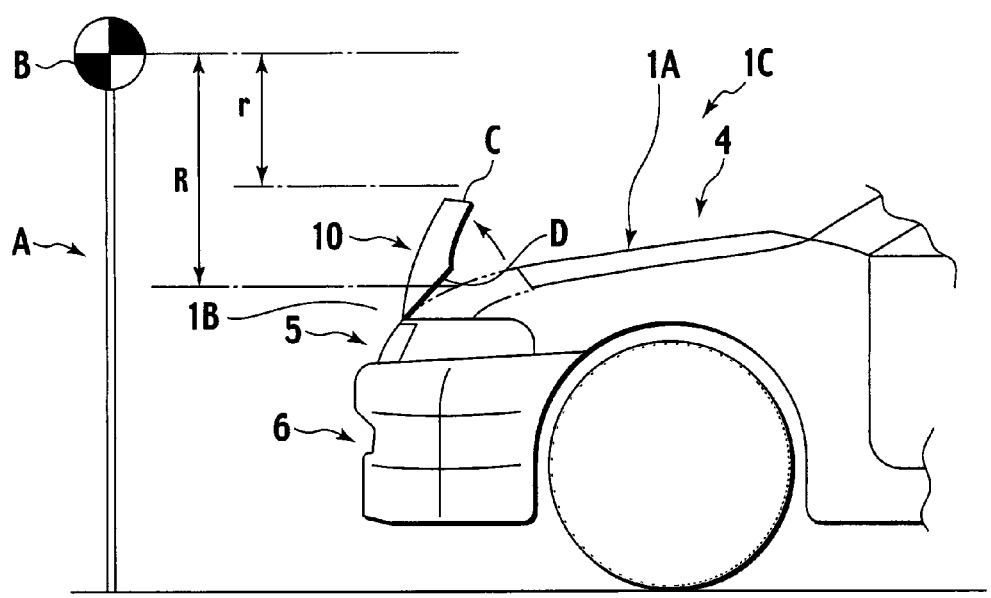
FIG. 3 discloses a state of collision in FIG. 1, according to the common embodiment.
Figure 4:
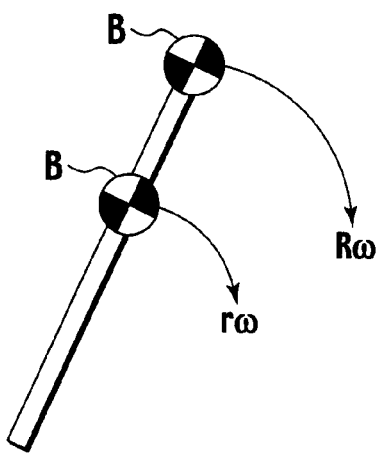
FIG. 4 discloses a principle of FIG. 3, according to the common embodiment.

Herein, as shown in FIG. 3, an apex part B of the obstacle A collides with the front edge part 1B of the vehicular body 1. Then, the apex part B makes a rotation (angular speed $\omega$)) around a contact with the vehicular body 1, to thereby collide with the hood 4 (a rear hood 22 in the case of the hood 4 being divided into a front hood 21 [to be described afterward] and the rear hood 22 [to be described afterward]) for opening and closing the engine room 2 provided at the front part 1C of the vehicular body 1. Adjacent to the front edge part 1B of the vehicular body 1, allowing the reactive force member 10 to protrude higher than the surface 1A of the vehicular body 1 makes $R\omega > r\omega$ as shown in FIG. 4 for the following:

A contact D and a larger rotary radius R are defined in the case of the reactive force member 10 not protruding, meanwhile an upper end part of the reactive force member 10 operates as a contact C and a smaller rotary radius r is defined in the case of the protruding reactive force member 10. The smaller rotary radius r from the apex part B of the obstacle A to the upper end part of the reactive force member 10 is smaller than the larger rotary radius R, thereby making $R\omega > r\omega$.

Figure 5:
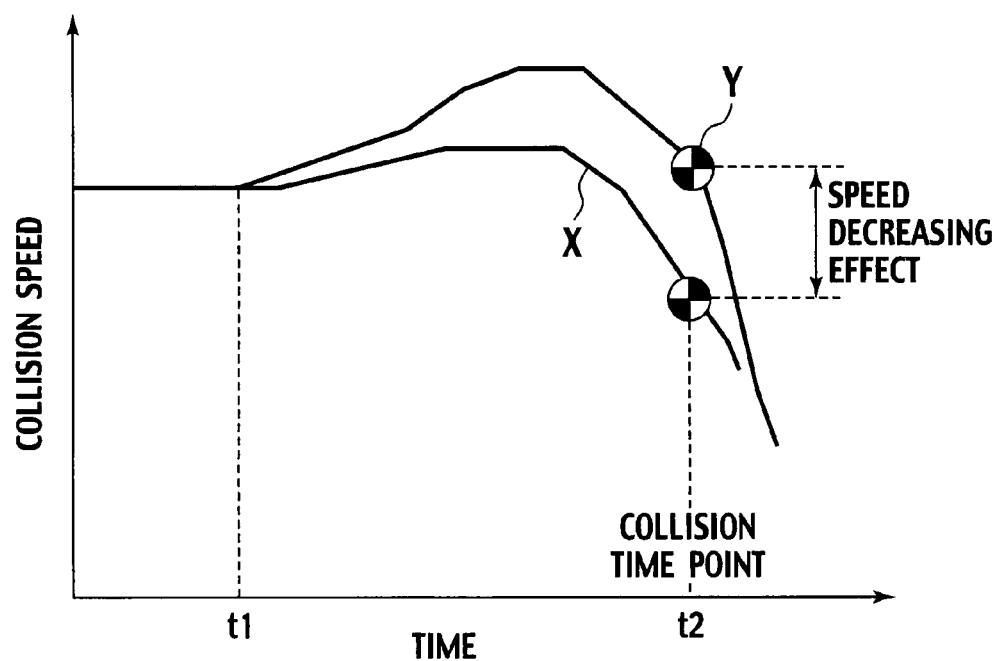
FIG. 5 shows a graph of collision speed relative to time, according to the common embodiment.

Correspondingly, as shown in FIG. 5, compared with a line Y denoting a moving speed of the apex part B of the obstacle A in the case of the reactive force member 10 not protruding, a line X denoting the same moving speed in the case of the protruding reactive force member 10 is smaller, to thereby decrease a shock energy to the hood 4. In addition, in FIG. 5, a time t1 denotes a collision time corresponding to the vehicular body 1 and a time t2 denotes a collision time corresponding to the hood 4.

Moreover, the reactive force member 10 is configured to move adjacent to the front edge part 1B of the vehicular body 1, thereby making the entire part of the structure small in size and weight, leading to a smooth movement, thus disposing the reactive force member 10 to a certain position in a short time.

Moreover, with the above small and light-weight structure, the structure can have a smaller inertia caused by operations, thus decreasing vibration amplitude to the hood 4.

In addition, using the calculation type shock sensor 14 for outputting the sensing signal 12 by calculating the collision of the vehicular body 1 with the obstacle A can prepare in advance the reactive force member 10 before the collision to the vehicular body 1 or hood 4. Moreover, the reactive force member 10 which is operable well in advance before the collision can secure a long operation time, thereby correspondingly delaying the operation speed of the reactive force member 10, thus making the mover mechanism 11 smaller in size, capacity and price. Moreover, the calculation type shock sensor 14 for outputting the sensing signal 12 by calculating the collision of the vehicular body 1 with the obstacle A can, as the case may be, recognize type of the obstacle A. In this case, according to the type of the obstacle A, when necessary, the reactive force member 10 can be assuredly operated, while when not necessary, the reactive force member 10 is not operated.

Figure 6:
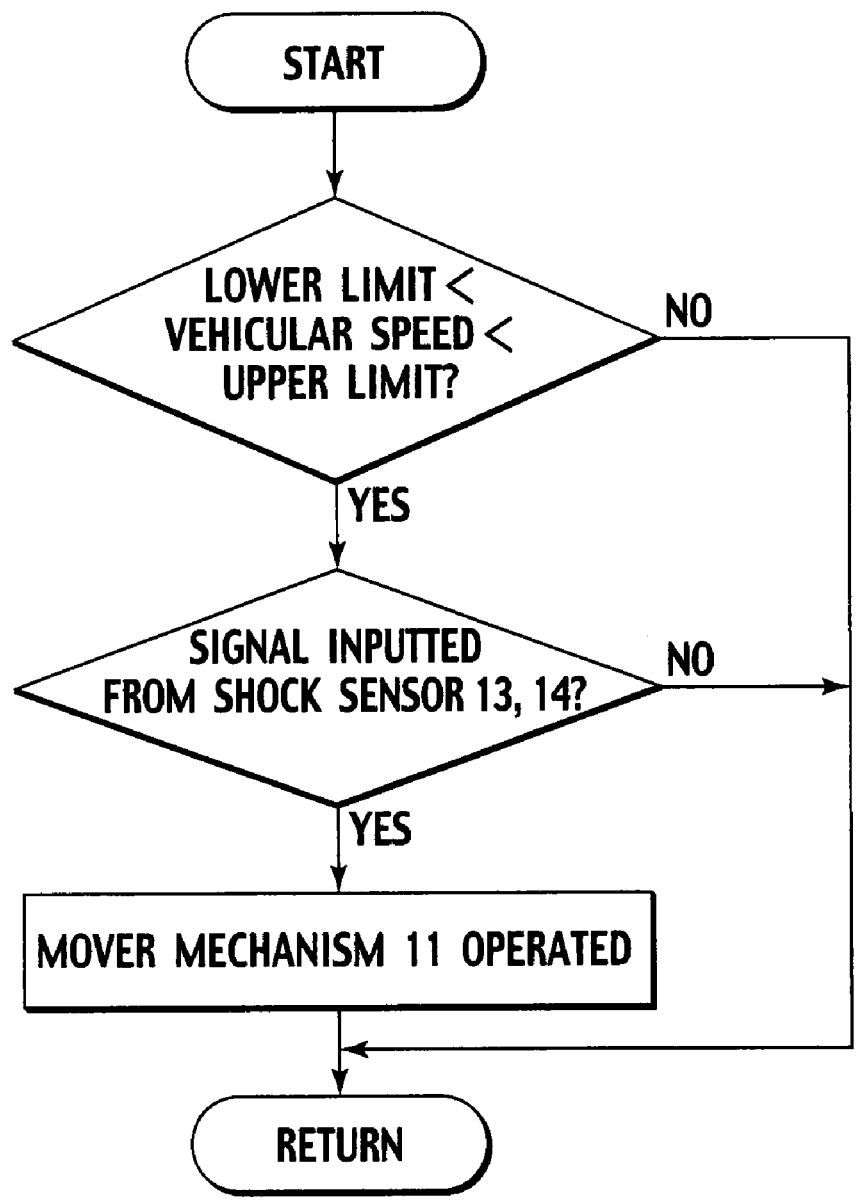
FIG. 6 shows a flow chart of the control system in FIG. 2, according to the common embodiment.
Figure 7A:
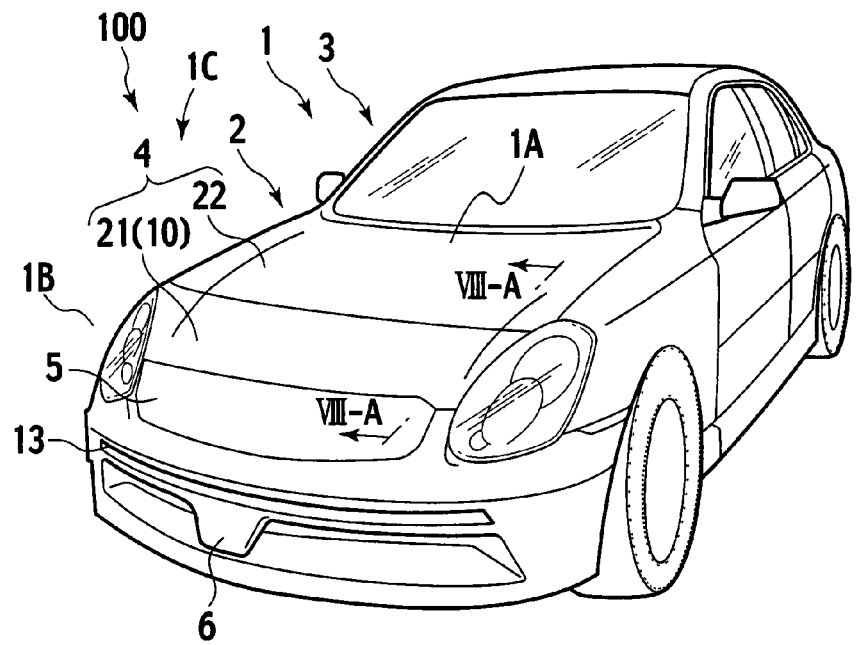
FIG. 7A and FIG. 7B each are a perspective view of a vehicular body, according to a first embodiment.
Figure 7B:
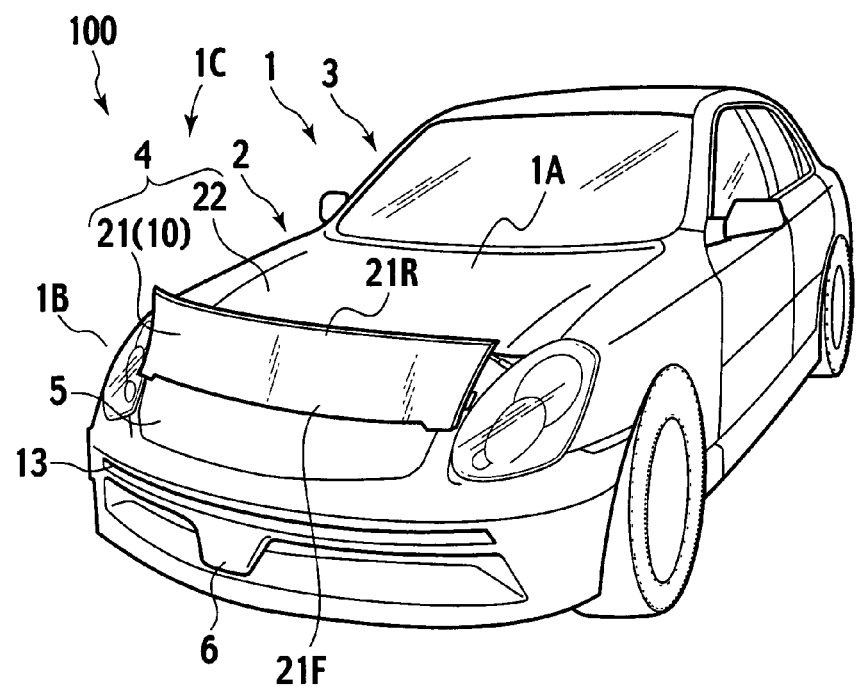
Figure 8A:
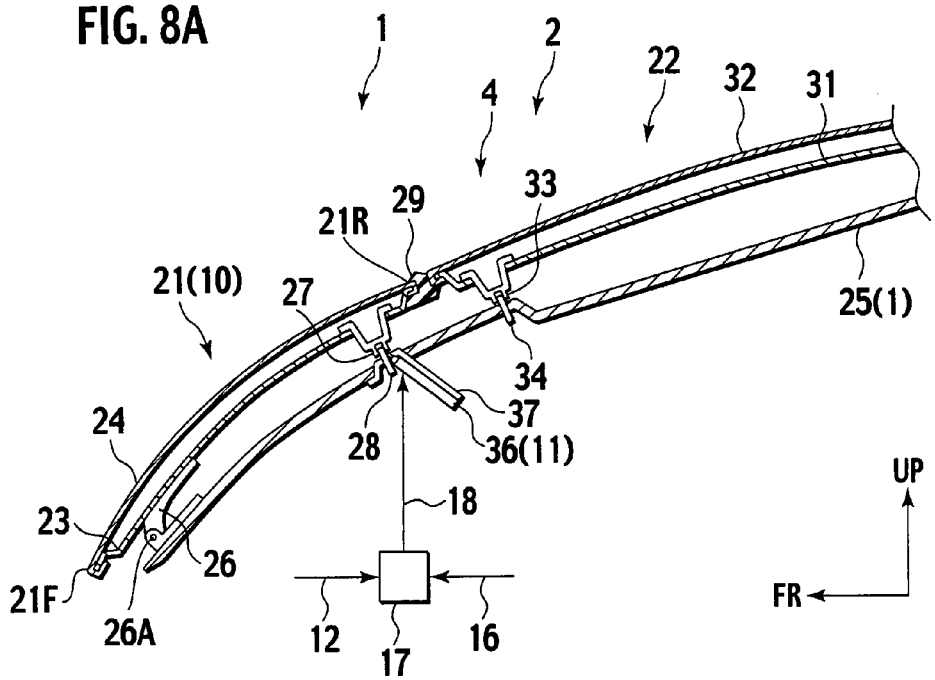
FIG. 8A (taken along the lines VIII-A in FIG. 7A) and FIG. 8B each are a partial side cross sectional view, according to the first embodiment.
Figure 8B:
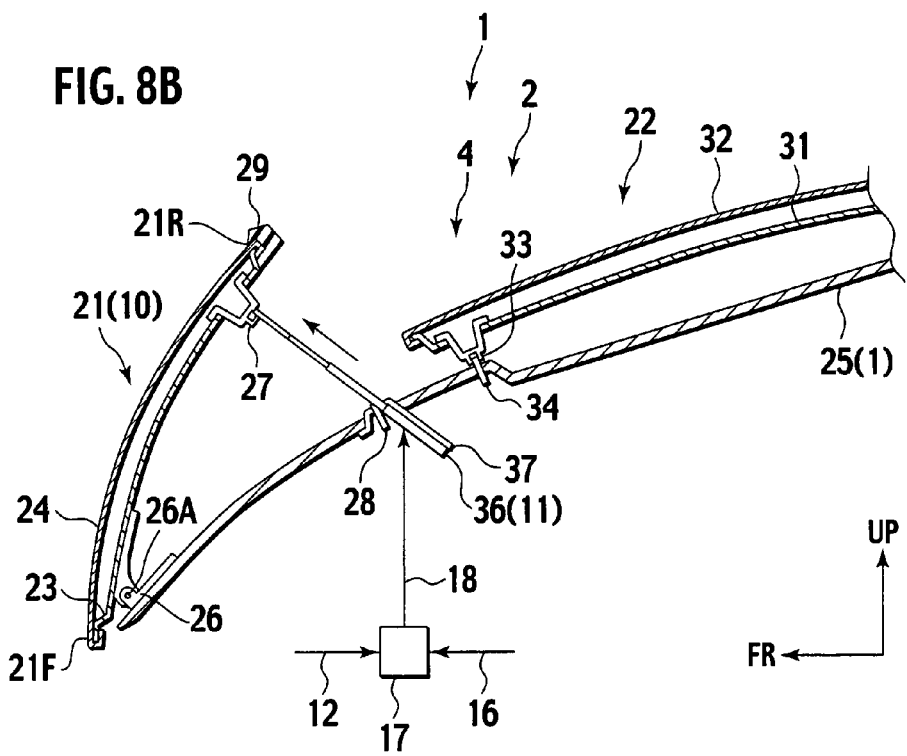
Figure 9:
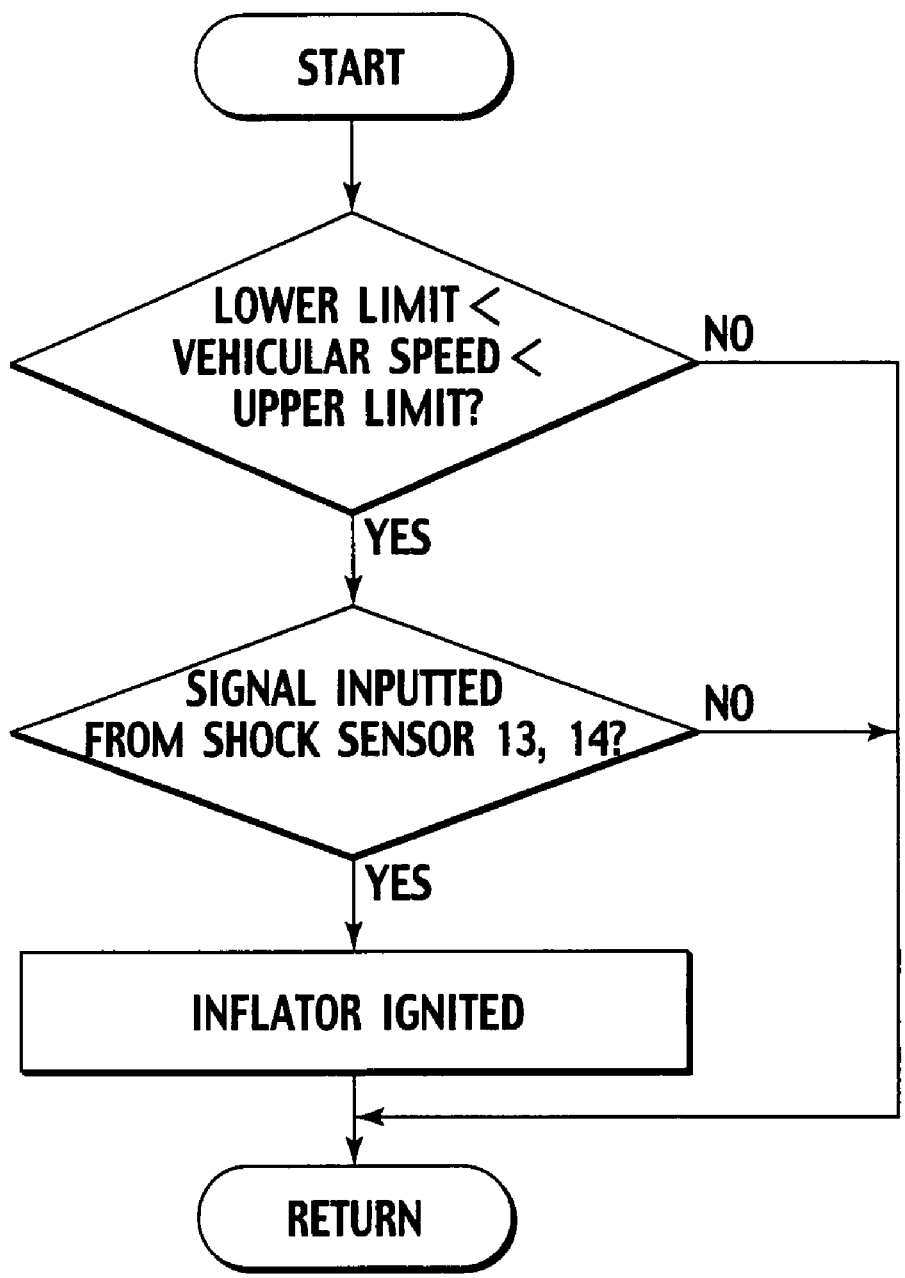
FIG. 9 shows a flow chart of a control system, according to the first embodiment.
Figure 10A:
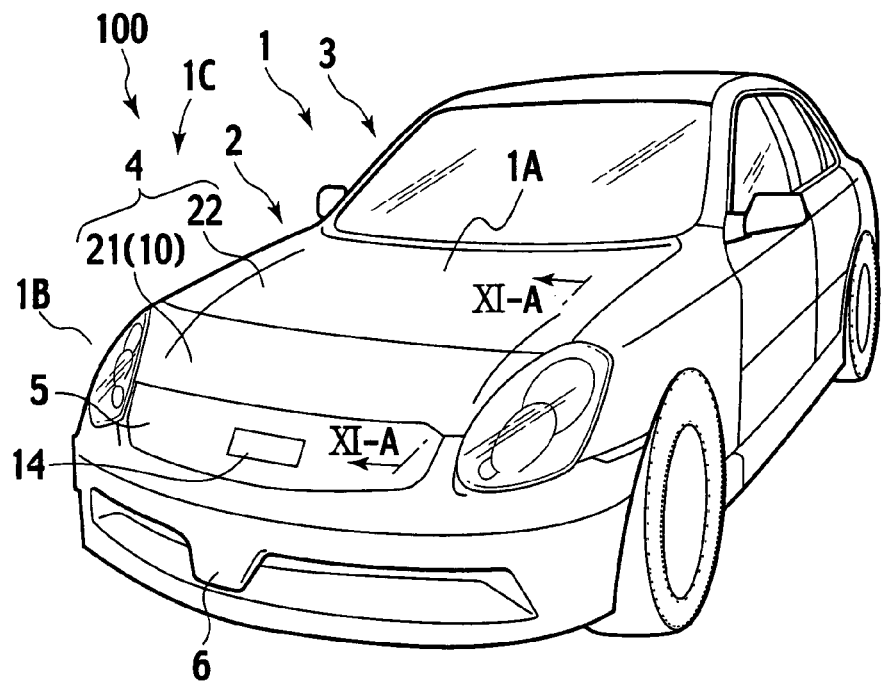
FIG. 10A and FIG. 10B each are a perspective view of the vehicular body, according to a second embodiment.
Figure 10B:
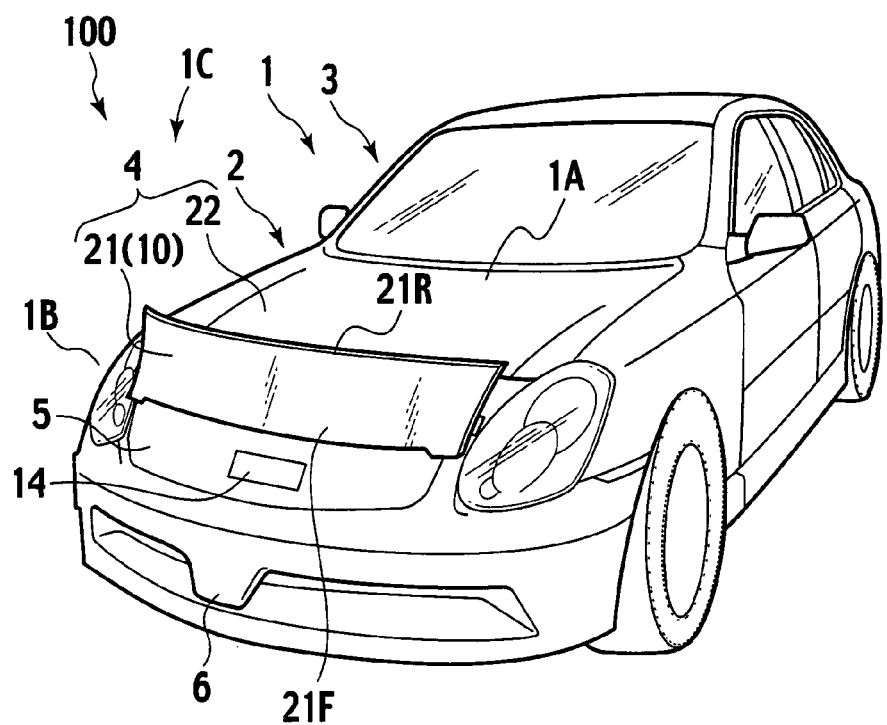
Figure 11A:
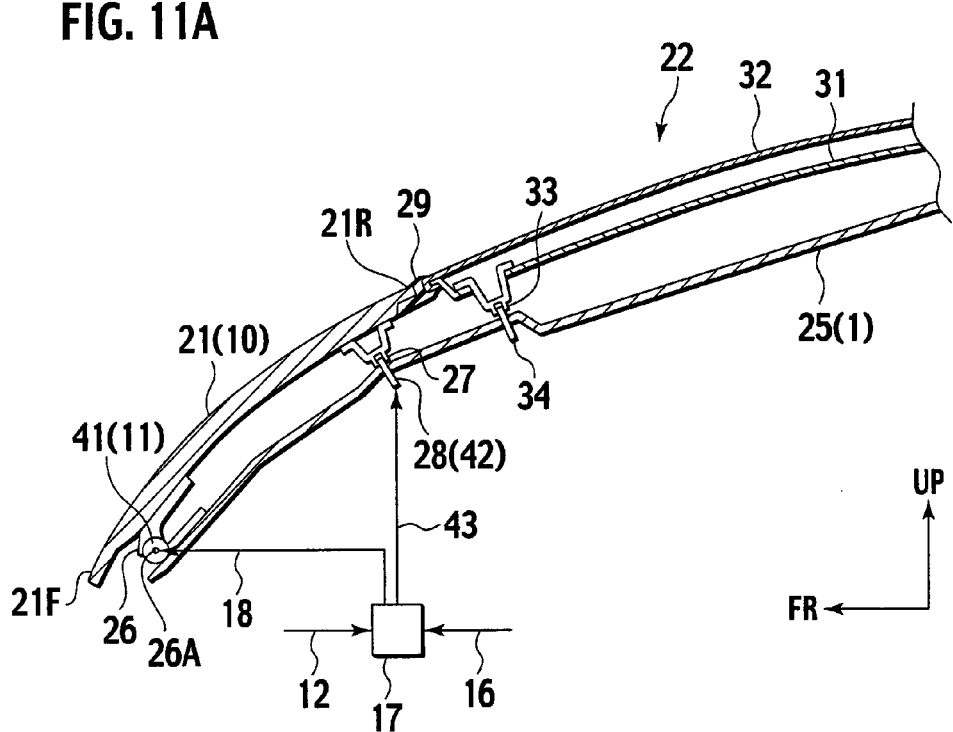
FIG. 11A (taken along the lines XI-A in FIG. 10A) and FIG. 11B each are a partial side cross sectional view, according to the second embodiment.
Figure 11B:
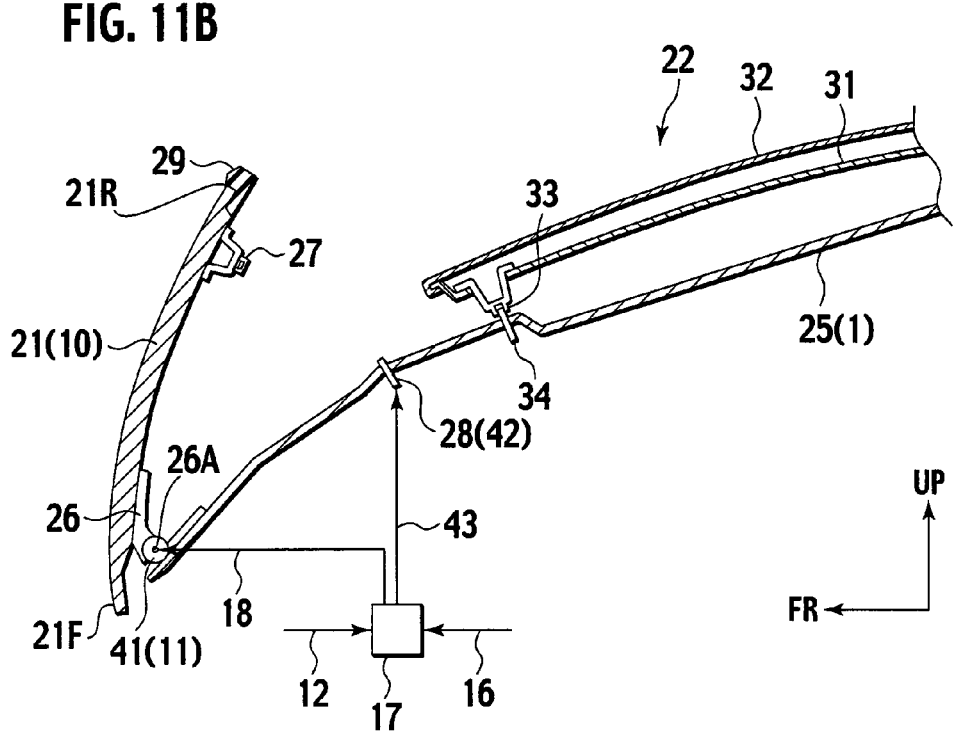
Figure 12:
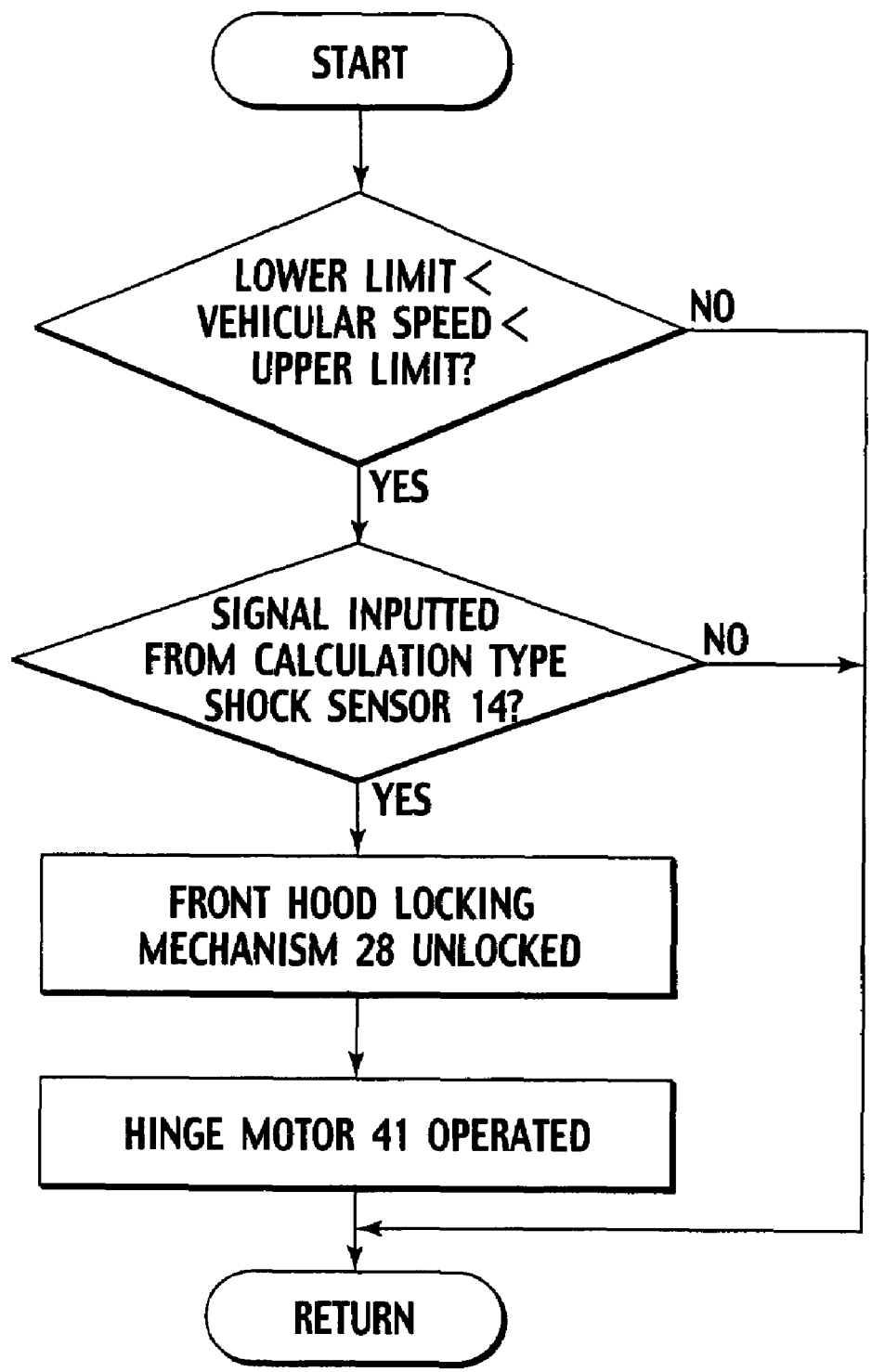
FIG. 12 shows a flow chart of a control system, according to the second embodiment.
Figure 13A:
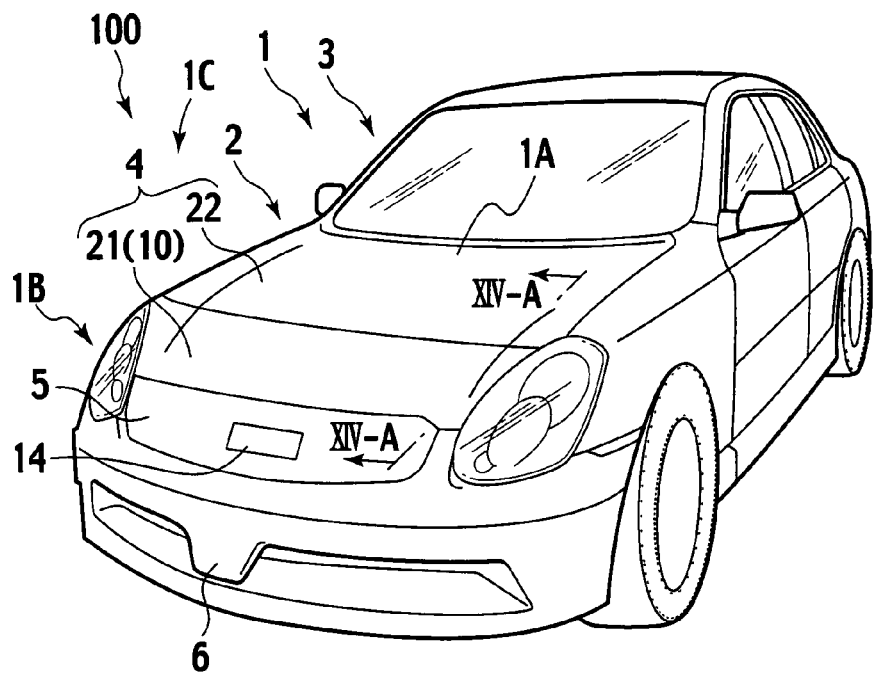
FIG. 13A and FIG. 13B each are a perspective view of the vehicular body, according to a third embodiment.
Figure 13B:
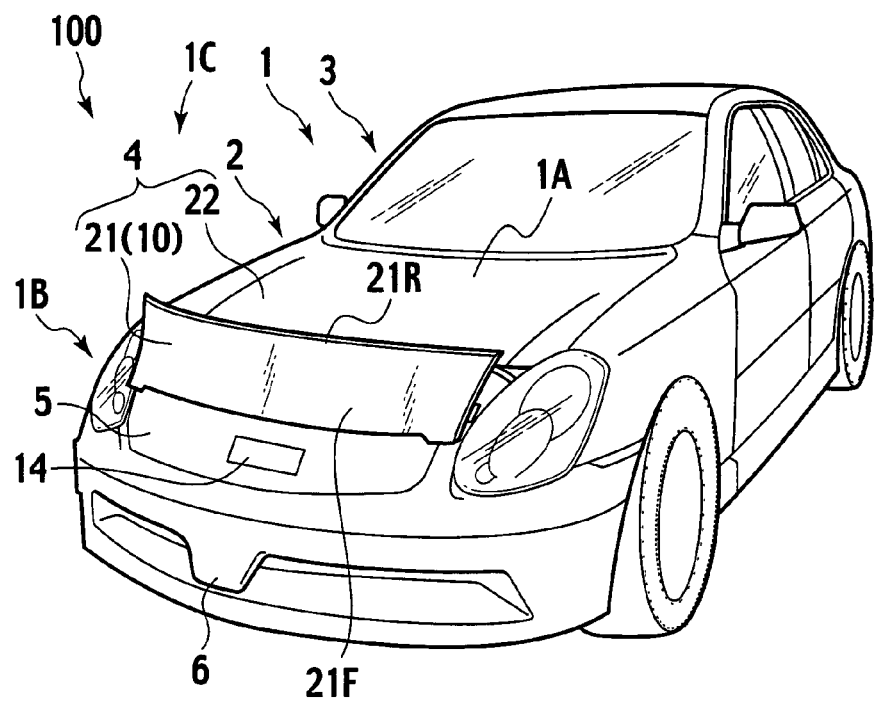
Figure 14A:
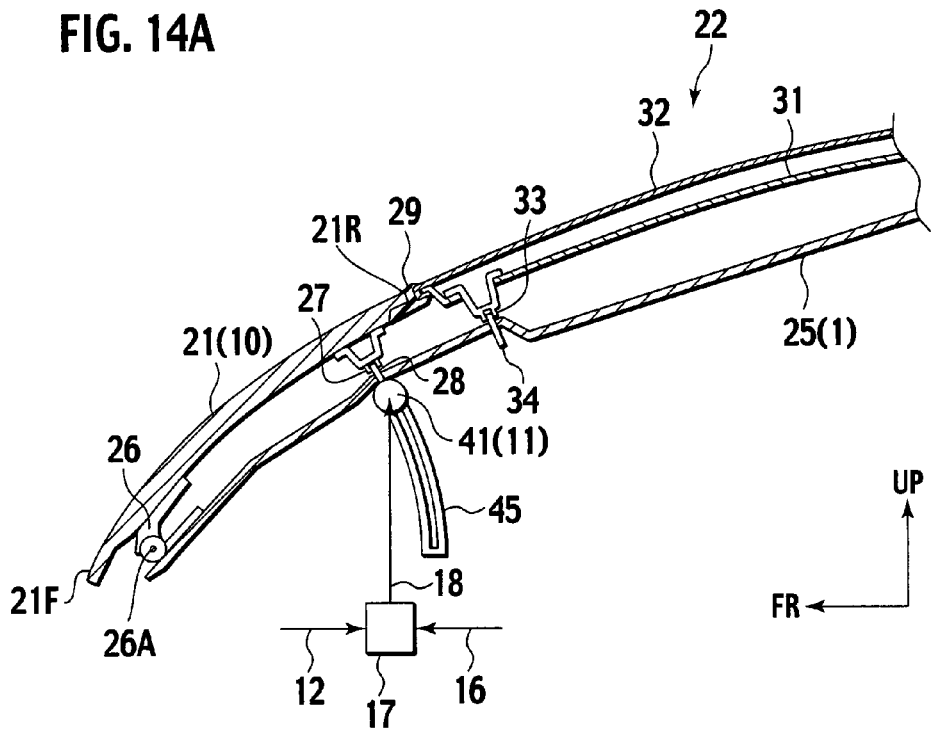
FIG. 14A (taken along the lines XIV-A in FIG. 13A) and FIG. 14B each are a partial side cross sectional view, according to the third embodiment.
Figure 14B:
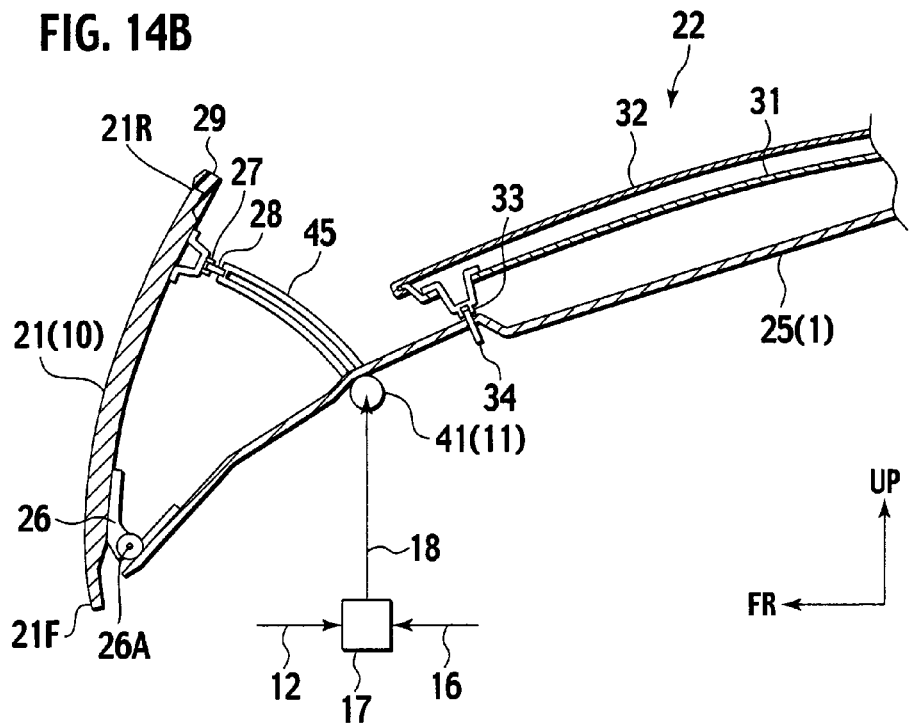

In addition, when the controller 17, which operates the mover mechanism 11 within the certain speed range after receiving the vehicular speed signal 16 from the vehicular speed sensor 15, is disposed between the shock sensors 13, 14 and the mover mechanism 11, the vehicular speed sensor 15 continuously senses the vehicular speed as shown by a flow chart of FIG. 6, to thereby output the vehicular speed signal 16 to the controller 17. With this, based on the vehicular speed sensed or calculated in the collision of the vehicular body 1 with the obstacle A, the controller 17 can control the mover mechanism 11 not to operate in the following occasions:

a high speed collision disabling a completed operation of the reactive force member 10, and a low speed collision causing a small shock energy.

The above description of the common embodiment in terms of operations brought about by the common structure is applicable to all the following first embodiment to tenth embodiment.

First Embodiment

FIG. 7A and FIG. 7B to FIG. 9 show the vehicular body front structure 100, according to a first embodiment of the present invention.

Herein, i) the basic structure of the vehicle and ii) the structure common to all the embodiments (first embodiment to tenth embodiment) which structures i) and ii) have already been set forth in the description of the common embodiment are to be omitted.

When necessary, however, the description of the common embodiment is to be included in the description of the first embodiment.

--Structure Common to from First Embodiment to Seventh Embodiment--

At first, as a specific example of the common embodiment, a structure common to the first embodiment to a seventh embodiment is to be explained.

As shown in FIG. 7A, FIG. 7B, FIG. 8A and FIG. 8B, the hood 4 so mounted to the front part 1C of the vehicular body 1 as to open or close the engine room 2 is divided into a front hood 21 and a rear hood 22. Moreover, the front hood 21 is mounted to the vehicular body 1 in such a configuration that a rear part 21R of the front hood 21 rises or falls around a front part 21F of the front hood 21. With the above configuration, the front hood 21 operates as the reactive force member 10. In addition, the front hood 21 as the reactive force member 10 closes a part (front part) of the engine room 2, thereby serving as a part of the surface 1A of the vehicular body 1, to be received by the vehicular body 1.

Herein, the front hood 21 is made of metal or resin. In the case of the metal, the front hood 21 includes mainly a front hood inner panel 23, a front hood outer panel 24 and the like. In addition, a front part of the front hood inner panel 23 is mounted to a vehicular body panel 25 via front hood hinges 26 on right and left, in such a configuration as to open or close in an upper-lower direction. Moreover, a front hood striker 27 is mounted to a rear part of the front hood inner panel 23, and a front hood locking mechanism 28 is mounted to the vehicular body panel 25's position corresponding to the front hood striker 27. In addition, the front hood outer panel 24 is mounted in such a configuration as to cover an upper face of the front hood inner panel 23. Moreover, a weather strip 29 is mounted along a rear edge part of the front hood outer panel 24.

Meanwhile, the rear hood 22 mainly includes a rear hood inner panel 31, the rear hood outer panel 32 and the like which are made of metal. In addition, a rear part of the rear hood inner panel 31 is mounted to the vehicular body panel 25 via rear hood hinges (not shown) on right and left in such a configuration as to open or close in the upper-lower direction. Moreover, a rear hood striker 33 is mounted to a front part of the rear hood inner panel 31, and a rear hood locking mechanism 34 is mounted to the vehicular body panel 25's position corresponding to the rear hood striker 33. In addition, the rear hood outer panel 32 is mounted in such a configuration as to cover an upper face of the rear hood inner panel 31.

With the structure set forth above, the front hood 21 opens frontward around the front hood hinges 26, moreover, the rear hood 22 which is independent of the front hood 21 opens rearward around the rear hood hinges (not shown). In addition, the front hood hinges 26 has a hinge shaft 26A and the rear hood hinges (not shown) have a hinge shaft (not shown) which shafts extending substantially in a widthwise direction of the vehicle.

--Structure Specific to First Embodiment--

In addition to the structure common to from the first embodiment to the seventh embodiment, the first embodiment has the following specific structure.

Specifically, at first, the first embodiment has a front hood actuator 36 (lift actuator) as the mover mechanism 11. The front hood actuator 36 can extendably move when being ignited by an inflator (not shown) provided in the front hood actuator 36.

In addition, a first end (body side: lower in FIG. 8B) of the front hood actuator 36 is mounted, via an actuator bracket 37, to a position of the front hood locking mechanism 28 in the vehicular body panel 25, and a second end (rod side: upper in FIG. 8B) of the front hood actuator 36 is mounted to the front hood locking mechanism 28 or at least the front hood locking mechanism 28's part engaging the front hood striker 27. In addition, the front hood actuator 36 is disposed in a substantially tangential direction of a circle extending through the front hood striker 27 around the hinge shaft 26A of the front hood hinge 26.

Moreover, the measurement type shock sensor 13 is used which is capable of actually sensing the collision of the vehicular body 1 with the obstacle A, bringing about the sensing signal 12. The shock sensor 13 is mounted to a part of the bumper 6.

In addition, it is so structured that the sensing signal 12 from the shock sensor 13 and the vehicular speed signal 16 from the vehicular speed sensor 15 are inputted to the controller 17, outputting the control signal 18 from the controller 17 to the front hood actuator 36.

--Operations of First Embodiment--

Then, operations of the first embodiment are to be set forth.

The common operations brought about by the structure common to all the embodiments (first embodiment to tenth embodiment) are set forth above, and the above description should be interpreted as to include the description of the first embodiment.

--Operations Common to from First Embodiment to Seventh Embodiment--

Operations brought about by the structure common to from the first embodiment to the seventh embodiment (to be described afterward) are to be set forth. That is, the hood 4 so mounted to the front part 1C of the vehicular body 1 as to open or close the engine room 2 is divided into the front hood 21 and the rear hood 22. Moreover, the front hood 21 is mounted to the vehicular body 1 in such a configuration that the rear part 21R of the front hood 21 rises or falls around the front part 21F of the front hood 21. In addition, the front hood 21 operates as the reactive force member 10. The above structure can decrease vehicular weight, the number of components, cost and the like, compared with another structure including the reactive force member 10 made of a part other than the front hood 21.

--Operations More Specific to First Embodiment--

In addition, more specific operations of the first embodiment are to be set forth hereinafter. That is, continuously sensing the vehicular speed, the vehicular speed sensor 15 outputs the vehicular speed signal 16 to the controller 17, as shown in a flow chart of FIG. 9. In addition, sensing the collision of the vehicular body 1 with the obstacle A, the measurement type shock sensor 13 outputs the sensing signal 12 to the controller 17. With the sensing signal 12 from the shock sensors 13, 14 and the vehicular speed signal 16 from the vehicular speed sensor 15 inputted to the controller 17, the controller 17 makes the following operations:

1) out of the certain speed range: not outputting the control signal 18 to the front hood lift actuator 36, and 2) within the certain speed range (lower limit<vehicular speed<upper limit): outputting the control signal 18 to the front hood actuator 36.

As shown in FIG. 7A, FIG. 7B, FIG. 8A and FIG. 8B, inputting the control signal 18 from the controller 17 to the front hood actuator 36 ignites the inflator (not shown) in the front hood actuator 36, allowing the front hood actuator 36 to move extendably and pushing the rear part 21R of the front hood 21 from the lower part, to thereby rotate the front hood 21 frontward of the vehicle around the hinge shaft 26A of the front hood hinge 26. Being stopped with the front hood actuator 36 at the maximum extension, the front hood 21 can be disposed in the certain position. With this, the upper end part (rear part 21R) of the front hood 21 is elevated, transferring the contact C upward, thus causing the smaller rotary radius r from the apex part B of the obstacle A to the contact C of the upper end part of the front hood 21, correspondingly decreasing the shock energy to the rear hood 22.

In addition, the operations of the front hood actuator 36 as the mover mechanism 11 according to the first embodiment are to be set forth hereinafter. That is, the front hood actuator 36 capable of extendably moving by means of the ignition of the inflator (not shown) can dispose the reactive force member 10 in the certain position in a short time, thus an upper limit of the speed range can be set high. Moreover, the front hood actuator 36 in the maximum extended state applies a tensional load to the vehicular body panel 25, thereby stopping the reactive force member 10, thus assuredly disposing the reactive force member 10 in the certain position. Moreover, with an excessively large reactive force applied to the reactive force member 10, a shaft deformation caused to the front hood actuator 36 by the excessively large reactive force can further absorb the reactive force.

Second Embodiment

FIG. 10A and FIG. 10B to FIG. 12 show the vehicular body front structure 100, according to a second embodiment of the present invention.

Herein, i) the basic structure of the vehicle and ii) the structure common to all the embodiments (first embodiment to tenth embodiment) which structures i) and ii) have already been set forth in the description of the common embodiment are to be omitted.

Furthermore, the structure common to from the first embodiment to the seventh embodiment (to be described afterward) which structure has already been set forth in the description of the first embodiment is also to be omitted.

When necessary, however, the above descriptions are to be included in the description of the second embodiment.

Even otherwise, structural elements having the same reference numerals as those according to each of the prior embodiments are, however, to be interpreted as the same or equivalents thereof, and the description of the structural elements is to be interpreted as the one according to the second embodiment.

--Structure Specific to Second Embodiment--

In addition to the structure common to from the first embodiment to the seventh embodiment, the second embodiment has the following specific structure.

Specifically, at first, according to the second embodiment, the front hood 21 is made of resin. Instead of having the front hood inner panel 23 and the front hood outer panel 24, the front hood 21 is one member. The front hood 21 is mounted to the vehicular body panel 25 via the front hood hinges 26 on right and left, in such a configuration that the front part 21F of the front hood 21 opens and closes in the upper-lower direction. Moreover, the front hood striker 27 is mounted to the rear part 21R of the front hood 21, and the front hood locking mechanism 28 is mounted to the vehicular body panel 25's position corresponding to the front hood striker 27. Moreover, the weather strip 29 is mounted along a rear edge part of the front hood 21.

In addition, there is provided a front hood-moving motor actuator 41 (motor actuator) as the mover mechanism 11. The front hood-moving motor actuator 41 has an output shaft coupled with the hinge shaft 26A of the front hood hinge 26 directly, or indirectly via a decelerating mechanism (not shown) and the like. In addition, the front hood-moving motor actuator 41 can be position-controlled.

With this, the front hood locking mechanism 28 includes an automatic unlocking mechanism 42.

Moreover, the calculation type shock sensor 14 is used which is capable of calculating the collision of the vehicular body 1 with the obstacle A, bringing about the sensing signal 12. The calculation type shock sensor 14 is mounted to a center part of the grille 5.

In addition, it is so structured that the sensing signal 12 from the calculation type shock sensor 14 and the vehicular speed signal 16 from the vehicular speed sensor 15 are inputted to the controller 17, outputting the control signal 18 from the controller 17 to the front hood-moving motor actuator 41.

Moreover, substantially simultaneously with the outputting of the control signal 18 to the mover mechanism 11 (i.e., front hood-moving motor actuator 41), the controller 17 outputs an unlocking signal 43 to the automatic unlocking mechanism 42 of the front hood locking mechanism 28.

--Operations of Second Embodiment--

Then, operations of the second embodiment are to be set forth.

Herein, the operations brought about by i) the basic structure of the vehicle and ii) the structure common to all the embodiments (first embodiment to tenth embodiment) which operations have already been set forth in the description of the common embodiment are to be omitted.

Furthermore, the operations brought about by the structure common to from the first embodiment to the seventh embodiment (to be described afterward) which operations have already been set forth in the description of the first embodiment are to be omitted.

When necessary, however, the above descriptions are to be interpreted as the description of the second embodiment.

Even otherwise, operations brought about by the structural elements having the same reference numerals as those according to each of the prior embodiments are, however, to be interpreted as the same or equivalents thereof, and the description of the above operations is to be interpreted as the one according to the second embodiment.

--Operations More Specific to Second Embodiment--

More specific operations of the second embodiment are to be set forth hereinafter. That is, continuously sensing the vehicular speed, the vehicular speed sensor 15 outputs the vehicular speed signal 16 to the controller 17, as shown in a flow chart of FIG. 12. In addition, calculating the collision of the vehicular body 1 with the obstacle A, the calculation type shock sensor 14 outputs the sensing signal 12 to the controller 17. With the sensing signal 12 from the shock sensor 14 and the vehicular speed signal 16 from the vehicular speed sensor 15 inputted to the controller 17, the controller 17 makes the following operations:

1) out of the certain speed range: not outputting the control signal 18 to the front hood-moving motor actuator 41, and 2) within the certain speed range (lower limit<vehicular speed<upper limit): outputting the unlocking signal 43 to the automatic unlocking mechanism 42 of the front hood locking mechanism 28 for unlocking, then, outputting the control signal 18 to the front hood-moving motor actuator 41 (hinge motor) connected to the hinge shaft 26A of the front hood hinge 26.

As shown in FIG. 10A, FIG. 10B, FIG. 11A and FIG. 11B, receiving the control signal 18 from the controller 17, the front hood-moving motor actuator 41 is driven in such a manner as to be position-controlled, thus directly rotating the hinge shaft 26A of the front hood hinge 26, to thereby rotate the front hood 21 frontward of the vehicle. As a result of the position-controlling by the front hood-moving motor actuator 41, the front hood 21 can be disposed in the certain position. With this, the upper end part (rear part 21R) of the front hood 21 is elevated, transferring the contact C upward, thus causing the smaller rotary radius r from the apex part B of the obstacle A to the contact C of the upper end part of the front hood 21, correspondingly decreasing the shock energy to the rear hood 22.

In addition, the operations of the front hood-moving motor actuator 41 as the mover mechanism 11 according to the second embodiment are to be set forth hereinafter. That is, position-controlling the front hood-moving motor actuator 41 can assuredly dispose the reactive force member 10 (in this case, the front hood 21) in the certain position. Moreover, with an excessively large reactive force applied to the reactive force member 10, reducing the excessively large reactive force to an electric energy as a regenerating force of the front hood-moving motor actuator 41 can further absorb the reactive force. In addition, reversely operating the front hood-moving motor actuator 41 when the collision is not caused in a certain time after the calculating can automatically dispose again the reactive force member 10 in the original position for resetting. With this, the system performance can be kept and recovered without changing components.

In addition, the operations when using the calculation type shock sensor 14 are as set forth above.

Third Embodiment

FIG. 13A and FIG. 13B to FIG. 16 show the vehicular body front structure 100, according to a third embodiment of the present invention.

Herein, i) the basic structure of the vehicle and ii) the structure common to all the embodiments (first embodiment to tenth embodiment) which structures i) and ii) have already been set forth in the description of the common embodiment are to be omitted.

Furthermore, the structure common to from the first embodiment to the seventh embodiment (to be described afterward) which structure has already been set forth in the description of the first embodiment is also to be omitted.

When necessary, however, the above descriptions are to be interpreted as the description of the third embodiment.

Even otherwise, the structural elements having the same reference numerals as those according to each of the prior embodiments are, however, to be interpreted as the same or equivalents thereof, and the description of the structural elements is to be interpreted as the one according to the third embodiment.

--Structure Specific to Third Embodiment--

In addition to the structure common to from the first embodiment to the seventh embodiment, the third embodiment has the following specific structure.

Figure 15:
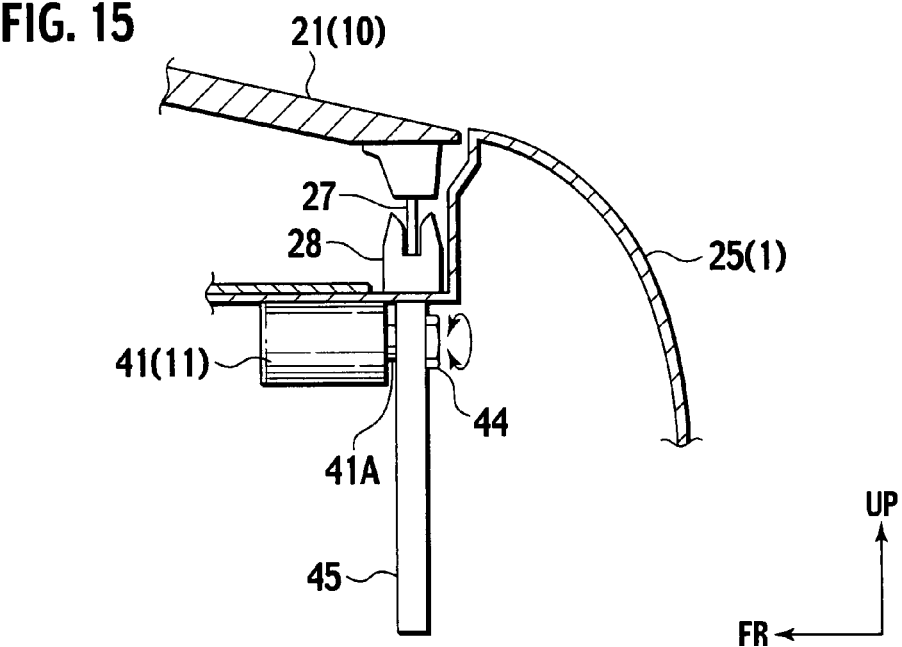
FIG. 15 is a cross sectional view of a front hood lift guide rail viewed from a front, according to the third embodiment.
Figure 16:
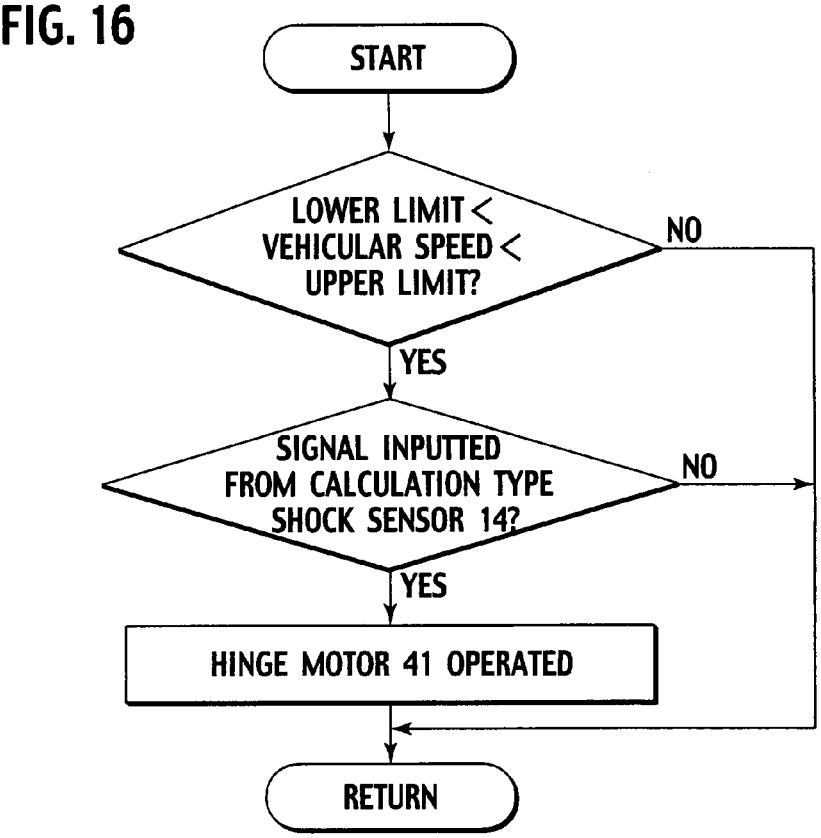
FIG. 16 shows a flow chart of a control system, according to the third embodiment.

Specifically, at first, the third embodiment discloses a structure substantially like the one according to the second embodiment, with the following main difference from the second embodiment:

As shown in FIG. 15, an output shaft 41A of the front hood-moving motor actuator 41 (motor actuator) as the mover mechanism 11 is connected, via a gear 44, to the front hood lift guide rail 45 mounted to the front hood locking mechanism 28.

Herein, the front hood lift guide rail 45 is a rack member formed into substantially an arc around the hinge shaft 26A of the front hood hinge 26.

With this, the front hood locking mechanism 28 is free from the automatic unlocking mechanism 42. Thereby, the controller 17 is so configured as not to output the unlocking signal 43 to the automatic unlocking mechanism 42 of the front hood locking mechanism 28.

--Operations of Third Embodiment--

Then, operations of the third embodiment are to be set forth.

Herein, the operations brought about by i) the basic structure of the vehicle and ii) the structure common to all the embodiments (first embodiment to tenth embodiment) which operations have already been set forth in the description of the common embodiment are to be omitted.

Furthermore, the operations brought about by the structure common to from the first embodiment to the seventh embodiment (to be described afterward) which operations have already been set forth in the description of the first embodiment are to be omitted.

When necessary, however, the above descriptions are to be interpreted as the description of the third embodiment.

Even otherwise, operations brought about by the structural elements having the same reference numerals as those according to each of the prior embodiments are, however, to be interpreted as the same or equivalents thereof, and the description of the above operations is to be interpreted as the one according to the third embodiment.

--Operations More Specific to Third Embodiment--

More specific operations of the third embodiment are to be set forth hereinafter. That is, continuously sensing the vehicular speed, the vehicular speed sensor 15 outputs the vehicular speed signal 16 to the controller 17, as shown in a flow chart of FIG. 16. In addition, calculating the collision of the vehicular body 1 with the obstacle A, the calculation type shock sensor 14 outputs the sensing signal 12 to the controller 17. With the sensing signal 12 from the shock sensor 14 and the vehicular speed signal 16 from the vehicular speed sensor 15 inputted to the controller 17, the controller 17 makes the following operations:

1) out of the certain speed range: not outputting the control signal 18 to the front hood-moving motor actuator 41, and 2) within the certain speed range (lower limit<vehicular speed<upper limit): outputting the control signal 18 to the front hood-moving motor actuator 41.

As shown in FIG. 13A, FIG. 13B, FIG. 14A and FIG. 14B, receiving the control signal 18 from the controller 17, the front hood-moving motor actuator 41 is driven in such a manner as to be position-controlled, thus moving the rear part 21R of the front hood 21 via the gear 44 and the front hood lift guide rail 45, to thereby rotate the front hood 21 frontward of the vehicle around the hinge shaft 26A of the front hood hinge 26. As a result of the position-controlling by the front hood-moving motor actuator 41, the front hood 21 is disposed in the certain position. With this, the upper end part (rear part 21 R) of the front hood 21 is elevated, transferring the contact C upward, thus causing the smaller rotary radius r from the apex part B of the obstacle A to the contact C of the upper end part of the front hood 21, correspondingly decreasing the shock energy to the rear hood 22.

In addition, the operations of the front hood-moving motor actuator 41 as the mover mechanism 11 are as set forth above.

In addition, the operations when using the calculation type shock sensor 14 are as set forth above.

Fourth Embodiment

FIG. 17A and FIG. 17B to FIG. 19 show the vehicular body front structure 100, according to a fourth embodiment of the present invention.

Herein, i) the basic structure of the vehicle and ii) the structure common to all the embodiments (first embodiment to tenth embodiment) which structures i) and ii) have already been set forth in the description of the common embodiment are to be omitted.

Furthermore, the structure common to from the first embodiment to the seventh embodiment (to be described afterward) which structure has already been set forth in the description of the first embodiment is also to be omitted.

When necessary, however, the above descriptions are to be interpreted as the description of the fourth embodiment.

Even otherwise, the structural elements having the same reference numerals as those according to each of the prior embodiments are, however, to be interpreted as the same or equivalents thereof, and the description of the structural elements is to be interpreted as the one according to the fourth embodiment.

--Structure Specific to Fourth Embodiment--

In addition to the structure common to from the first embodiment to the seventh embodiment, the fourth embodiment has the following specific structure.

That is, the fourth embodiment has both of the calculation type shock sensor 14 and the measurement type shock sensor 13, and two of the mover mechanisms 11. At first, the sensing signal 12 from the calculation type shock sensor 14 allows the reactive force member 10 to protrude to an intermediate position, and then the sensing signal 12 from the measurement type shock sensor 13 allows the reactive force member 10 to protrude to the final position, implementing two-step operations. Herein, the number of mover mechanisms 11 may be one provided that only one number thereof should implement the two-step operations.

For the above object, the fourth embodiment based on the structure according to the third embodiment is added by the measurement type shock sensor 13 set forth according to the first embodiment.

Moreover, the front hood-moving motor actuator 41 according to the third embodiment operates as the mover mechanism 11 for the first step, while an engine driving force takeout device 56 is added which operates as the mover mechanism 11 for the second step. Specifically, the engine driving force takeout device 56 takes out a driving force from a driving shaft of a belt 52 via a driving force transmitting mechanism 53, a decelerator 54 and a driving shaft 55, where the belt 52 disposed outside the engine 51 continuously rotates when the engine 51 is being driven. In addition, the driving shaft 55 is coupled between the hinge shafts 26A of the front hood hinges 26 on right and left.

In addition, it is so structured that, with the vehicular speed signal 16 from the vehicular speed sensor 15 and the sensing signal 12 (12*a*) from the calculation type shock sensor 14 inputted to the controller 17, the controller 17 outputs the control signal 18 (18*a*) to the mover mechanism 11 for the first step, thereby operating the mover mechanism 11 for the first step. Then, with the sensing signal 12 (12*b*) inputted from the measurement type shock sensor 13 to the controller 17, the controller 17 outputs the control signal 18 (18*b*) to the driving force transmitting mechanism 53 of the engine driving force takeout device 56 as the mover mechanism 11 for the second step, thereby operating the mover mechanism 11 for the second step.

--Operations of Fourth Embodiment--

Then, operations of the fourth embodiment are to be set forth.

Herein, the operations brought about by i) the basic structure of the vehicle and ii) the structure common to all the embodiments (first embodiment to tenth embodiment) which operations have already been set forth in the description of the common embodiment are to be omitted.

Furthermore, the operations brought about by the structure common to from the first embodiment to the seventh embodiment (to be described afterward) which operations have already been set forth in the description of the first embodiment are to be omitted.

When necessary, however, the above descriptions are to be interpreted as the description of the fourth embodiment.

Even otherwise, operations brought about by the structural elements having the same reference numerals as those according to each of the prior embodiments are, however, to be interpreted as the same or equivalents thereof, and the description of the above operations is to be interpreted as the one according to the fourth embodiment.

According to the fourth embodiment having the structure bringing about the two-step operations, at first, at the first step, the sensing signal 12a from the calculation type shock sensor 14 allows the reactive force member 10 to protrude to the intermediate position. Then, at the second step, the sensing signal 12b from the measurement type shock sensor 13b allows the reactive force member 10 to protrude to the final position.

With this, allowing the reactive force member 10 to protrude in advance to the intermediate position when the collision is calculated can suppress moving amount of the reactive force member 10 which amount is necessary for the first step and second step, thus completing the operation in short time. Moreover, the operating speed can be decreased, thus making the two mover mechanisms 11 (i.e., front hood-moving motor actuator 41 and engine driving force takeout device 56) smaller in size, capacity and price.

Moreover, the completed operation absent before the collision can minimize an influence on a driver's visibility when the collision is not caused.

In addition, reversely operating the two mover mechanisms 11 when the collision is not caused in the certain time after the calculating can automatically dispose again the reactive force member 10 in the original position for resetting. With this, the system performance can be kept and recovered without changing components.

--Operations More Specific to Fourth Embodiment--

More specific operations of the fourth embodiment are to be set forth hereinafter. That is, continuously sensing the vehicular speed, the vehicular speed sensor 15 outputs the vehicular speed signal 16 to the controller 17, as shown in a flow chart of FIG. 19. In addition, calculating the collision of the vehicular body 1 with the obstacle A, the calculation type shock sensor 14 outputs the sensing signal 12a to the controller 17. With the sensing signal 12a from the shock sensor 14 and the vehicular speed signal 16 from the vehicular speed sensor 15 inputted to the controller 17, the controller 17 makes the following operations:

1) out of the certain speed range: not outputting the control signal 18a to the front hood-moving motor actuator 41, and 2) within the certain speed range (lower limit<vehicular speed<upper limit): outputting the control signal 18a to the front hood-moving motor actuator 41.

Figure 18A:
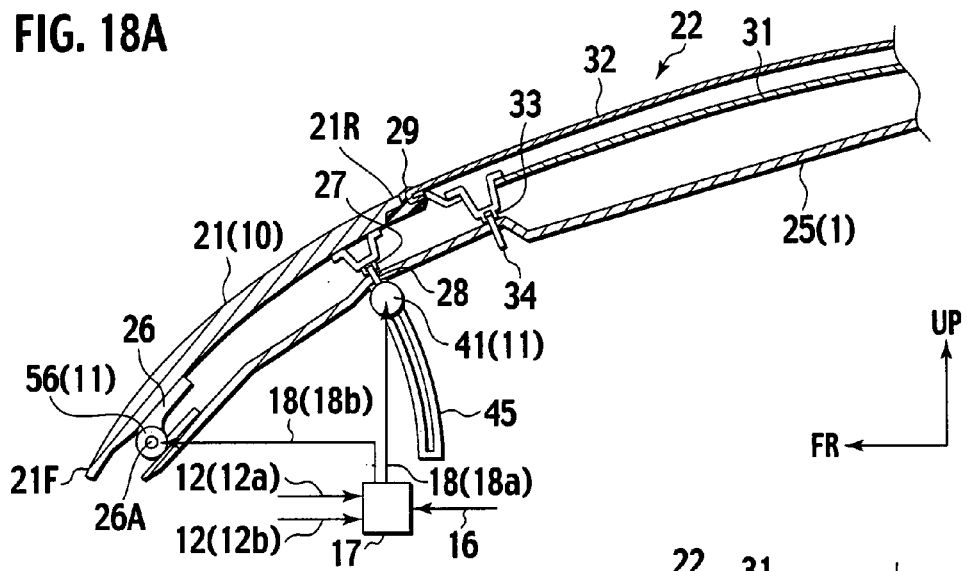
FIG. 18A (taken along the lines XVIII-A in FIG. 17A), FIGS. 18B and FIG. 18C each are a partial side cross sectional view, according to the fourth embodiment.
Figure 18B:
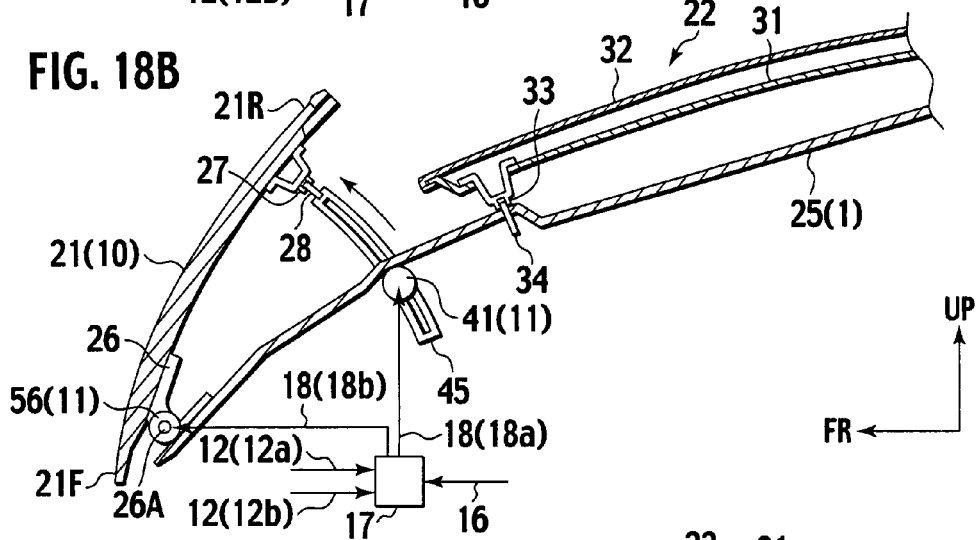

As shown in FIG. 18B, receiving the control signal 18a from the controller 17, the front hood-moving motor actuator 41 is driven in such a manner as to be position-controlled, thus moving the rear part 21R of the front hood 21 via the gear 44 and the front hood lift guide rail 45, to thereby rotate the front hood 21 frontward of the vehicle around the hinge shaft 26A of the front hood hinge 26. As a result of the position-controlling by the front hood-moving motor actuator 41, the front hood 21 is disposed in the certain intermediate position With the collision actually caused thereafter, the measurement type shock sensor 13 senses the collision of the vehicular body 1 with the obstacle A, to thereafter output the sensing signal 12b to the controller 17, as shown in a flow chart of FIG. 19. With the sensing signal 12b from the measurement type shock sensor 13b inputted to the controller 17, the controller 17 makes the following operations:

1) out of the certain speed range: not outputting the control signal 18b to the engine driving force takeout device 56 as the mover mechanism 11 for the second step, and 2) within the certain speed range (lower limit<vehicular speed<upper limit): outputting the control signal 18b to the engine driving force takeout device 56 as the mover mechanism 11 for the second step.

Figure 17A:
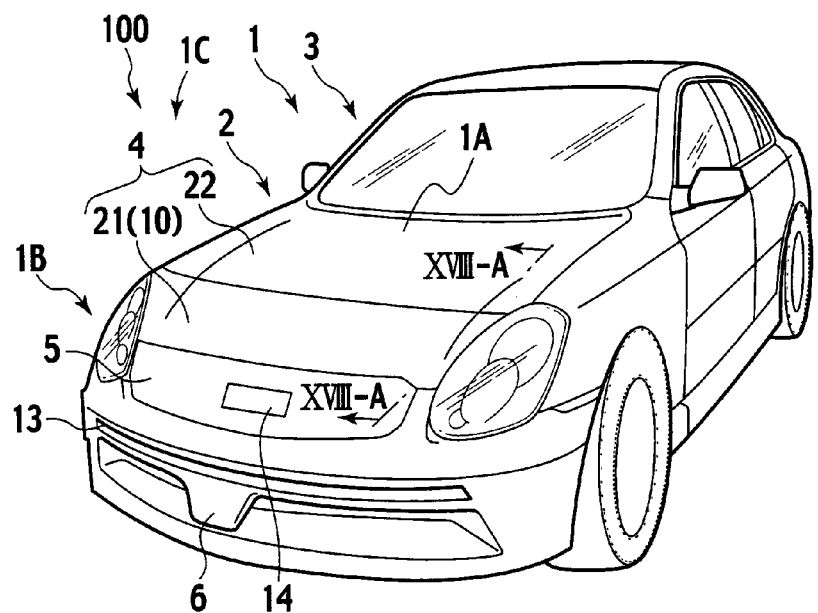
FIG. 17A is a perspective view of the vehicular body and FIG. 17B is a schematic plan view of a front part of the vehicle, according to a fourth embodiment.
Figure 17B:
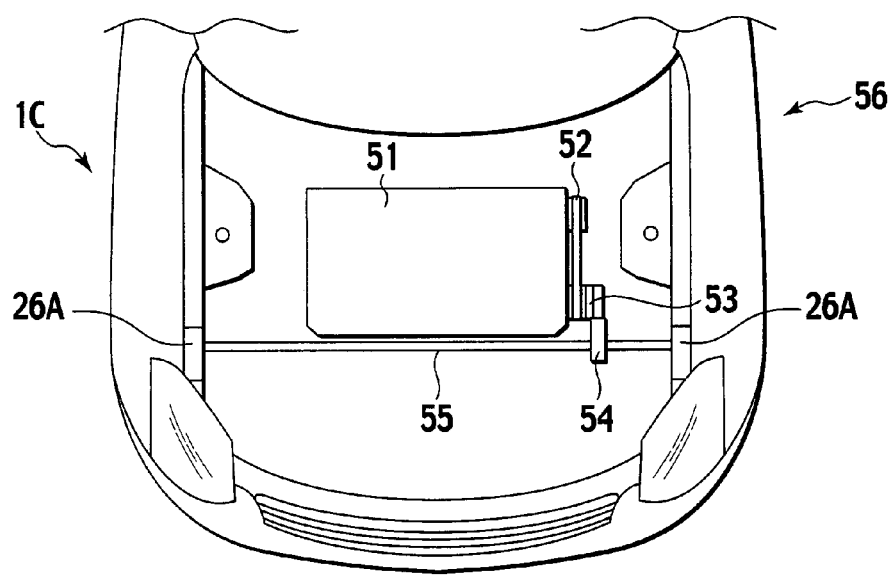
Figure 18C:
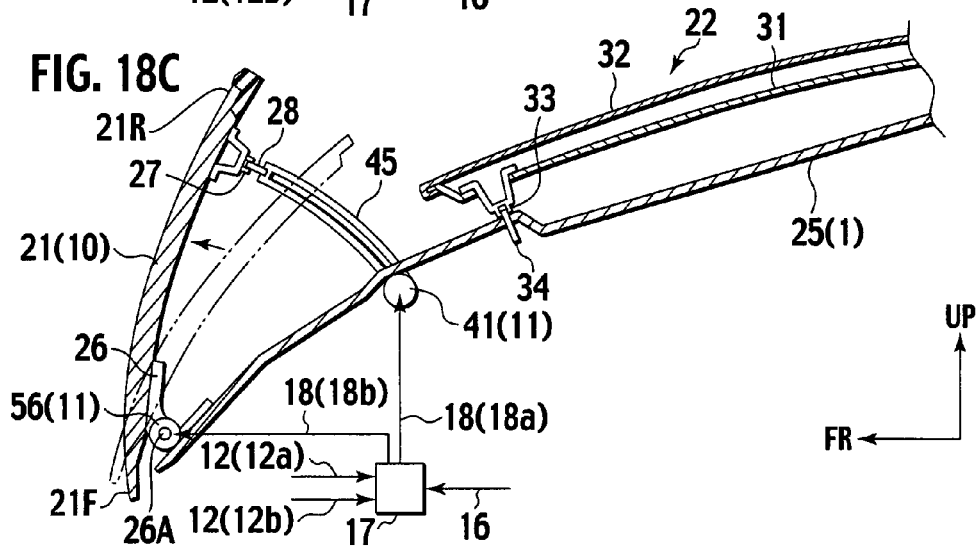
Figure 19:
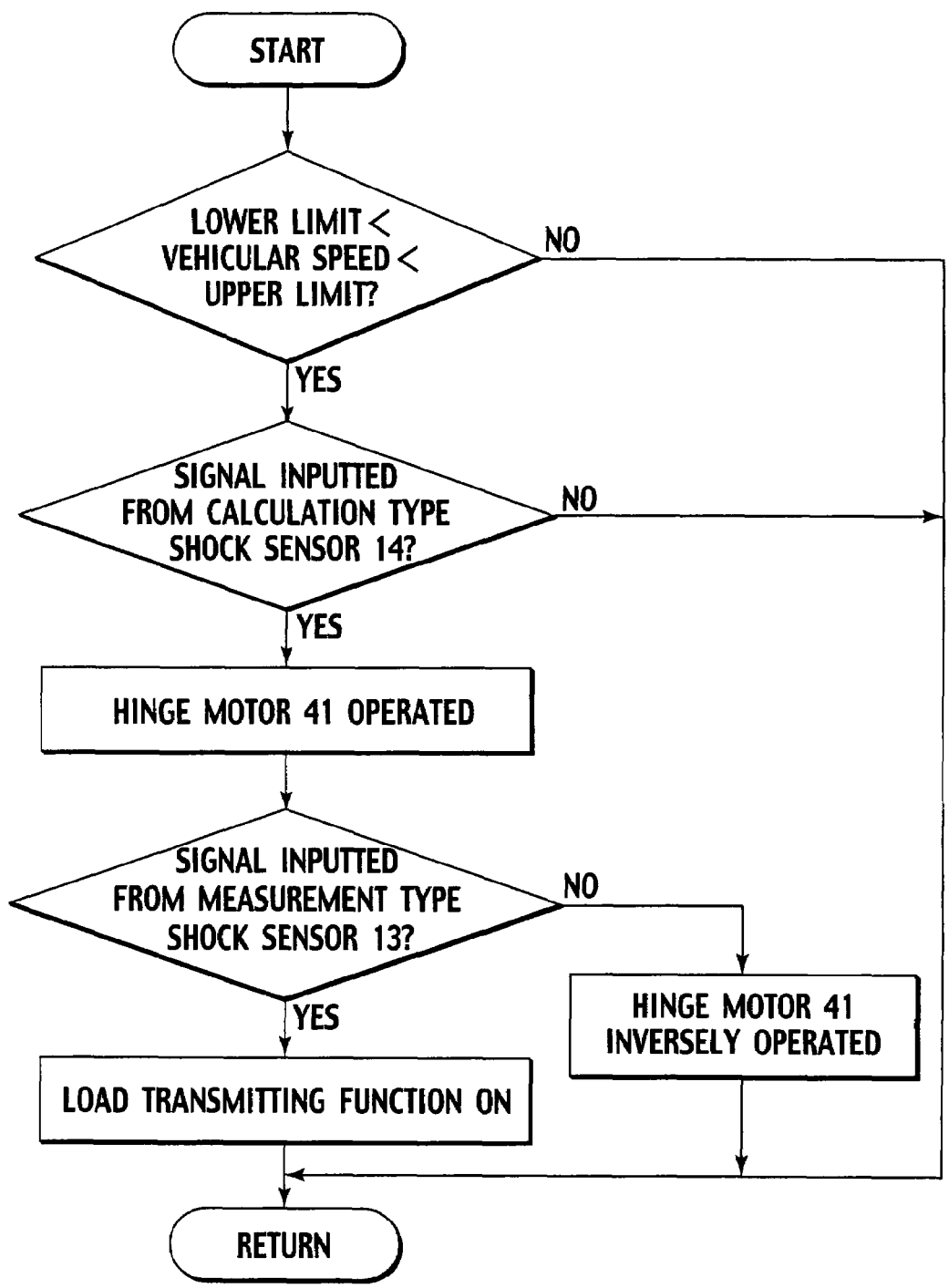
FIG. 19 shows a flow chart of a control system, according to the fourth embodiment.

As shown in FIG. 17B and FIG. 18C, receiving the control signal 18b from the controller 17, the driving force transmitting mechanism 53 of the engine driving force takeout device 56 as the mover mechanism 11 for the second step connects the driving shaft of the belt 52 directly with the decelerator 51. As a result, the driving force of the engine 51 is transmitted to the hinge shaft 26A of each of the front hood hinges 26 on right and left via the driving shaft 55, thus directly rotating the hinge shaft 26A of the front hood hinge 26, to thereby rotate the front hood 21 frontward of the vehicle to a limit operation length of the front hood lift guide rail 45. As a result, the front hood 21 is disposed in a certain final position. With this, the upper end part (rear part 21R) of the front hood 21 is elevated, transferring the contact C upward, thus causing the smaller rotary radius r from the apex part B of the obstacle A to the contact C of the upper end part of the front hood 21, correspondingly decreasing the shock energy to the rear hood 22.

The engine driving force takeout device 56 as the mover mechanism 11 can effectively use the driving force of the engine 51 and eliminate the need for providing a special mover mechanism 11.

In addition, the operations when using the front hood-moving motor actuator 41 as the mover mechanism 11 are as set forth above.

Moreover, the operations when using the calculation type shock sensor 14 are as set forth above.

Fifth Embodiment

FIG. 20A and FIG. 20B to FIG. 23 show the vehicular body front structure 100, according to a fifth embodiment of the present invention.

Herein, i) the basic structure of the vehicle and ii) the structure common to all the embodiments (first embodiment to tenth embodiment) which structures i) and ii) have already been set forth in the description of the common embodiment are to be omitted.

Furthermore, the structure common to from the first embodiment to the seventh embodiment (to be described afterward) which structure has already been set forth in the description of the first embodiment is also to be omitted.

When necessary, however, the above descriptions are to be interpreted as the description of the fifth embodiment.

Even otherwise, the structural elements having the same reference numerals as those according to each of the prior embodiments are, however, to be interpreted as the same or equivalents thereof, and the description of the structural elements is to be interpreted as the one according to the fifth embodiment.

--Structure Specific to Fifth Embodiment--

In addition to the structure common to from the first embodiment to the seventh embodiment, the fifth embodiment has the following specific structure.

That is, the fifth embodiment discloses a shock converting mechanism 61 capable of using a collisional force as an assist driving force of the reactive force member 10. The shock converting mechanism 61 includes:

1) a load transmitting member 62 disposed at the front edge part 1B of the vehicular body 1, 2) a link arm 63 interposed between the load transmitting member 62 and the front hood hinge 26, and 3) a link arm supporting mechanism 64 by which an intermediate part of the link arm 63 is rotatably and pivotally supported to the vehicular body 1.

The load transmitting member 62 is disposed, for example, on a rear face side of a surface panel of the bumper 6. An end part (front end part) of the link arm 63 is rotatably coupled to the load transmitting member 62, while another end part (rear end part) of the link arm 63 so contacts the front hood hinge 26 as to push the front hood hinge 26.

In addition, a measurement type shock sensor 13 such as a potentio-sensor and the like is incorporated in the link arm supporting mechanism 64.

Moreover, a front hood lift actuator cylinder 66 (lift actuator cylinder) operates as the mover mechanism 11. The front hood lift actuator cylinder 66 is mounted adjacent to the front hood locking mechanism 28 in the vehicular body panel 25, with a push rod 67 of the front hood lift actuator cylinder 66 facing substantially rearward. A driving spring 68 as a driving source capable of biasing the push rod 67 in the protrusion direction is interposed on a head side of the front hood lift actuator cylinder 66. The push rod 67 is ordinarily locked by an unlocking mechanism 69 in such a configuration as to be received by the front hood lift actuator cylinder 66.

Moreover, a front hood lift linking mechanism 71 is interposed between the push rod 67 and the front hood locking mechanism 28. The front hood lift linking mechanism 71 has a first end with which a head end of the push rod 67 is rotatably coupled, and a second end to which the front hood locking mechanism 28 is mounted. Moreover, the front hood lift linking mechanism 71 has an intermediate part for folding itself into two. The front hood lift linking mechanism 71 can be biased by an elastic member (not shown) in an extendable direction. With the push rod 67 shrunk, the front hood lift linking mechanism 71 is refracted against a biasing force of the elastic member (not shown), and is thereby folded and received in such a configuration as to be substantially in line with the front hood lift actuator cylinder 66. With the push rod 67 extending (protruding), the biasing force of the elastic member (not shown) is released, to thereby extend the front hood lift linking mechanism 71 in the substantially tangential direction of the circle through the front hood striker 27 around the front hood hinge 26.

In addition, it is so structured that, receiving the vehicular speed signal 16 from the vehicular speed sensor 15 and the sensing signal 12 from the potentio sensor as the measurement type shock sensor 13, the controller 17 operates the unlocking mechanism 69 of the front hood lift actuator cylinder 66 as the mover mechanism 11.

--Operations of Fifth Embodiment--

Then, operations of the fifth embodiment are to be set forth.

Herein, the operations brought about by i) the basic structure of the vehicle and ii) the structure common to all the embodiments (first embodiment to tenth embodiment) which operations have already been set forth in the description of the common embodiment are to be omitted.

Furthermore, the operations brought about by the structure common to from the first embodiment to the seventh embodiment (to be described afterward) which operations have already been set forth in the description of the first embodiment are to be omitted.

When necessary, however, the above descriptions are to be interpreted as the description of the fifth embodiment.

Even otherwise, operations brought about by the structural elements having the same reference numerals as those according to each of the prior embodiments are, however, to be interpreted as the same or equivalents thereof, and the description of the above operations is to be interpreted as the one according to the fourth embodiment.

According to the fifth embodiment disclosing the shock converting mechanism 61, the collisional force can operate as the assist driving force of the reactive force member 10. With this, operability of the reactive force member 10 is improved, thus disposing the reactive force member 10 speedily to the certain position and making the mover mechanism 11 smaller in size, capacity and price.

Moreover, the front hood lift actuator cylinder 66 as the mover mechanism 11 can have a momentary force, to thereby protrude the reactive force member 10 in a short time. Moreover, the front hood lift actuator cylinder 66 using the driving spring 68 as the driving source can make compact the structure of the front hood lift actuator cylinder 66.

--Operations More Specific to Fifth Embodiment--

Figure 20A:
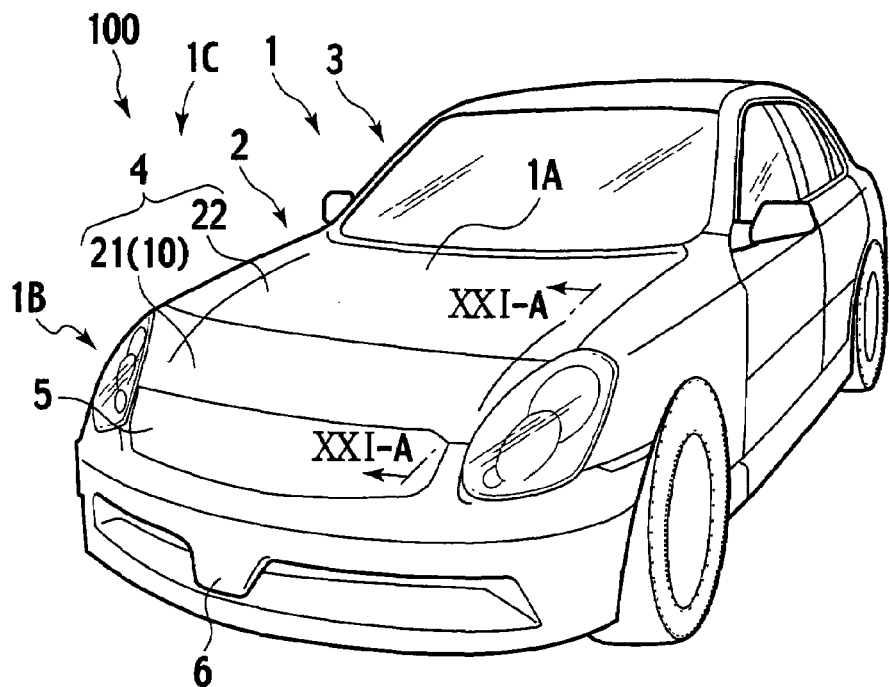
FIG. 20A is a perspective view of the vehicular body and FIG. 20B is a schematic side view of the front part of the vehicle, according to a fifth embodiment.
Figure 20B:
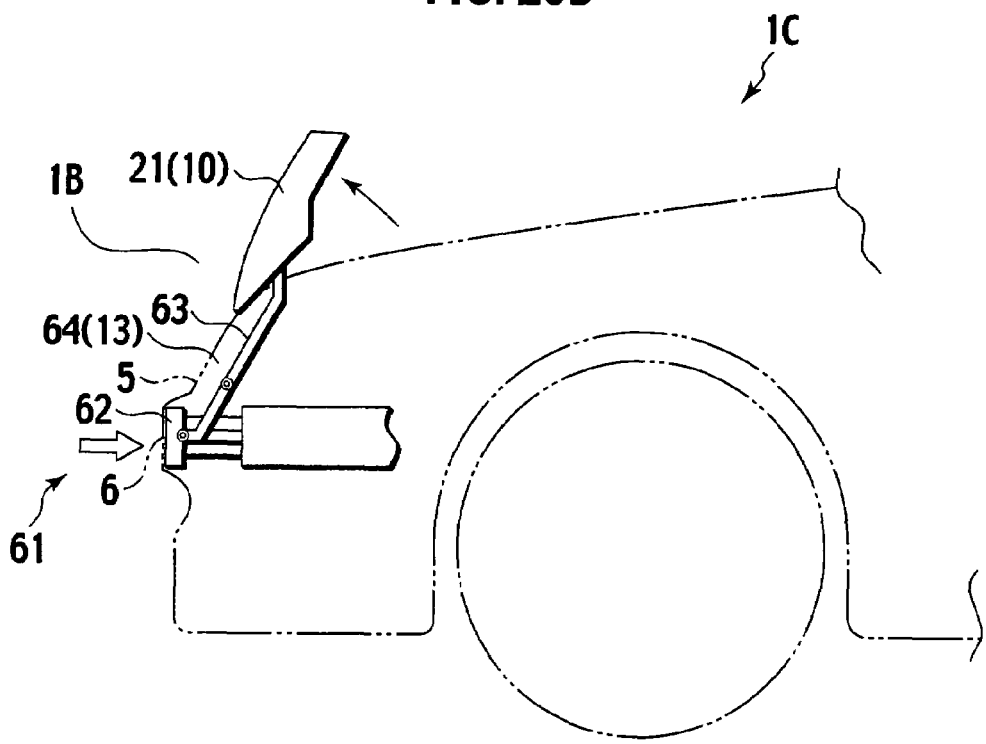

More specific operations of the fifth embodiment are to be set forth hereinafter. That is, continuously sensing the vehicular speed, the vehicular speed sensor 15 outputs the vehicular speed signal 16 to the controller 17, as shown in a flow chart of FIG. 23. In addition, as shown in FIG. 20A and FIG. 20B, the collision of the obstacle A with the front edge part 1B (surface panel of the bumper 6) of the vehicular body 1 moves rearward the load transmitting member 62 on a rear face side of the surface panel of the bumper 6. With this, the link arm 63 having a first end part (front end part) coupled to the load transmitting member 62 rotates counterclockwise in FIG. 20B around the link arm supporting mechanism 64 in the intermediate part of the link arm 63. The rotation of the link arm 63 allows the second end part (rear end part) of the link arm 63 to push the front hood hinge 26 upward and frontward, thereby biasing the front hood hinge 26 in the opening direction.

Figure 23:
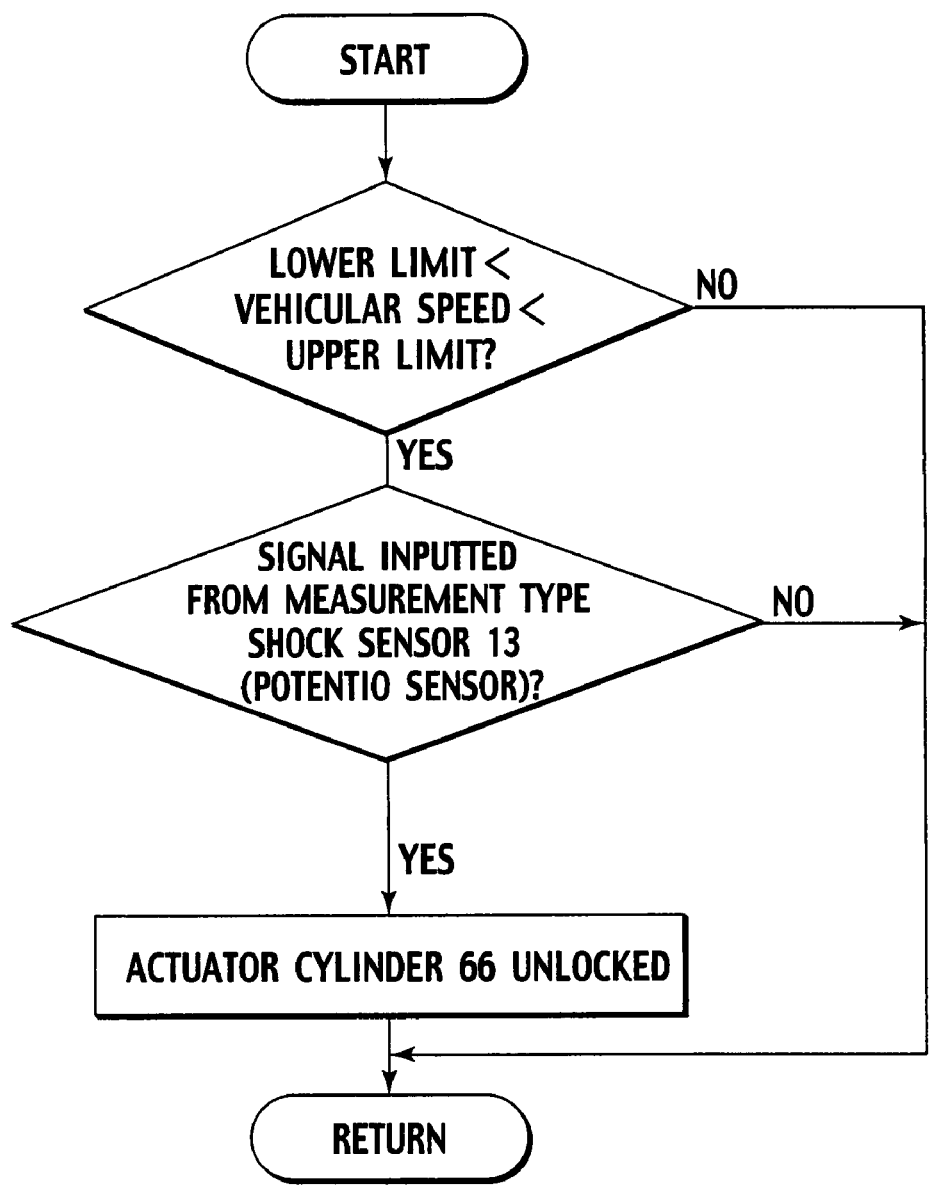
FIG. 23 shows a flow chart of the control system, according to the fourth embodiment.
Figure 24A:
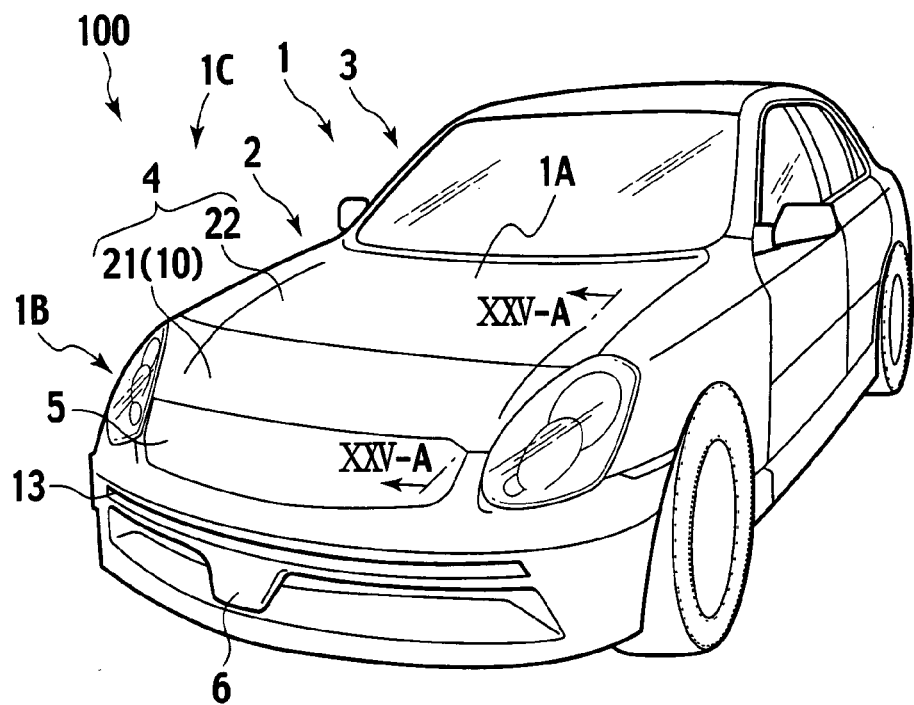
FIG. 24A is a perspective view of the vehicular body and FIG. 24B is a schematic plan view of the front part of the vehicle, according to a sixth embodiment.
Figure 24B:
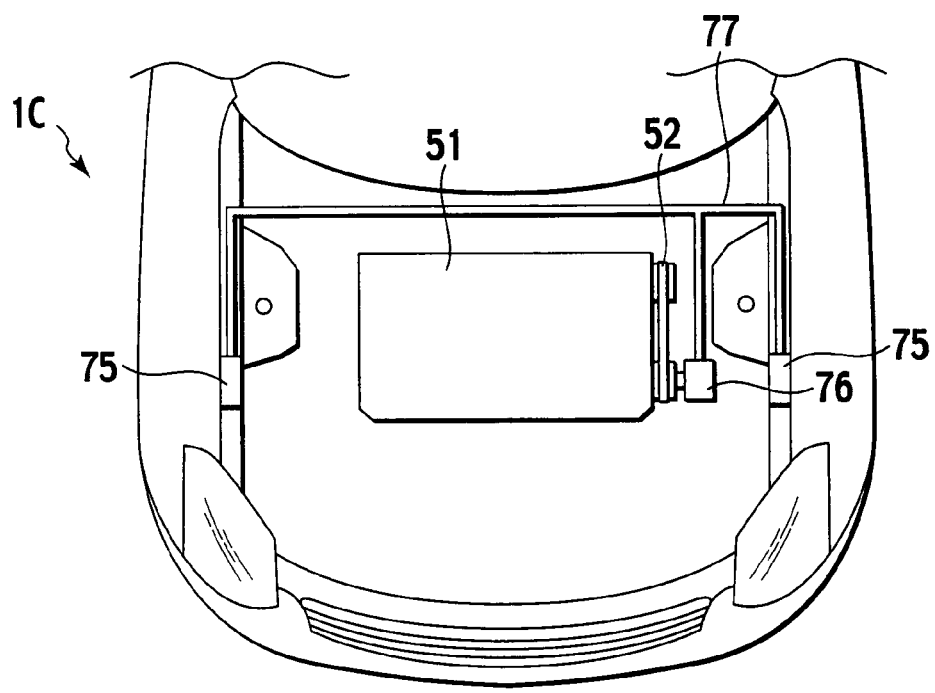

Is this case, substantially simultaneously, the measurement type shock sensor 13 such as the potentio sensor and the like incorporated in the link arm supporting mechanism 64 outputs the sensing signal 12 to the controller 17, as shown in a flow chart of FIG. 23. With the sensing signal 12 from the shock sensor 13 and the vehicular speed signal 16 from the vehicular speed sensor 15 inputted to the controller 17, the controller 17 makes the following operations:

1) out of the certain speed range: not outputting the control signal 18 to the unlocking mechanism 69 of the front hood lift actuator cylinder 66, and 2) within the certain speed range (lower limit<vehicular speed<upper limit): outputting the control signal 18 to the unlocking mechanism 69.

Figure 22A:
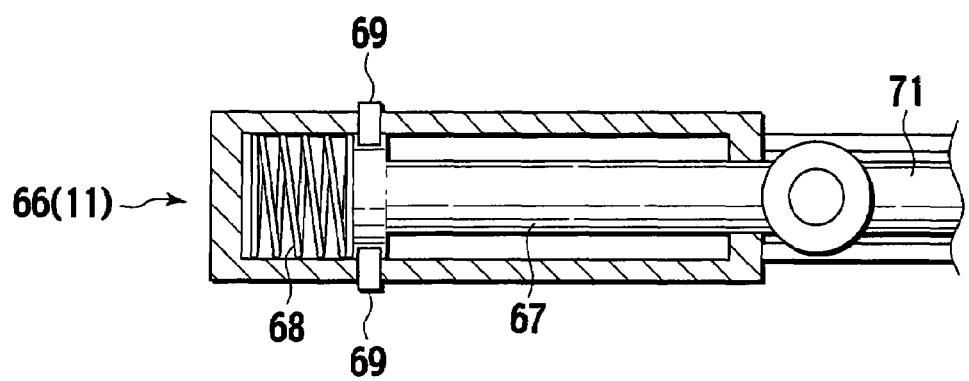
FIG. 22A and FIG. 22B each are a sideward cross sectional view of a front hood lift actuator cylinder, according to the fifth embodiment.
Figure 22B:
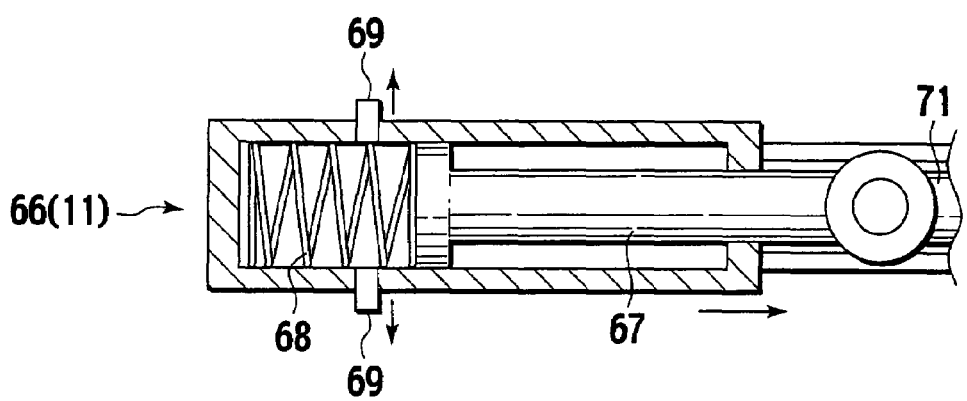

As shown in FIG. 22A and FIG. 22B, receiving the control signal 18 from the controller 17, the unlocking mechanism 69 unlocks the push rod 67. Then, the elastic force of the driving spring 68 operates the push rod 67, such that the push rod 67 extendably moves (protrusion movement) relative to the front hood lift actuator cylinder 66. Then, as shown in FIG. 21A and FIG. 21B, the front hood lift linking mechanism 71, from the refracted state thereof, extends in the substantially tangential direction of the circle through the front hood striker 27 around the front hood hinge 26, to thereby push the rear part 21R of the front hood 21 from lower part. A pushing force of the front hood lift linking mechanism 71 and the link arm 63's pushing pressure to the front hood hinge 26 rotate the front hood 21 frontward of the vehicle around the hinge shaft 26A of the front hood hinge 26. Being stopped with the front hood lift linking mechanism 71 at the maximum extension, the front hood 21 can be disposed in a certain position. With this, the upper end part (rear part 21 R) of the front hood 21 is elevated, transferring the contact C upward, thus causing the smaller rotary radius r from the apex part B of the obstacle A to the contact C of the upper end part of the front hood 21, correspondingly decreasing the shock energy to the rear hood 22.

Sixth Embodiment

FIG. 24A and FIG. 24B to FIG. 27 show the vehicular body front structure 100, according to a sixth embodiment of the present invention.

Herein, i) the basic structure of the vehicle and ii) the structure common to all the embodiments (first embodiment to tenth embodiment) which structures i) and ii) have already been set forth in the description of the common embodiment are to be omitted.

Furthermore, the structure common to from the first embodiment to the seventh embodiment (to be described afterward) which structure has already been set forth in the description of the first embodiment is also to be omitted.

When necessary, however, the above descriptions are to be interpreted as the description of the sixth embodiment.

Even otherwise, the structural elements having the same reference numerals as those according to each of the prior embodiments are, however, to be interpreted as the same or equivalents thereof, and the description of the structural elements is to be interpreted as the one according to the sixth embodiment.

--Structure Specific to Sixth Embodiment--

In addition to the structure common to from the first embodiment to the seventh embodiment, the sixth embodiment has the following specific structure.

Based on the structure of the first embodiment, the sixth embodiment further discloses the front hood lift actuator cylinder 66 and the front hood lift linking mechanism 71 according to the fifth embodiment.

However, the driving source of the front hood lift actuator cylinder 66 is a pressure gas, in place of the driving spring 68. Therefore, a pressure controller 75 is mounted to a head side of the front hood lift actuator cylinder 66.

Moreover, it is so structured that the pressure gas for the pressure controller 75 is caused by the driving force of the engine 51. Therefore, a pressure distributor 76 having a compressor function and a pressure distributing function is connected to the driving shaft of the belt 52, where the belt 52 disposed outside the engine 51 continuously rotates when the engine 51 is being driven. The compressed air (pressure gas) is supplied from the pressure distributor 76 via a pressure delivery pipe 77 to the pressure controller 75 mounted to each of the front hood lift actuator cylinders 66 on right and left. Herein, the pressure distributor 76 is so configured as to fill the pressure controller 75 with a certain pressure when the engine 51 is driven and to release the pressure when the engine 51 is stopped.

In addition, it is so structured that, receiving the vehicular speed signal 16 from the vehicular speed sensor 15 and the sensing signal 12 from the measurement type shock sensor 13, the controller 17 operates the unlocking mechanism 69 of the front hood lift actuator cylinder 66 as the mover mechanism 11. Moreover, the controller 17 is so structured as to monitor and control the pressure distributor 76 and the pressure controller 75.

--Operations of Sixth Embodiment--

Then, operations of the sixth embodiment are to be set forth.

Herein, the operations brought about by i) the basic structure of the vehicle and ii) the structure common to all the embodiments (first embodiment to tenth embodiment) which operations have already been set forth in the description of the common embodiment are to be omitted.

Furthermore, the operations brought about by the structure common to from the first embodiment to the seventh embodiment (to be described afterward) which operations have already been set forth in the description of the first embodiment are to be omitted.

When necessary, however, the above descriptions are to be interpreted as the description of the sixth embodiment.

Even otherwise, operations brought about by the structural elements having the same reference numerals as those according to each of the prior embodiments are, however, to be interpreted as the same or equivalents thereof, and the description of the above operations is to be interpreted as the one according to the sixth embodiment.

Having the pressure gas as the driving source, the front hood lift actuator cylinder 66 according to the sixth embodiment causes a force greater than that caused by the driving spring 68 according to the fifth embodiment. Moreover, the driving force of the engine 51 causing the pressure gas for the pressure controller 75 can stably supply the pressure gas to the front hood lift actuator cylinder 66. In addition, the operations of the front hood lift actuator cylinder 66 are as set forth above. Moreover, other operations are basically the same as those of counterparts according to the first embodiment and the fifth embodiment.

--Operations More Specific to Sixth Embodiment--

More specific operations of the sixth embodiment are to be set forth hereinafter. Specifically, at first, when the engine 51 is stopped, the pressure distributor 76 is not driven, and the pressure gas is released from the pressure controller 75. Then, after the engine 51 is driven, the driving force of the engine 51 drives the compressor of the pressure distributor 76 via the driving shaft of the belt 52, supplying the compressed air from the pressure distributor 76 via the pressure delivery pipe 77 to the pressure controllers 75 on right and left, to thereby store the pressure gas. In addition, continuously sensing the vehicular speed, the vehicular speed sensor 15 outputs the vehicular speed signal 16 to the controller 17, as shown in a flow chart of FIG. 27. Moreover, the measurement type shock sensor 13 senses the collision of the vehicular body 1 with the obstacle A, to thereafter output the sensing signal 12 to the controller 17. With the sensing signal 12 from the shock sensor 13 and the vehicular speed signal 16 from the vehicular speed sensor 15 inputted to the controller 17, the controller 17 makes the following operations:

1) out of the certain speed range: not outputting the control signal 18 to the unlocking mechanism 69 of the front hood lift actuator cylinder 66, and 2) within the certain speed range (lower limit<vehicular speed<upper limit): outputting the control signal 18 to the unlocking mechanism 69.

Figure 25A:
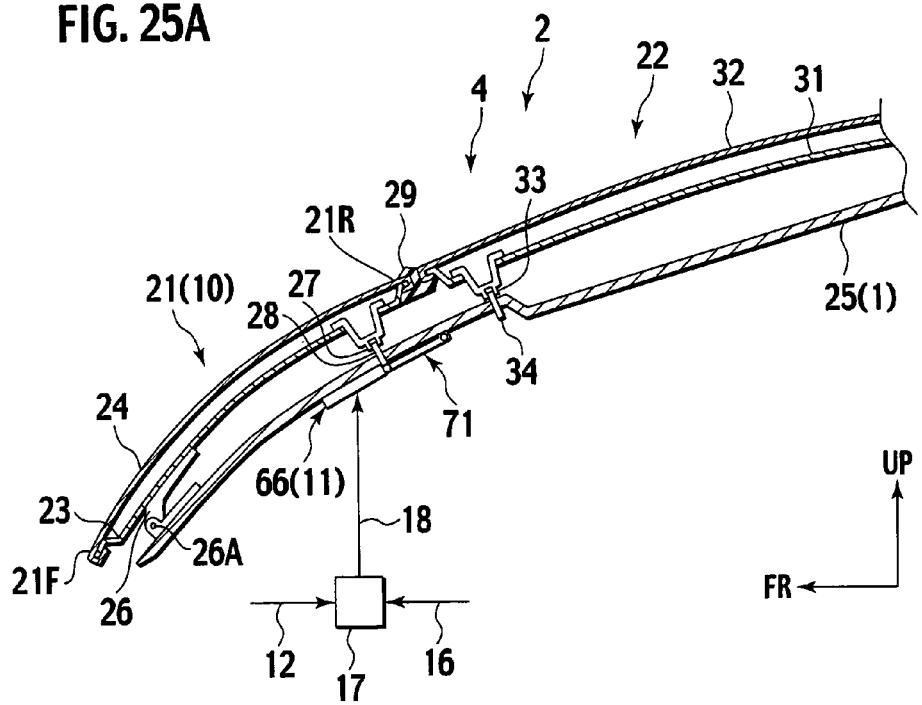
FIG. 25A (taken along the lines XXV-A in FIG. 24A) and FIG. 25B each are a partial side cross sectional view, according to the sixth embodiment.
Figure 25B:
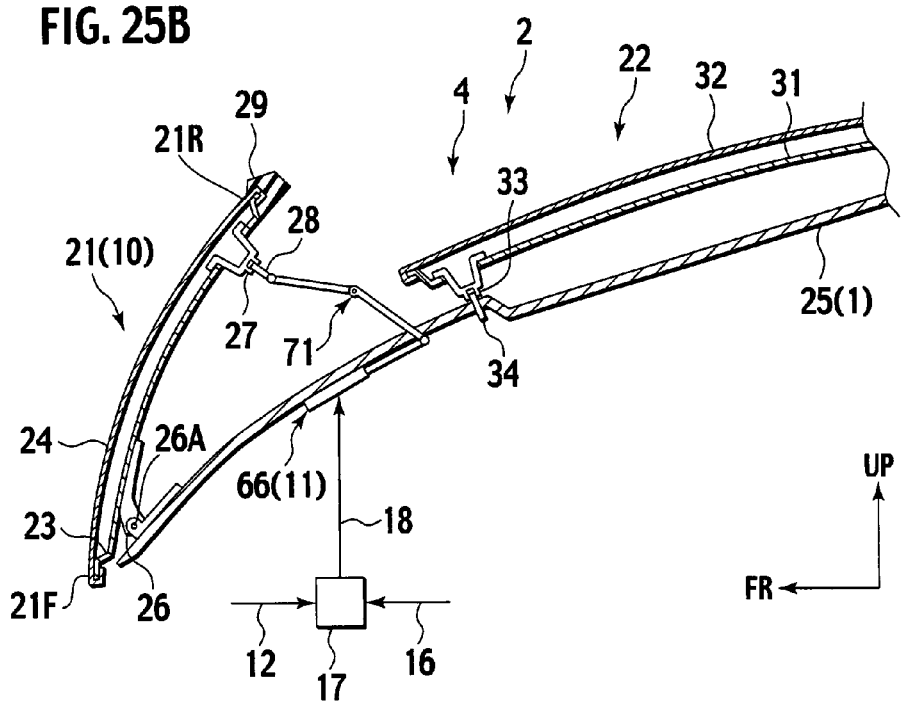
Figure 26A:
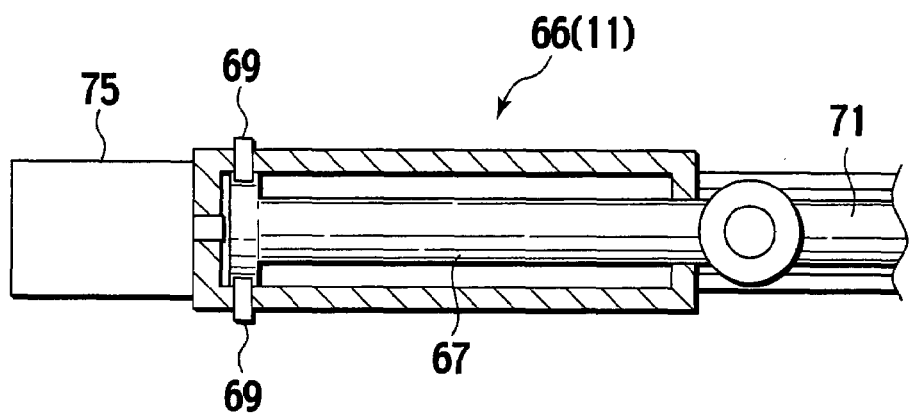
FIG. 26A and FIG. 26B each are a sideward cross sectional view of the front hood lift actuator cylinder, according to the sixth embodiment.
Figure 26B:
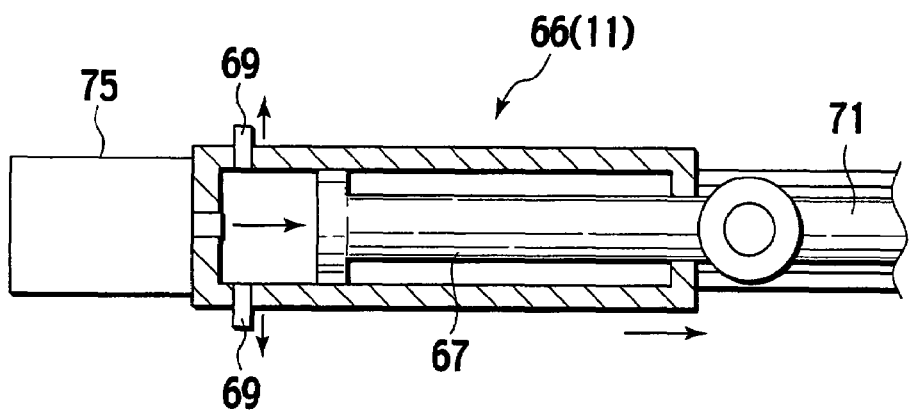
Figure 27:
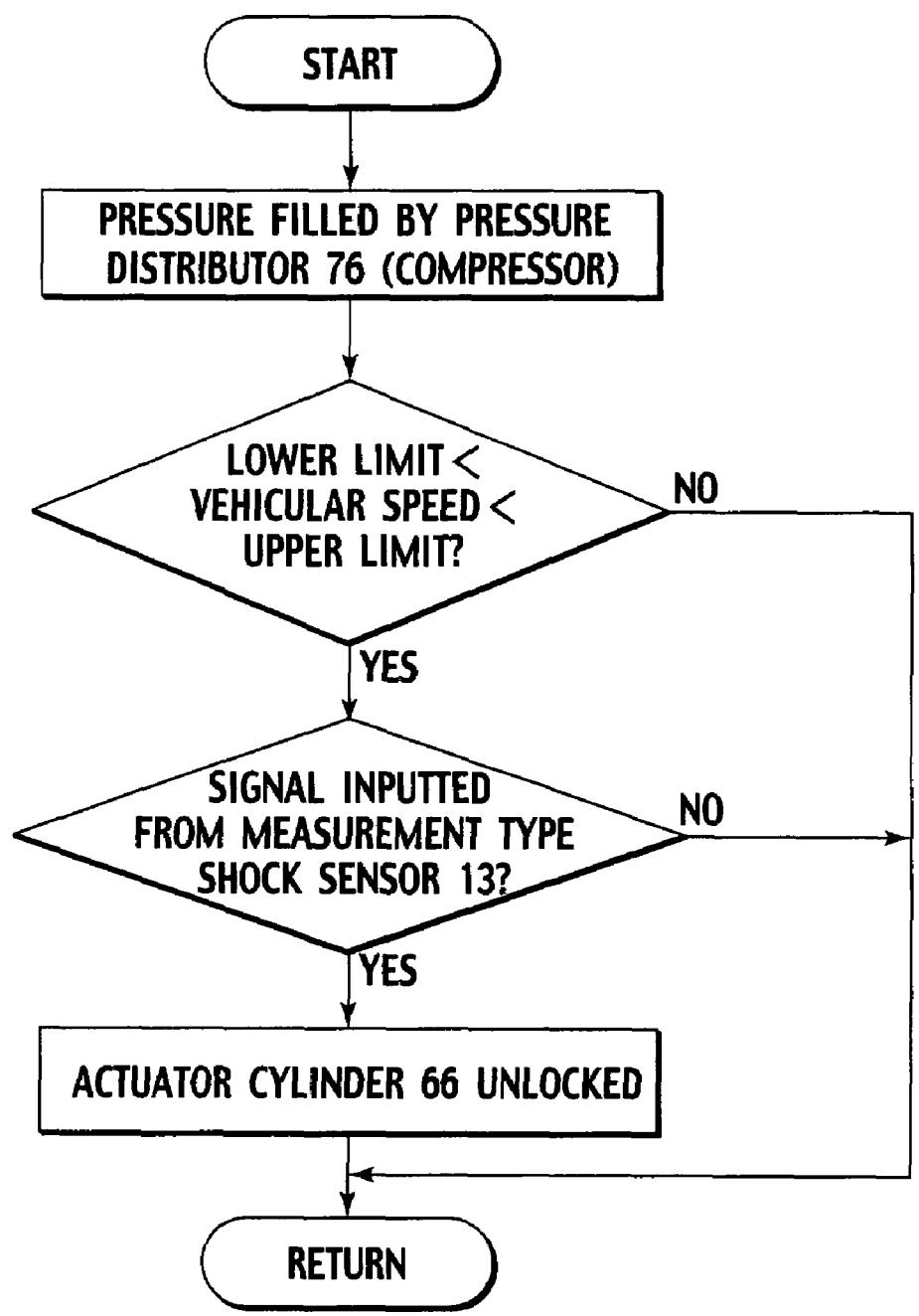
FIG. 27 shows a flow chart of a control system, according to the sixth embodiment.
Figure 28A:
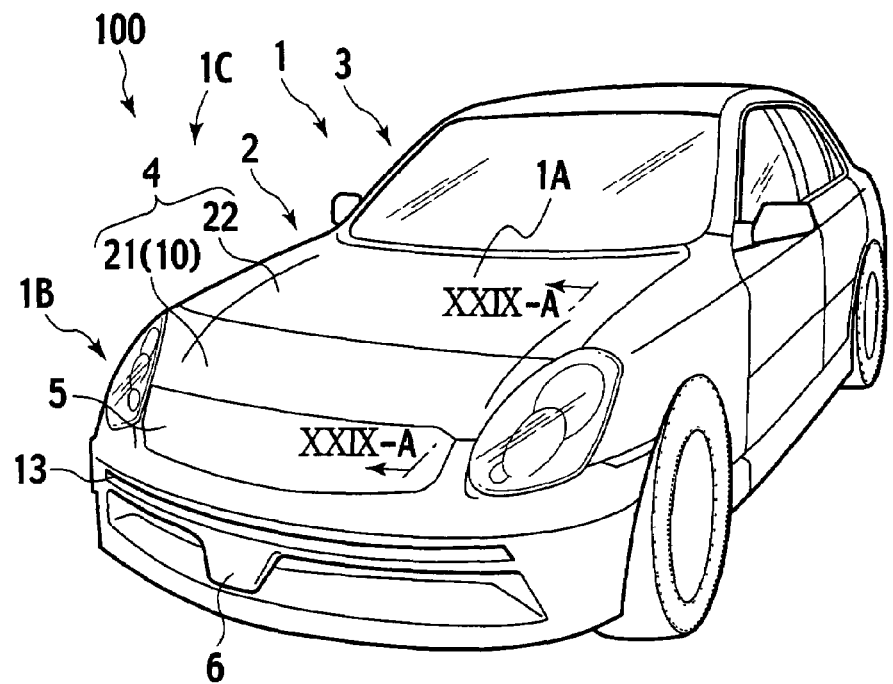
FIG. 28A is a perspective view of the vehicular body and FIG. 28B is a schematic plan view of the front part of the vehicle, according to a seventh embodiment.
Figure 28B:
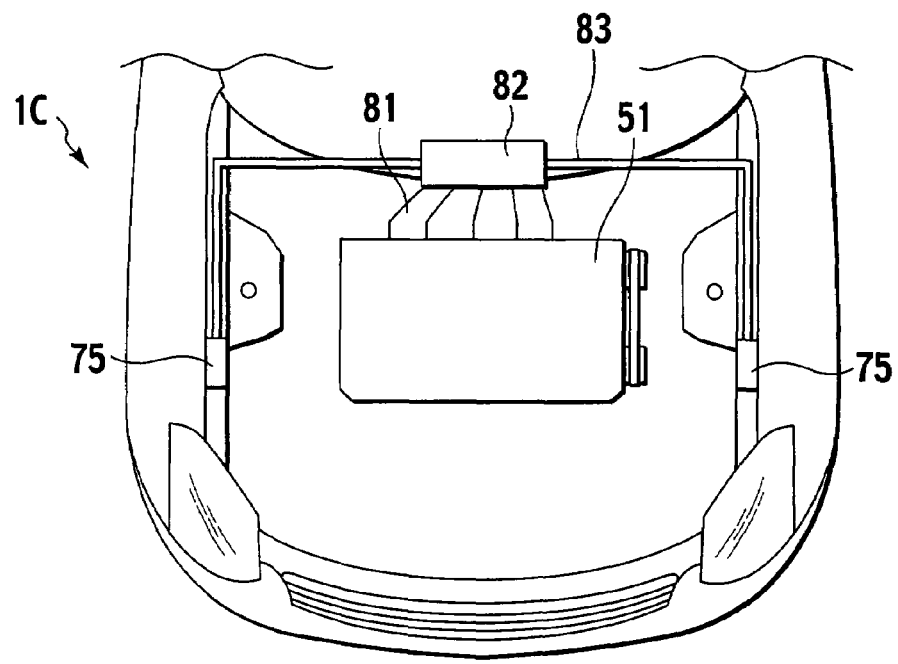

As shown in FIG. 26A and FIG. 26B, receiving the control signal 18 from the controller 17, the unlocking mechanism 69 of the front hood lift actuator cylinder 66 unlocks the push rod 67. Then, the pressure gas of the pressure controller 75 operates the push rod 67, such that the push rod 67 extendably moves (protrusion movement) relative to the front hood lift actuator cylinder 66. As shown in FIG. 25A and FIG. 25B, the front hood lift linking mechanism 71, from the refracted state thereof, extends in the substantially tangential direction of the circle through the front hood striker 27 around the front hood hinge 26, to thereby push the rear part 21R of the front hood 21 from lower part, thus rotating the front hood 21 frontward of the vehicle around the hinge shaft 26A of the front hood hinge 26. Being stopped the front hood lift linking mechanism 71 at the maximum extension, the front hood 21 can be disposed in the certain position. With this, the upper end part (rear part 21R) of the front hood 21 is elevated, transferring the contact C upward, thus causing the smaller rotary radius r from the apex part B of the obstacle A to the contact C of the upper end part of the front hood 21, correspondingly decreasing the shock energy to the rear hood 22.

Seventh Embodiment

FIG. 28A and FIG. 28B to FIG. 31 show the vehicular body front structure 100, according to a seventh embodiment of the present invention.

Herein, i) the basic structure of the vehicle and ii) the structure common to all the embodiments (first embodiment to tenth embodiment) which structures i) and ii) have already been set forth in the description of the common embodiment are to be omitted.

Furthermore, the structure common to from the first embodiment to the seventh embodiment (to be described herein) which structure has already been set forth in the description of the first embodiment is also to be omitted.

When necessary, however, the above descriptions are to be interpreted as the description of the seventh embodiment.

Even otherwise, the structural elements having the same reference numerals as those according to each of the prior embodiments are, however, to be interpreted as the same or equivalents thereof, and the description of the structural elements is to be interpreted as the one according to the seventh embodiment.

--Structure Specific to Seventh Embodiment--

In addition to the structure common to from the first embodiment to the seventh embodiment, the seventh embodiment has the following specific structure.

The seventh embodiment is substantially like the sixth embodiment in structure.

However, it is so structured that the pressure gas for the pressure controller 75 is caused by exhaust gas of the engine 51. Therefore, a pressure distributor 82 functioning as a turbine compressor and a pressure distributor is connected to an exhaust gas port 81 of the engine 51, supplying the compressed air (the pressure gas) from the pressure distributor 82 via a pressure delivery pipe 83 to the pressure controller 75 mounted to the front hood lift actuator cylinders 66 on right and left. Herein, the pressure distributor 82 is so configured as to fill the pressure controller 75 with a certain pressure when the engine 51 is driven and to release the pressure when the engine 51 is stopped.

In addition, it is so structured that, receiving the vehicular speed signal 16 from the vehicular speed sensor 15 and the sensing signal 12 from the measurement type shock sensor 13, the controller 17 operates the unlocking mechanism 69 of the front hood lift actuator cylinder 66 as the mover mechanism 11. Moreover, the controller 17 is so structured as to monitor and control the pressure distributor 82 and the pressure controller 75.

--Operations of Seventh Embodiment--

Then, operations of the seventh embodiment are to be set forth.

Herein, the operations brought about by i) the basic structure of the vehicle and ii) the structure common to all the embodiments (first embodiment to tenth embodiment) which operations have already been set forth in the description of the common embodiment are to be omitted.

Furthermore, the operations brought about by the structure common to from the first embodiment to the seventh embodiment (to be described hereinafter) which operations have already been set forth in the description of the first embodiment are to be omitted.

When necessary, however, the above descriptions are to be interpreted as the description of the seventh embodiment.

Even otherwise, operations brought about by the structural elements having the same reference numerals as those according to each of the prior embodiments are, however, to be interpreted as the same or equivalents thereof, and the description of the above operations is to be interpreted as the one according to the seventh embodiment.

The seventh embodiment causing the pressure gas of the pressure controller 75 by the exhaust gas of the engine 51 can reuse the exhaust gas energy unlike the sixth embodiment using the driving force of the engine 51. Other operations according to the seventh embodiment are basically the same as those according to the sixth embodiment.

--Operations More Specific to Seventh Embodiment--

More specific operations of the seventh embodiment are to be set forth hereinafter. Specifically, at first, when the engine 51 is stopped, the exhaust gas is not caused, therefore, the pressure distributor 82 is not driven, and the pressure gas is released from the pressure controller 75. Then, after the engine 51 is driven, the exhaust gas of the engine 51 drives the turbine compressor of the pressure distributor 82, supplying the compressed air from the pressure distributor 82 via the pressure delivery pipe 83 to the pressure controllers 75 on right and left, to thereby store the pressure gas. In addition, continuously sensing the vehicular speed, the vehicular speed sensor 15 outputs the vehicular speed signal 16 to the controller 17, as shown in a flow chart of FIG. 31. Moreover, the measurement type shock sensor 13 senses the collision of the vehicular body 1 with the obstacle A, to thereafter output the sensing signal 12 to the controller 17. With the sensing signal 12 from the shock sensors 13, 14 and the vehicular speed signal 16 from the vehicular speed sensor 15 inputted to the controller 17, the controller 17 makes the following operations:

1) out of the certain speed range: not outputting the control signal 18 to the unlocking mechanism 69 of the front hood lift actuator cylinder 66, and 2) within the certain speed range (lower limit<vehicular speed<upper limit): outputting the control signal 18 to the unlocking mechanism 69.

Figure 29A:
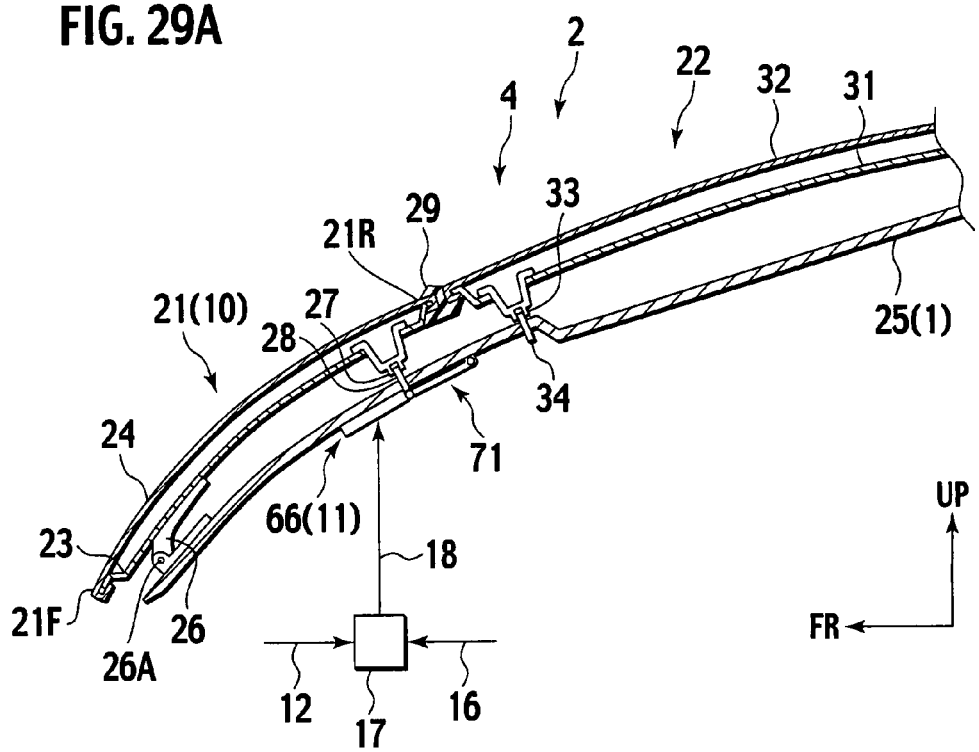
FIG. 29A (taken along the lines XXIX-A in FIG. 28A) and FIG. 29B each are a partial side cross sectional view, according to the seventh embodiment.
Figure 29B:
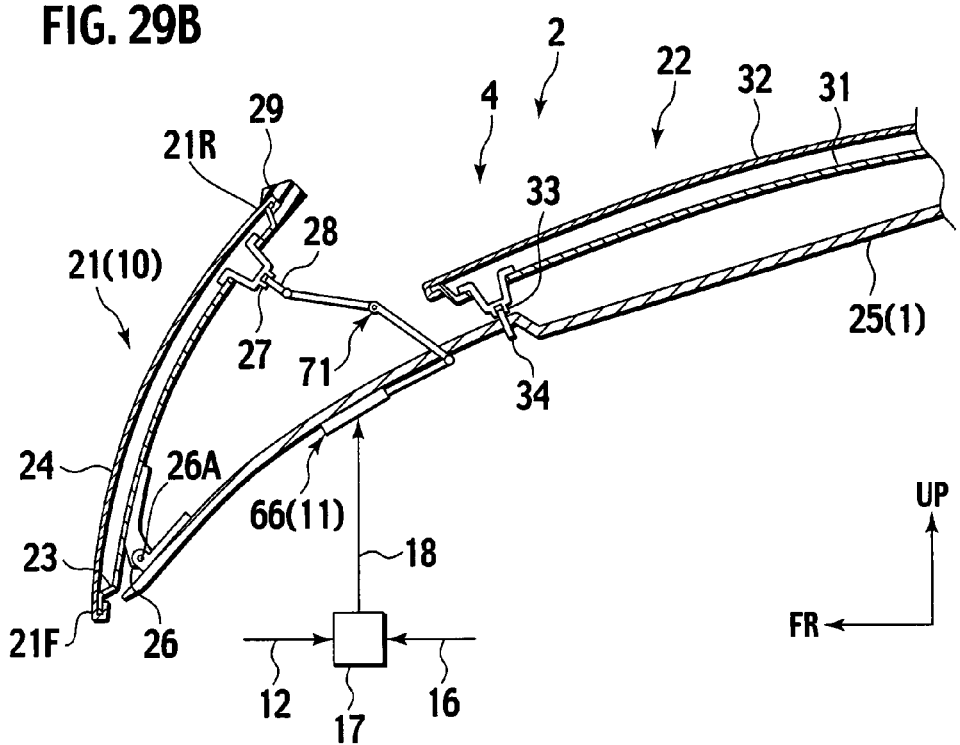
Figure 30A:
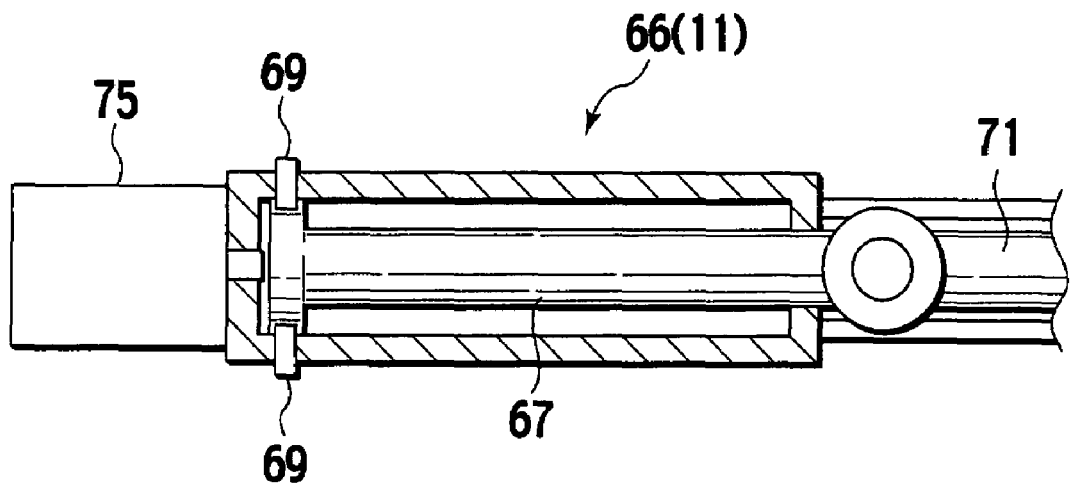
FIG. 30A and FIG. 30B each are a sideward cross sectional view of the front hood lift actuator cylinder, according to the seventh embodiment.
Figure 30B:
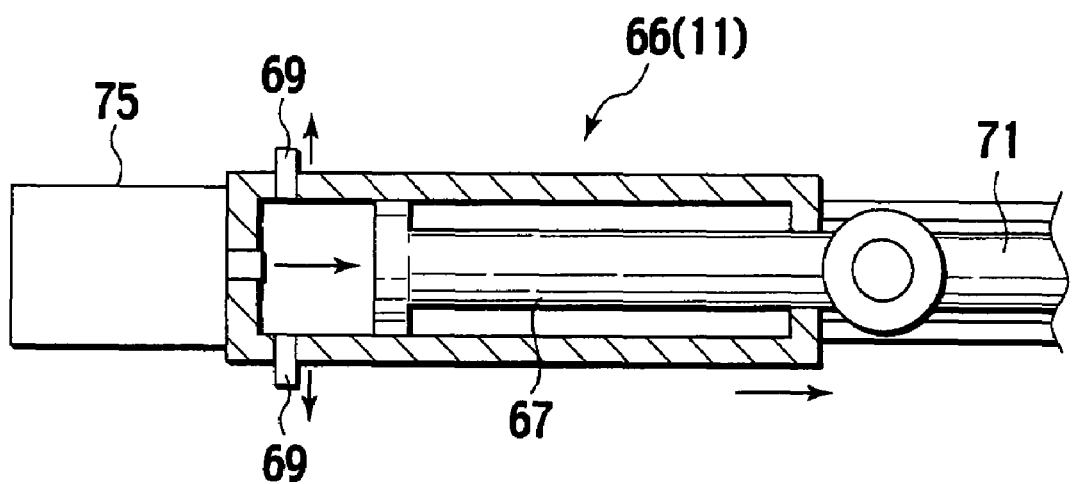
Figure 31:
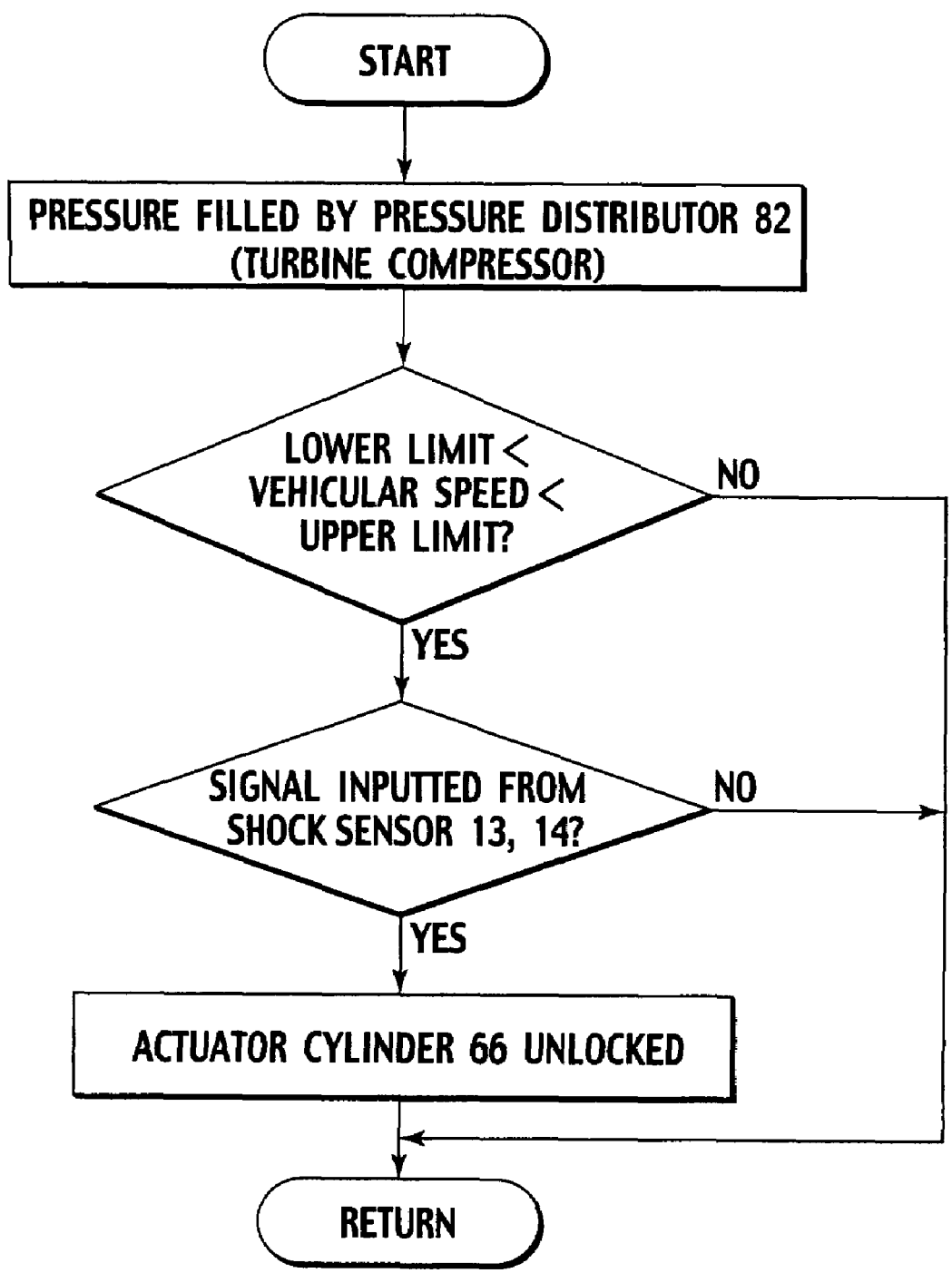
FIG. 31 shows a flow chart of a control system, according to the seventh embodiment.
Figure 32A:
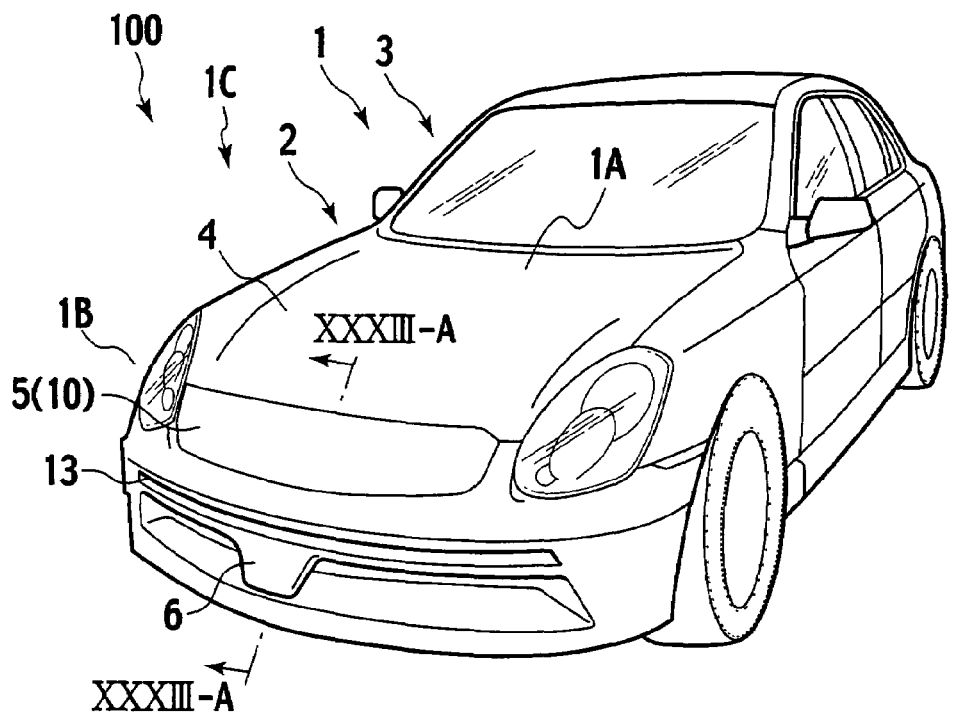
FIG. 32A and FIG. 32B each are a perspective view of the vehicular body, according to an eighth embodiment.
Figure 32B:
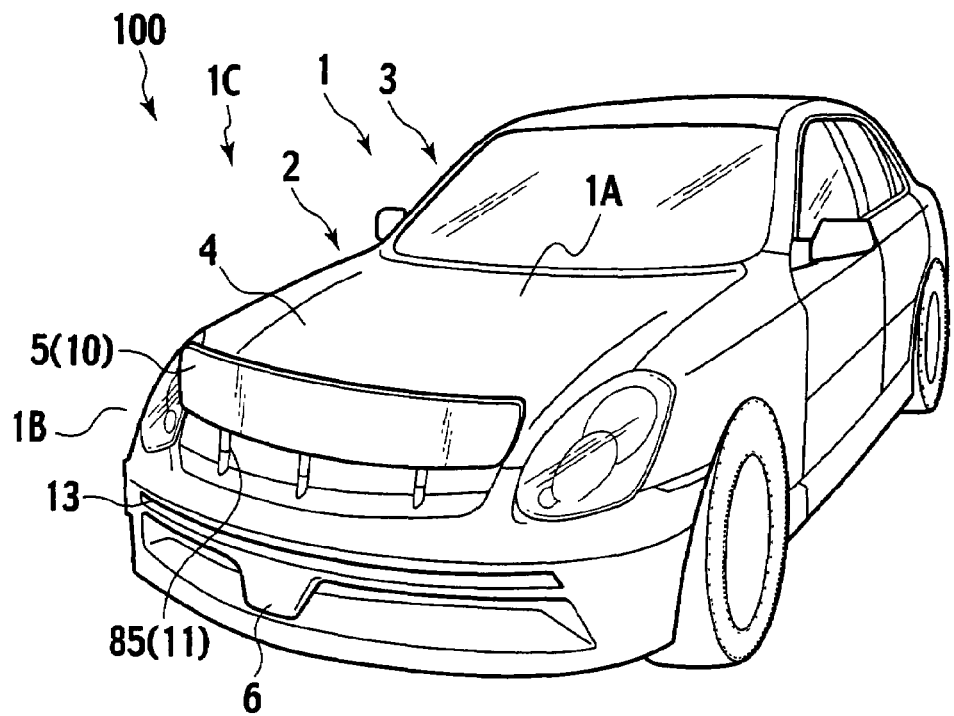

As shown in FIG. 30A and FIG. 30B, receiving the control signal 18 from the controller 17, the unlocking mechanism 69 of the front hood lift actuator cylinder 66 unlocks the push rod 67. Then, the pressure gas of the pressure controller 75 operates the push rod 67, such that the push rod 67 extendably moves (protrusion movement) relative to the front hood lift actuator cylinder 66. As shown in FIG. 29A and FIG. 29B, the front hood lift linking mechanism 71, from the refracted state thereof, extends in the substantially tangential direction of the circle through the front hood striker 27 around the front hood hinge 26, to thereby push the rear part 21R of the front hood 21 from lower part, thus rotating the front hood 21 frontward of the vehicle around the hinge shaft 26A of the front hood hinge 26. Being stopped with the front hood lift linking mechanism 71 at the maximum extension, the front hood 21 can be disposed in the certain position. With this, the upper end part (rear part 21R) of the front hood 21 is elevated, transferring the contact C upward, thus causing the smaller rotary radius r from the apex part B of the obstacle A to the contact C of the upper end part of the front hood 21, correspondingly decreasing the shock energy to the rear hood 22.

Eighth Embodiment

FIG. 32A and FIG. 32B to FIG. 34 show the vehicular body front structure 100, according to an eighth embodiment of the present invention.

Herein, i) the basic structure of the vehicle and ii) the structure common to all the embodiments (first embodiment to tenth embodiment) which structures i) and ii) have already been set forth in the description of the common embodiment are to be omitted.

When necessary, however, the above descriptions are to be interpreted as the description of the eighth embodiment.

Even otherwise, the structural elements having the same reference numerals as those according to each of the prior embodiments are, however, to be interpreted as the same or equivalents thereof, and the description of the structural elements is to be interpreted as the one according to the eighth embodiment.

--Structure Specific to Eighth Embodiment--

The eighth embodiment has the following specific structure.

That is, the grille 5 disposed adjacent to the front edge part 1B of the vehicular body 1 is mounted to the vehicular body 1 in such a configuration as to rise or fall. Then, the grille 5 having a front face 5A and a rear face 5B operates as the reactive force member 10.

Therefore, in a certain position, the grille 5 is disposed in a non-fixed state relative to the vehicular body 1 and the hood 4. A grille actuator 85 extending substantially in an upper-lower direction operates as the mover mechanism 11. With the upper end side (body side) of the grille actuator 85 mounted to the rear face 5B of the grille 5, the lower end part (rod part) of the grille actuator 85 is coupled to the vehicular body 1 side. In addition, with a surface of the upper end part of the grille 5 and a surface of the front edge part of the hood 4 substantially serially disposed, the grille actuator 85 when extending is to be slightly inclined frontward, thus preventing an interference between the two surfaces.

In addition, the hood 4 is of unitary type (ordinary type), not divided into front and rear hoods (21, 22). In this case, the hood 4 includes a hood inner panel 86 and a hood outer panel 87. Moreover, a hood hinge (not shown) is provided at a front part of the hood 4. Oppositely, a hood striker 88 and a hood locking mechanism 89 each are provided at a rear part of the hood 4.

In addition, it is so structured that, receiving the vehicular speed signal 16 from the vehicular speed sensor 15 and the sensing signal 12 from the measurement type shock sensor 13, the controller 17 operates the grille actuator 85 as the mover mechanism 11.

--Operations of Eighth Embodiment--

Then, operations of the eighth embodiment are to be set forth.

Herein, the operations brought about by i) the basic structure of the vehicle and ii) the structure common to all the embodiments (first embodiment to tenth embodiment) which operations have already been set forth in the description of the common embodiment are to be omitted.

When necessary, however, the above descriptions are to be interpreted as the description of the eighth embodiment.

Even otherwise, operations brought about by the structural elements having the same reference numerals as those according to each of the prior embodiments are, however, to be interpreted as the same or equivalents thereof, and the description of the above operations is to be interpreted as the one according to the eighth embodiment.

According to the eighth embodiment, the grille 5 disposed adjacent to the front edge part 1B of the vehicular body 1 is mounted to the vehicular body 1 in such a configuration as to rise or fall and operates as the reactive force member 10, eliminating the need for changing the structure of the hood 4 as it is (i.e., hood 4 already available) and ordinarily implementing the opening and closing operations of the hood 4.

Moreover, the grille 5 as the reactive force member 10 lighter in weight than the front hood 21 has good operability.

Moreover, the simple structure can be easily added to the vehicle that is already available.

--Operations More Specific to Eighth Embodiment--

More specific operations of the eighth embodiment are to be set forth hereinafter. That is, continuously sensing the vehicular speed, the vehicular speed sensor 15 outputs the vehicular speed signal 16 to the controller 17, as shown in a flow chart of FIG. 34. Moreover, the measurement type shock sensor 13 senses the collision of the vehicular body 1 with the obstacle A, to thereafter output the sensing signal 12 to the controller 17. With the sensing signal 12 from the shock sensor 13 and the vehicular speed signal 16 from the vehicular speed sensor 15 inputted to the controller 17, the controller 17 makes the following operations:

1) out of the certain speed range: not outputting the control signal 18 to the grille actuator 85, and 2) within the certain speed range (lower limit<vehicular speed<upper limit): outputting the control signal 18 to the grill grille actuator 85.

Figure 33A:
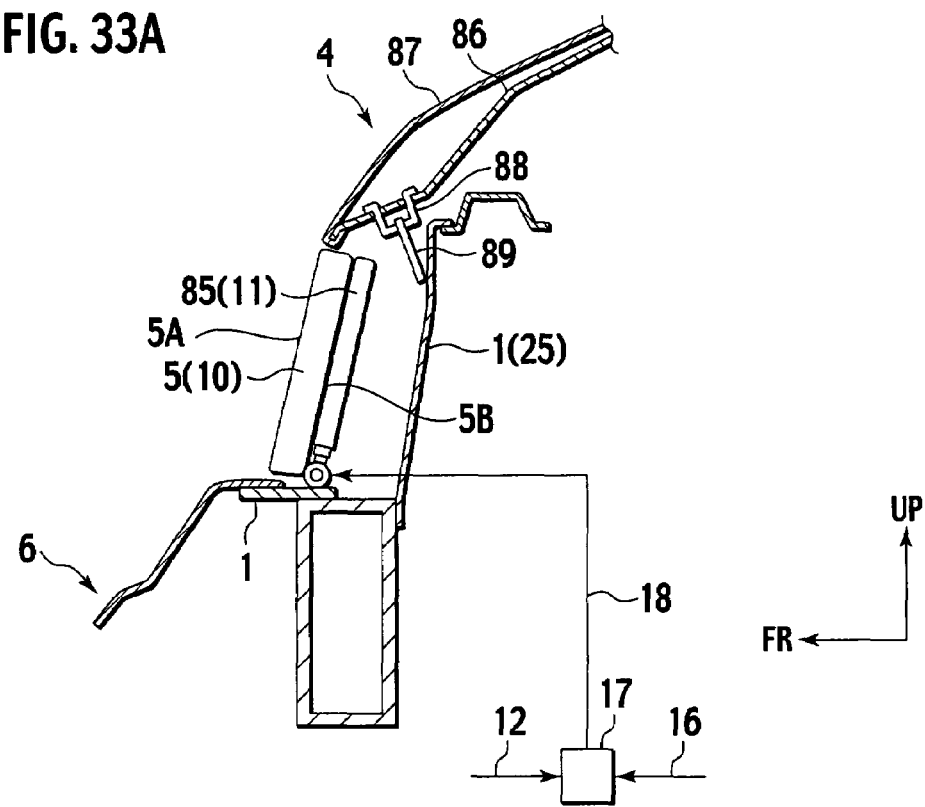
FIG. 33A (taken along the lines XXXIII-A in FIG. 32A) and FIG. 33B each are a partial side cross sectional view, according to the eighth embodiment.
Figure 33B:
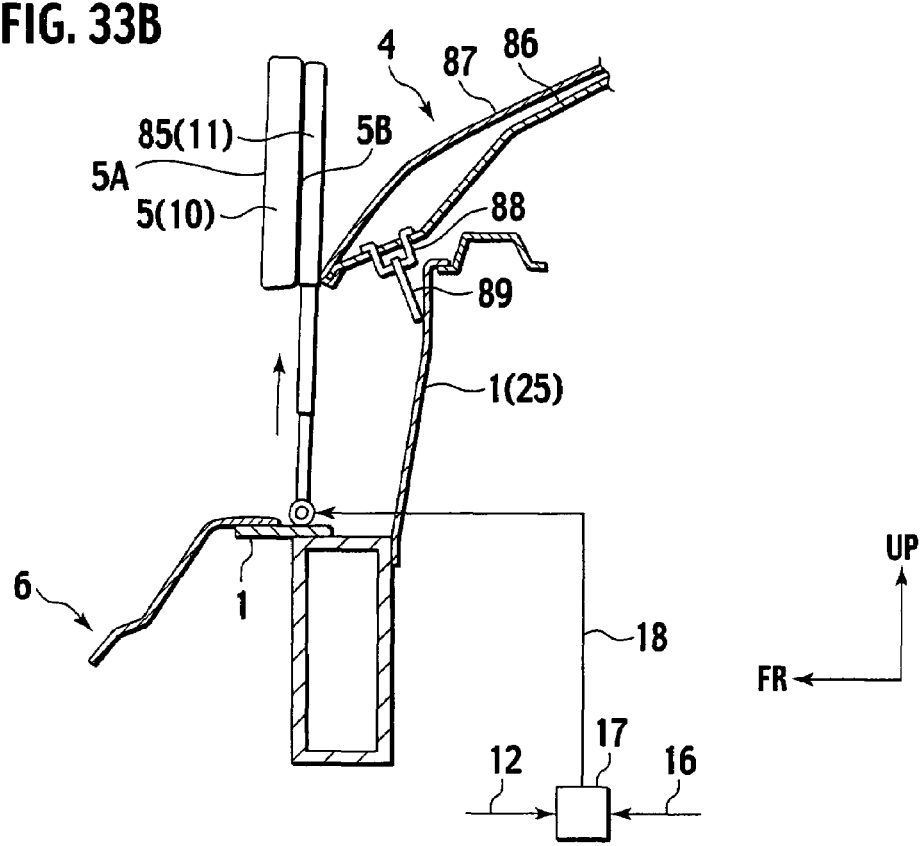
Figure 34:
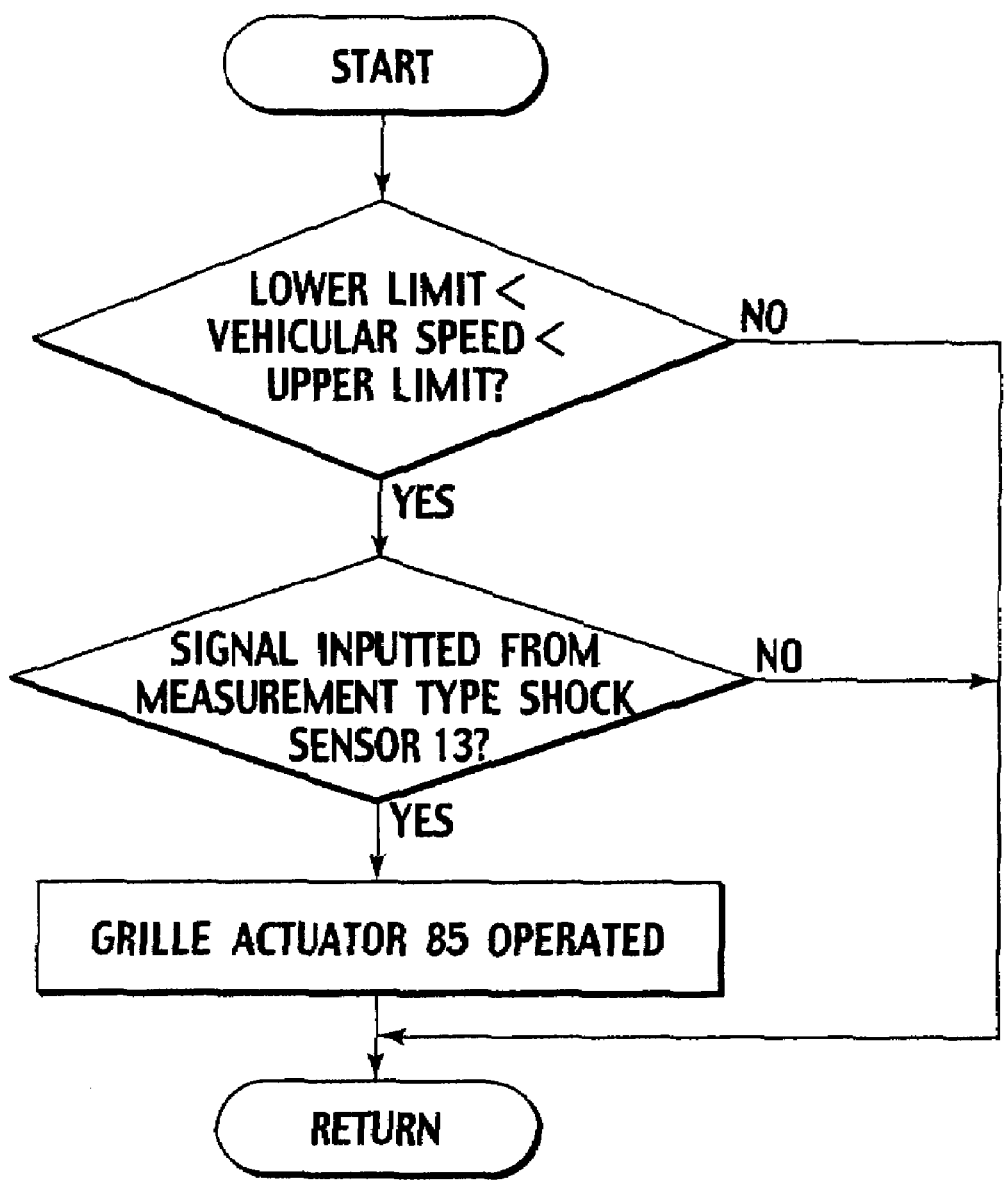
FIG. 34 shows a flow chart of a control system, according to the eighth embodiment.
Figure 35A:
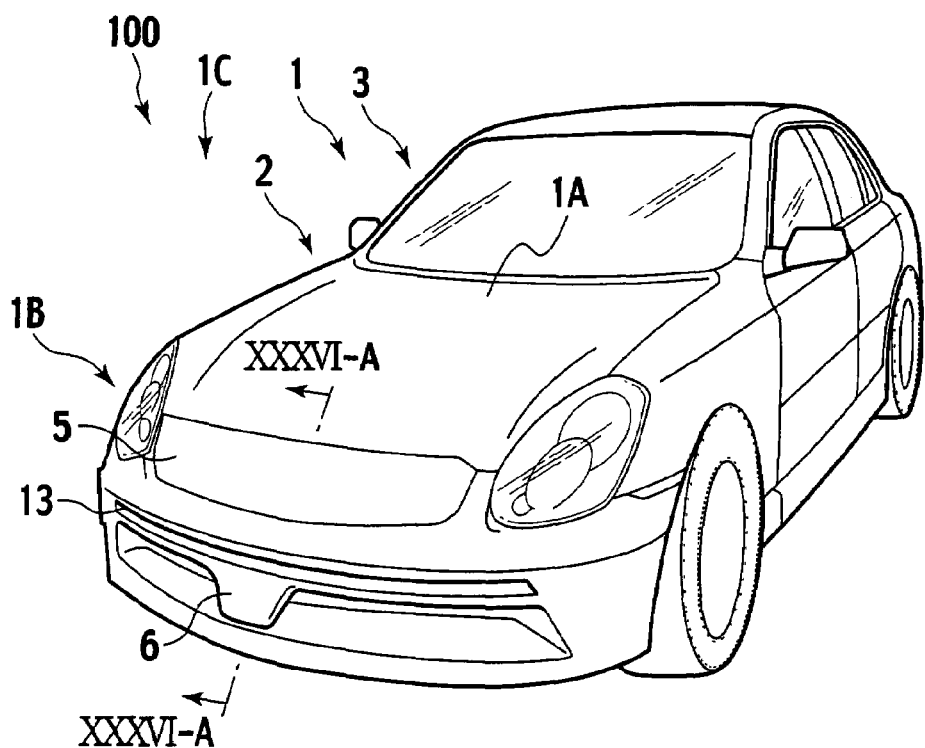
FIG. 35A and FIG. 35B each are a perspective view of the vehicular body, according to a ninth embodiment.
Figure 35B:
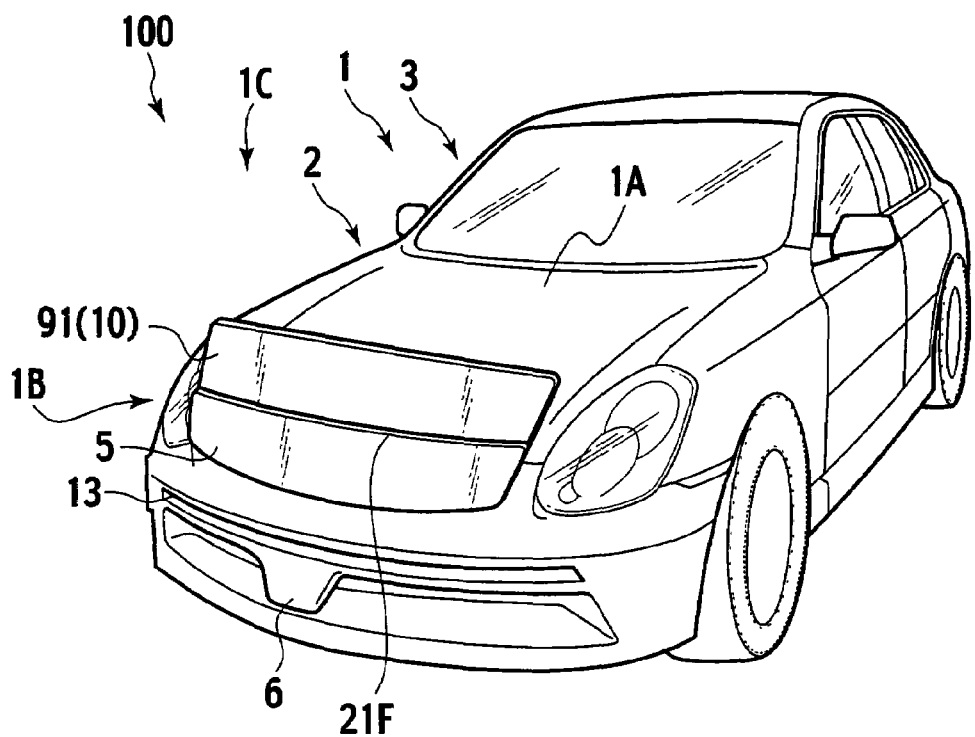
Figure 37:
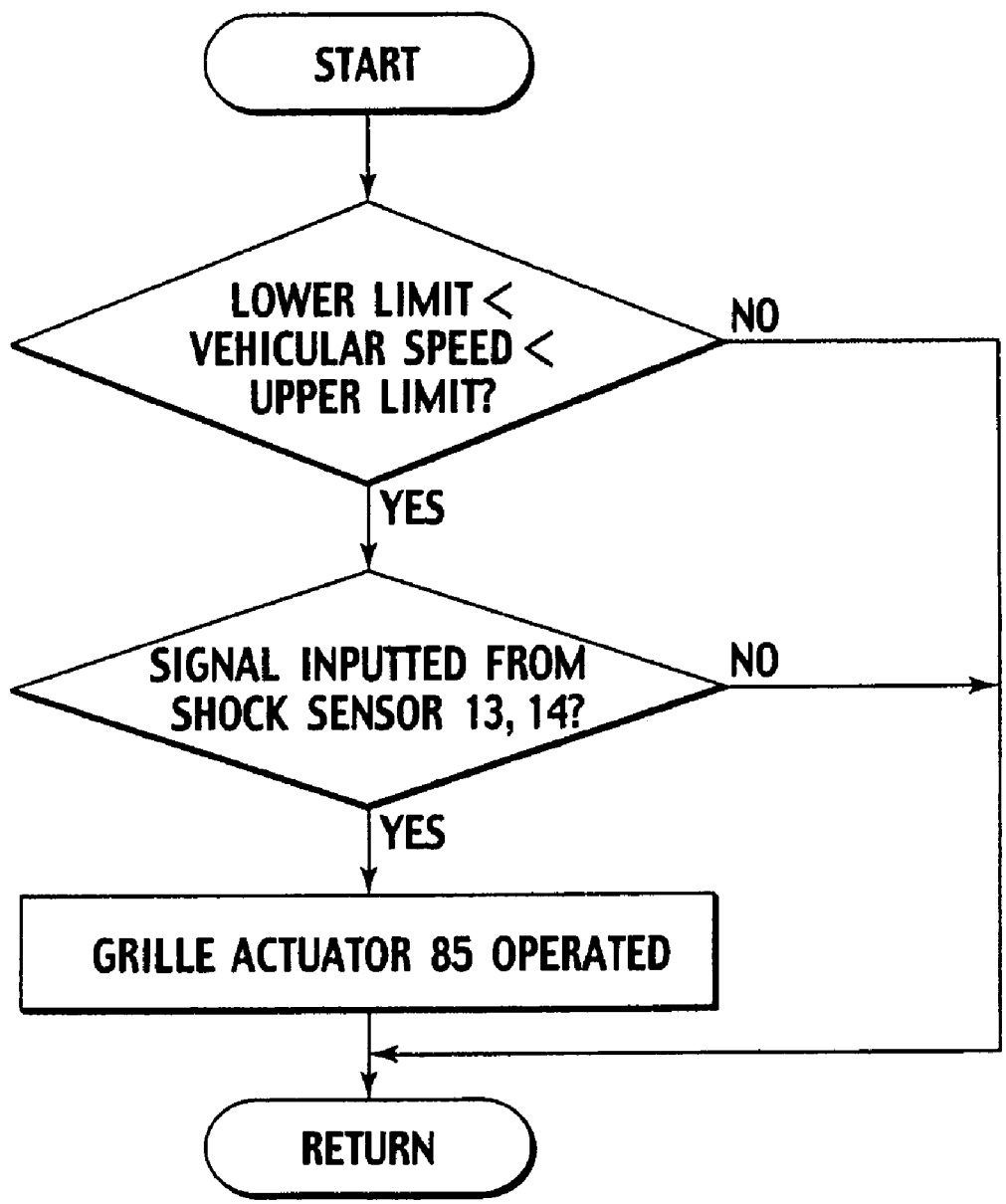
FIG. 37 shows a flow chart of a control system, according to the ninth embodiment.
Figure 38A:
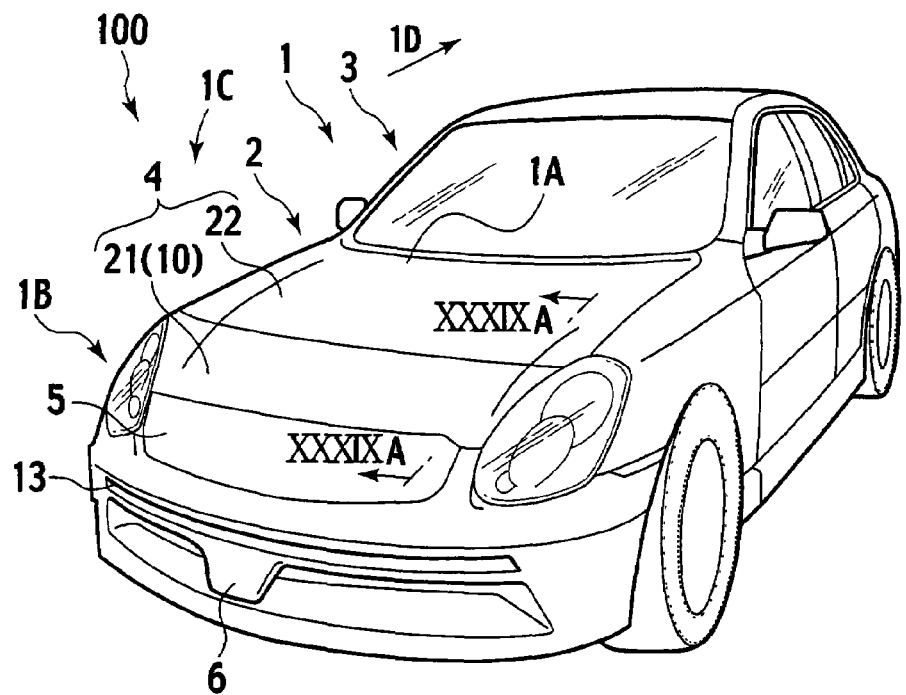
FIG. 38A and FIG. 38B each are a perspective view of the vehicular body, according to a tenth embodiment.
Figure 38B:
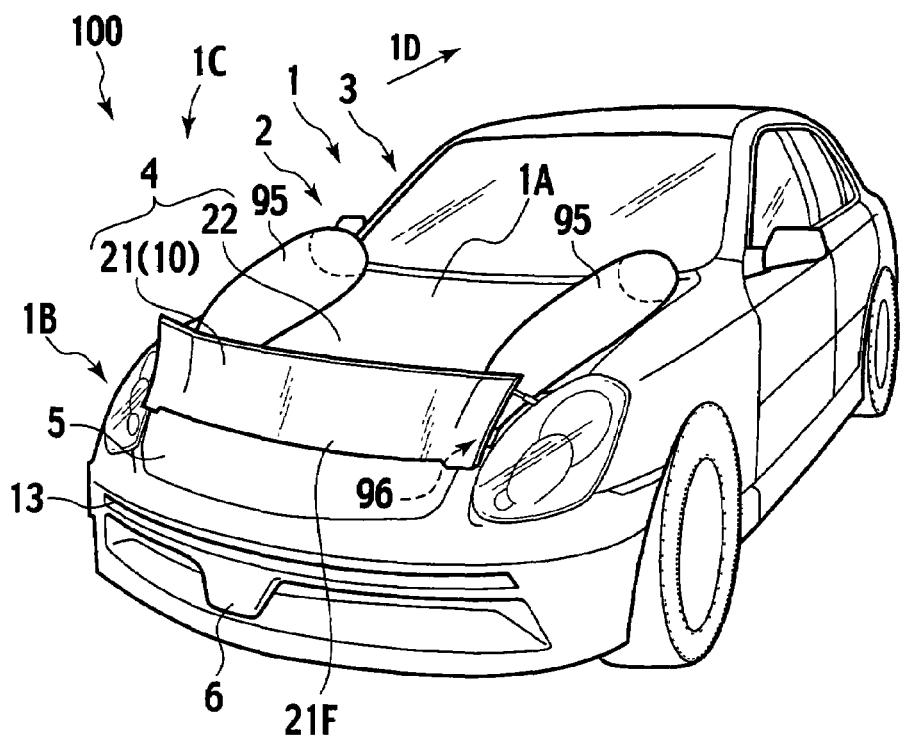

As shown in FIG. 33A and FIG. 33B, receiving the control signal 18 from the controller 17, the grille actuator 85 extendably moves, thereby elevating the grille 5. Being stopped with the grille actuator 85 at the maximum extension, the grille 5 can be disposed in a certain position. With this, an upper end part of the grille 5 is elevated, transferring the contact C upward, thus causing the smaller rotary radius r from the apex part B of the obstacle A to the contact C of the upper end part of the grille 5, correspondingly decreasing the shock energy to the hood 4.

Ninth Embodiment

FIG. 35A and FIG. 35B to FIG. 37 show the vehicular body front structure 100, according to a ninth embodiment of the present invention.

Herein, i) the basic structure of the vehicle and ii) the structure common to all the embodiments (first embodiment to tenth embodiment) which structures i) and ii) have already been set forth in the description of the common embodiment are to be omitted.

When necessary, however, the above descriptions are to be interpreted as the description of the ninth embodiment.

Even otherwise, the structural elements having the same reference numerals as those according to each of the prior embodiments are, however, to be interpreted as the same or equivalents thereof, and the description of the structural elements is to be interpreted as the one according to the ninth embodiment.

--Structure Specific to Ninth Embodiment--

The ninth embodiment is substantially like the eighth embodiment in structure. However, instead of allowing the grille 5 as the reactive force member 10 to rise or fall, a reactive force plate 91 having a front face 91A and a rear face 91B is received on the rear face 5B of the grille 5 adjacent to the front edge part 1B of the vehicular body 1 in such a configuration as to rise or fall. The reactive force plate 91 operates as the reactive force member 10.

Therefore, in the certain position, the grille 5 is in a fixed state relative to the vehicular body 1 and the hood 4. The grille actuator 85 extending substantially in the upper-lower direction operates as the mover mechanism 11. With the upper end side (body side) of the grille actuator 85 mounted to the rear face 91B of the reactive force plate 91 received on the rear face 5B of the grille 5, the lower end part (rod side) of the grille actuator 85 is coupled to the vehicular body 1 side. In addition, with the surface of the upper end part of the grille S and the surface of the front edge part of the hood 4 substantially serially disposed, the grille 5 and the grille actuator 85 (when the grille actuator 85 is extending) are to be slightly inclined frontward, thus preventing the interference between the two surfaces. In addition, like the one according to the eighth embodiment, the hood 4 according to the ninth embodiment is of unitary type (ordinary type), not divided into front and rear hoods (21, 22).

In addition, it is so structured that, receiving the vehicular speed signal 16 from the vehicular speed sensor 15 and the sensing signal 12 from the measurement type shock sensor 13, the controller 17 operates the grille actuator 85 as the mover mechanism 11.

--Operations of Ninth Embodiment--

Then, operations of the ninth embodiment are to be set forth.

Herein, the operations brought about by i) the basic structure of the vehicle and ii) the structure common to all the embodiments (first embodiment to tenth embodiment) which operations have already been set forth in the description of the common embodiment are to be omitted.

When necessary, however, the above descriptions are to be interpreted as the description of the ninth embodiment.

Even otherwise, operations brought about by the structural elements having the same reference numerals as those according to each of the prior embodiments are, however, to be interpreted as the same or equivalents thereof, and the description of the above operations is to be interpreted as the one according to the ninth embodiment.

According to the ninth embodiment, the reactive force plate 91 is received on the rear face 5B of the grille 5 adjacent to the front edge part 1B of the vehicular body 1 in such a configuration as to rise or fall and operates as the reactive force member 10, eliminating the need for changing the structure of the hood 4 as it is (i.e., hood 4 already available) and ordinarily implementing the opening and closing operations of the hood 4. Moreover, the structure of the grille 5 can be kept unchanged.

Moreover, the reactive force plate 91 as the reactive force member 10 lighter in weight than the grille 5 has better operability. Moreover, the simple structure can be easily added to the vehicle that is already available.

--Operations More Specific to Ninth Embodiment--

More specific operations of the ninth embodiment are to be set forth hereinafter. That is, continuously sensing the vehicular speed, the vehicular speed sensor 15 outputs the vehicular speed signal 16 to the controller 17, as shown in a flow chart of FIG. 37. Moreover, the measurement type shock sensor 13 senses the collision of the vehicular body 1 with the obstacle A, to thereafter output the sensing signal 12 to the controller 17. With the sensing signal 12 from the shock sensors 13, 14 and the vehicular speed signal 16 from the vehicular speed sensor 15 inputted to the controller 17, the controller 17 makes the following operations:

1) out of the certain speed range: not outputting the control signal 18 to the grille actuator 85, and 2) within the certain speed range (lower limit<vehicular speed<upper limit): outputting the control signal 18 to the grille actuator 85.

As shown in FIG. 36A and FIG. 36B, receiving the control signal 18 from the controller 17, the grille actuator 85 extendably moves, thereby elevating the reactive force plate 91 from the rear face 5B of the grille 5. Being stopped with the grille actuator 85 at the maximum extension, the reactive force plate 91 can be disposed in a certain position. With this, an upper end part of the reactive force plate 91 is elevated, transferring the contact C upward, thus causing the smaller rotary radius r from the apex part B of the obstacle A to the contact C of the upper end part of the reactive force plate 91, correspondingly decreasing the shock energy to the hood 4.

Tenth Embodiment

FIG. 38A and FIG. 38B to FIG. 40 show the vehicular body front structure 100, according to a tenth embodiment of the present invention.

Herein, i) the basic structure of the vehicle and ii) the structure common to all the embodiments (first embodiment to tenth embodiment) which structures i) and ii) have already been set forth in the description of the common embodiment are to be omitted.

When necessary, however, the above descriptions are to be interpreted as the description of the tenth embodiment.

Even otherwise, the structural elements having the same reference numerals as those according to each of the prior embodiments are, however, to be interpreted as the same or equivalents thereof, and the description of the structural elements is to be interpreted as the one according to the tenth embodiment.

--Structure Specific to Tenth Embodiment--

The tenth embodiment has the following specific structure. That is, there is provided an air bag device 96 having an air bag body 95 which is developable rearward of the vehicle substantially along the hood 4 according to the reactive force member 10 starting operation.

When applied to the structure, for example, according to the first embodiment, the air bag device 96 of the vehicular body 1 is mounted between the front hood locking mechanism 28 and the rear hood locking mechanism 34 and in a space 97 below the weather strip 29.

In addition, not only to the structure according to the first embodiment, the air bag device 96 is likewise applicable also to the second embodiment to the ninth embodiment. In the case of the eighth embodiment, the air bag device 96 is preferably mounted, for example, to the rear face 5B's part where the air bag device 96 appears more upward than the hood 4. In the case of the ninth embodiment, the air bag device 96 is preferably mounted, for example, to the rear face 91B's part where the air bag device 96 appears more upward than the hood 4.

In addition, it is so structured that, receiving the vehicular speed signal 16 from the vehicular speed sensor 15 and the sensing signal 12 from the measurement type shock sensor 13, the controller 17 operates the grille actuator 85 (as the mover mechanism 11) and the air bag device 96.

--Operations of Tenth Embodiment--

Then, operations of the tenth embodiment are to be set forth hereinafter.

According to the tenth embodiment, the air bag device 96 having the air bag body 95 which is developable rearward of the vehicle substantially along the hood 4 according to the reactive force member 10 starting operation can decrease the shock energy attributable to the reactive force member 10 and the shock energy attributable to the air bag device 96.

--Operations More Specific to Tenth Embodiment--

More specific operations of the tenth embodiment are to be set forth hereinafter. That is, continuously sensing the vehicular speed, the vehicular speed sensor 15 outputs the vehicular speed signal 16 to the controller 17, as shown in a flow chart of FIG. 40. Moreover, the measurement type shock sensor 13 senses the collision of the vehicular body 1 with the obstacle A, to thereafter output the sensing signal 12 to the controller 17. With the sensing signal 12 from the shock sensor 13 and the vehicular speed signal 16 from the vehicular speed sensor 15 inputted to the controller 17, the controller 17 makes the following operations:

1) out of the certain speed range: not outputting the control signal 18 to the front hood actuator 36 and the air bag device 96, and 2) within the certain speed range (lower limit<vehicular speed<upper limit): outputting the control signal 18 to the front hood actuator 36 and the air bag device 96.

Figure 39A:
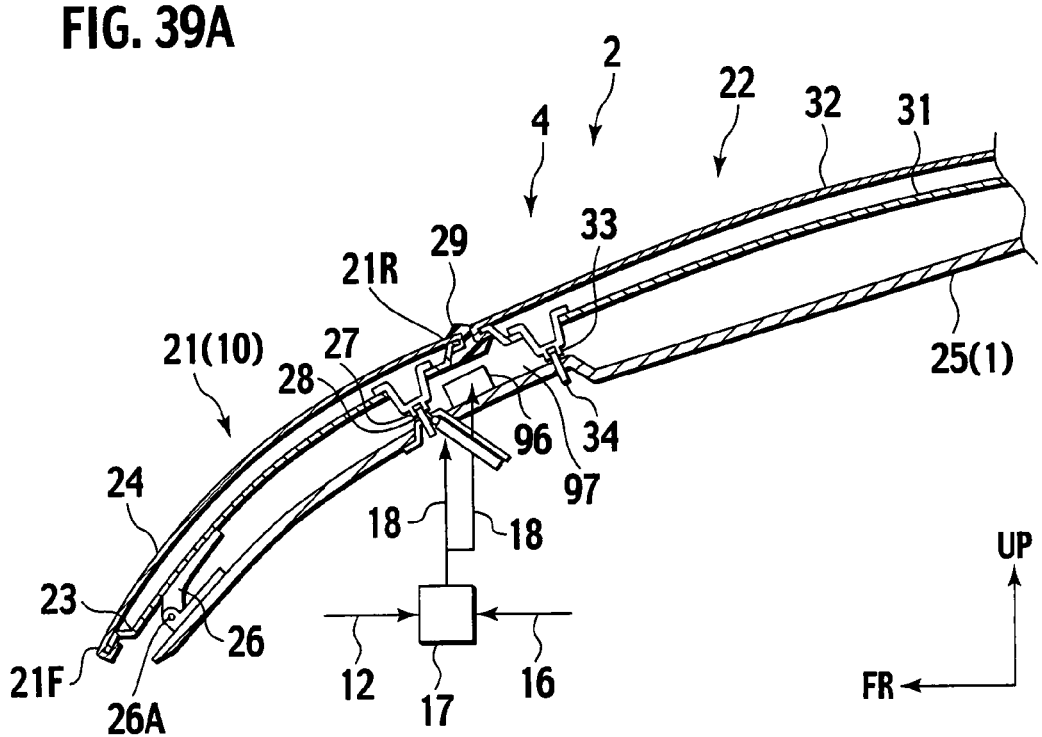
FIG. 39A (taken along the lines XXXIX-A in FIG. 38A) and FIG. 39B each are a partial side cross sectional view, according to the tenth embodiment.
Figure 39B:
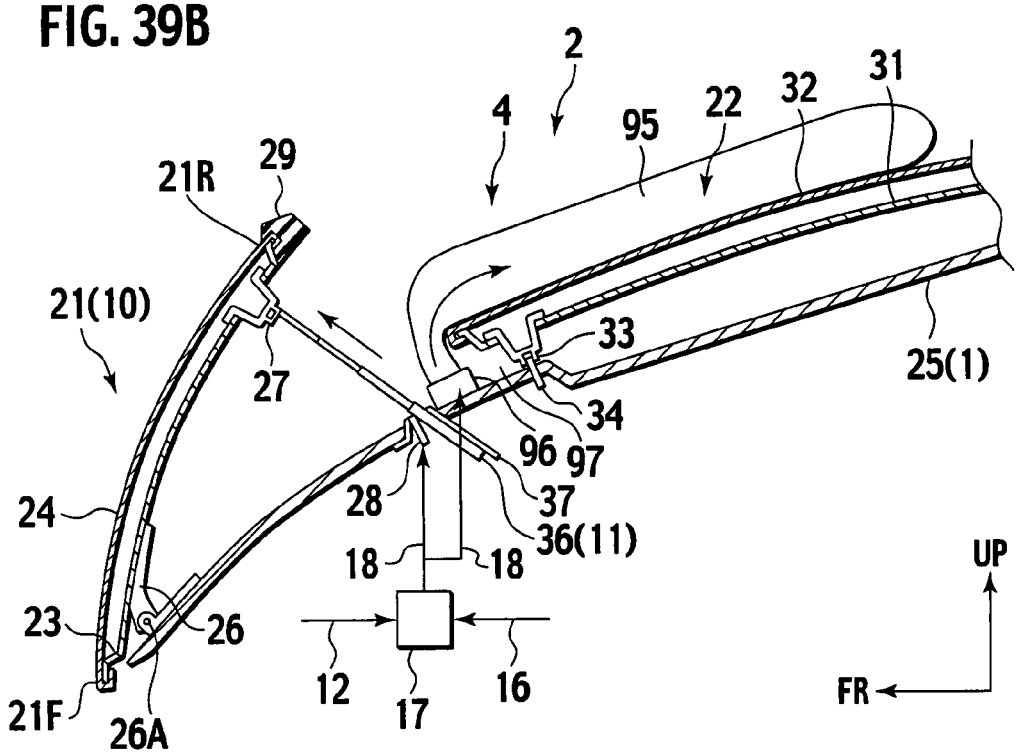
Figure 40:
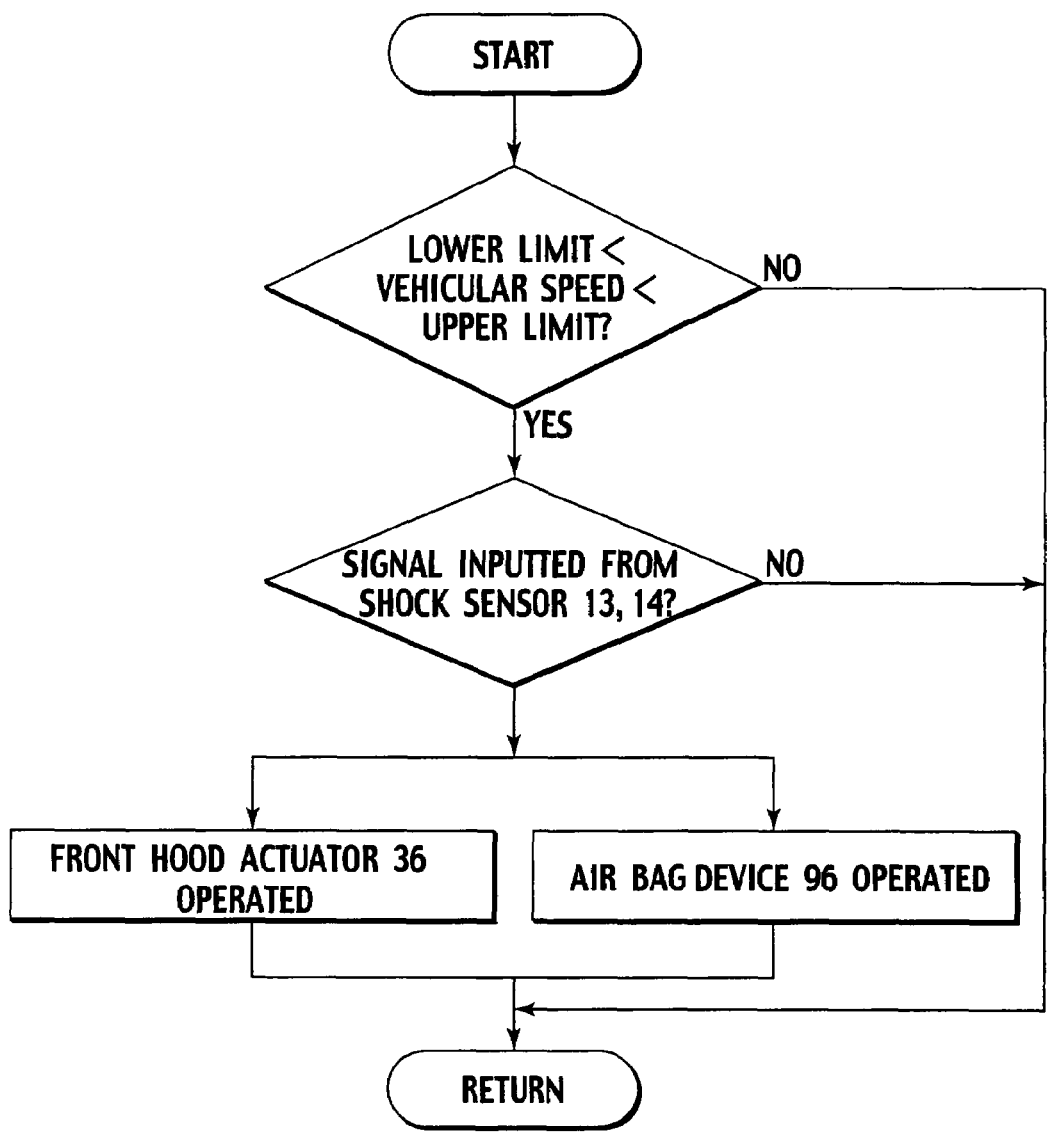
FIG. 40 shows a flow chart of a control system, according to the tenth embodiment.

As shown in FIG. 39A and FIG. 39B, receiving the control signal 18 from the controller 17, the front hood actuator 36 extendably moves, thereby pushing the rear part 21R of the front hood 21 from the lower part, to thereby rotate the front hood 21 frontward of the vehicle around the hinge shaft 26A of the front hood hinge 26. Being stopped with the front hood actuator 36 at the maximum extension, the front hood 21 can be disposed in the certain position. With this, the upper end part (rear part 21R) of the front hood 21 is elevated, transferring the contact C upward, thus causing the smaller rotary radius r from the apex part B of the obstacle A to the contact C of the upper end part of the front hood 21, correspondingly decreasing the shock energy to the rear hood 22.

Substantially simultaneously, receiving the control signal 18 from the controller 17, the air bag device 96 develops the air bag body 95 rearward of the vehicle substantially along the hood 4. With this, the air bag body 95 is interposed between the apex part B of the obstacle A and the rear hood 22, receiving the apex part B of the obstacle A, to thereby effectively protect the apex part B of the obstacle A.

The embodiments of the present invention have been set forth referring to the drawings. However, the embodiments each show an example of the present invention. The present invention is, as a matter of course, not limited to the structures of the respective embodiments, and can include modifications or changes with the scope of the present invention.

Moreover, combinations of the structures of the plurality of the embodiments are, as a matter of course, included in the present invention, provided that such combinations be accomplished.

This application is based on a prior Japanese Patent Application No. P2006-101318 (filed on Apr. 3, 2006 in Japan). The entire contents of the Japanese Patent Application No. P2006-101318 from which priority is claimed are incorporated herein by reference, in order to take some protection against translation errors or omitted portions.

The scope of the present invention is defined with reference to the following claims.

What is claimed is:

1. A vehicular body front structure, comprising:
a reactive force member disposed adjacent to a front edge part of a vehicular body having a front part including a hood configured to open or close, a part of the hood being configured to serve as the reactive force member to be displaceable from a received state where the reactive force member is received in the vehicular body to a protruding state where the reactive force member protrudes to a position higher than a surface of the vehicular body;
a mover mechanism disposed between the vehicular body and the reactive force member and configured to displace the reactive force member from the received state to the protruding state; and
a shock sensor configured to sense or calculate a collision of the vehicular body with an obstacle to thereby output a sensing signal for moving the mover mechanism.

2. The vehicular body front structure according to claim 1, further comprising a controller disposed between the shock sensor and the mover mechanism, and configured to receive a vehicular speed signal from a vehicular speed sensor to thereby move the mover mechanism when a vehicular speed within a certain speed range.

3. The vehicular body front structure according to claim 1, wherein the hood is configured to open or close an engine room and includes a front hood and a rear hood divided from the front hood,
wherein the front hood is mounted to the vehicular body in such a configuration that a rear part of the front hood is adapted to rise or fall around a front part of the front hood, and
wherein the front hood is configured to operate as the reactive force member.

4. The vehicular body front structure according to claim 1, further comprising an air bag device having an air bag body which is configured to develop in a rearward direction of the vehicular body substantially along the hood according to the reactive force member starting an operation.

5. The vehicular body front structure according to claim 1, further comprising a front hood-moving motor actuator as the mover mechanism,
wherein an output shaft of the front hood-moving motor actuator is connected, via a gear, to a front hood lift guide rail mounted to a front hood locking mechanism, and
wherein the front hood lift guide rail is a rack member formed into substantially an arc around a hinge shaft of a front hood hinge.

6. The vehicular body front structure according to claim 1, wherein the shock sensor includes:
a calculation type shock sensor, and
a measurement type shock sensor, and
wherein a sensing signal from the calculation type shock sensor allows the reactive force member to protrude to an intermediate position, and a the sensing signal from the measurement type shock sensor allows the reactive force member to protrude to a final position, implementing two-step operations.

7. The vehicular body front structure according to claim 1, further comprising a shock converting mechanism capable of using a collisional force as an assist driving force of the reactive force member,
wherein the shock converting mechanism includes:
a load transmitting member disposed at the front edge part of the vehicular body,
a link arm interposed between the load transmitting member and a front hood hinge, and
a link arm supporting mechanism by which an intermediate part of the link arm is rotatably and pivotally supported to the vehicular body,
wherein the load transmitting member is disposed on a rear face side of a surface panel of a bumper, and wherein an end part of the link arm is rotatably coupled to the load transmitting member, while another end part of the link arm so contacts the front hood hinge as to push the front hood hinge.

8. The vehicular body front structure according to claim 7, wherein an a measurement type shock sensor is incorporated in the link arm supporting mechanism.

9. The vehicular body front structure according to claim 1, wherein the hood includes a front hood and a rear hood divided from and separable from the front hood, and wherein the front hood is configured to operate as the reactive force member.

* * * * *